(12) United States Patent
Laroia et al.

(10) Patent No.: US 9,686,471 B2
(45) Date of Patent: Jun. 20, 2017

(54) METHODS AND APPARATUS RELATING TO IMAGE STABILIZATION

(71) Applicant: THE LIGHTCO INC., Palo Alto, CA (US)

(72) Inventors: Rajiv Laroia, Far Hills, NJ (US); Sapna A Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 14/530,682

(22) Filed: Oct. 31, 2014

(65) Prior Publication Data
US 2015/0163408 A1 Jun. 11, 2015

Related U.S. Application Data

(60) Provisional application No. 61/899,097, filed on Nov. 1, 2013.

(51) Int. Cl.
*H04N 5/232* (2006.01)
*G02B 27/58* (2006.01)
(Continued)

(52) U.S. Cl.
CPC .......... *H04N 5/23258* (2013.01); *G02B 27/58* (2013.01); *G02B 27/646* (2013.01);
(Continued)

(58) Field of Classification Search
CPC ....... G06T 2200/21; G06T 2207/10052; G06T 2207/20212; G06T 2207/20221;
(Continued)

(56) References Cited

U.S. PATENT DOCUMENTS 4,890,133 A 12/1989 Ogawa et al.
5,078,479 A 1/1992 Vuilleumier
(Continued)

FOREIGN PATENT DOCUMENTS

EP 2642757 A2 9/2013
JP 10091765 4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Michael Osinski
(74) *Attorney, Agent, or Firm* — Michael P. Straub; Stephen T. Straub; Ronald P. Straub

(57) ABSTRACT

Methods and apparatus for processing images captured by a camera device including multiple optical chains, e.g., camera modules, are described. Three, 4, 5 or more optical chains maybe used. Different optical chains capture different images due to different perspectives. Multiple images, e.g., corresponding to different perspectives, are captured during a time period and are combined to generate a composite image. In some embodiments one of the captured images or a synthesized image is used as a reference image during composite image generation. The image used as the reference image is selected to keep the perspective of sequentially generated composite images consistent despite unintentional came movement and/or in accordance with an expected path of travel. Thus, which camera module provides the reference image may vary over time taking into consideration unintended camera movement. Composite
(Continued)

US 9,686,471 B2

Page 2 image generation may be performed external to the camera device or in the camera device.

19 Claims, 25 Drawing Sheets

(51) Int. Cl.
*G02B 27/64* (2006.01)
*H04N 5/225* (2006.01)
*H04N 5/247* (2006.01)
*H04N 5/77* (2006.01)

(52) U.S. Cl.
CPC ....... *H04N 5/2257* (2013.01); *H04N 5/23238* (2013.01); *H04N 5/23245* (2013.01); *H04N 5/23277* (2013.01); *H04N 5/23287* (2013.01); *H04N 5/247* (2013.01); *H04N 5/77* (2013.01); *G06T 2207/10052* (2013.01)

(58) Field of Classification Search
CPC ............ G06T 2207/30252; G06T 5/50; H04N 5/2254; H04N 5/23254; H04N 5/23258; H04N 5/2258; H04N 5/23232; H04N 5/23238; H04N 5/23245; H04N 5/23248; H04N 5/23229; H04N 5/23277; H04N 5/23296; H04N 5/2628; H04N 13/0282; H04N 13/0242; H04N 21/21805; B60R 2300/105; B60R 2300/302; G08B 13/19641
See application file for complete search history.

(56) References Cited

U.S. PATENT DOCUMENTS

| | | | |
|---|---|---|---|
| 5,109,425 A * | 4/1992 | Lawton .................. G06T 7/262 |
| | | | 348/25 |
| 5,153,569 A | 10/1992 | Kawamuraa et al. | |
| 5,353,068 A | 10/1994 | Moriwake | |
| 5,583,602 A | 12/1996 | Yamamoto | |
| 5,781,331 A | 7/1998 | Carr et al. | |
| 5,889,553 A | 3/1999 | Kino et al. | |
| 5,975,710 A | 11/1999 | Luster | |
| 5,982,951 A | 11/1999 | Katayama et al. | |
| 6,011,661 A | 1/2000 | Weng | |
| 6,028,600 A | 2/2000 | Rosin et al. | |
| 6,081,670 A | 6/2000 | Madsen et al. | |
| 6,141,034 A | 10/2000 | McCutchen | |
| 6,473,536 B1 * | 10/2002 | Chiba .................... G06T 11/00 |
| | | | 345/630 |
| 6,611,289 B1 * | 8/2003 | Yu ......................... H04N 9/045 |
| | | | 348/265 |
| 7,009,652 B1 | 3/2006 | Tanida et al. | |
| 7,280,735 B2 | 10/2007 | Thibault | |
| 7,315,423 B2 | 1/2008 | Sato | |
| 7,551,358 B2 | 6/2009 | Lee et al. | |
| 7,561,201 B2 | 7/2009 | Hong | |
| 7,801,428 B2 | 9/2010 | Nagaishi et al. | |
| 7,810,511 B2 | 10/2010 | Fagrenius et al. | |
| 7,986,343 B2 * | 7/2011 | Kumagai ............. H04N 5/2254 |
| | | | 348/208.1 |
| 8,139,114 B2 * | 3/2012 | Nobori .................... B60R 1/00 |
| | | | 348/148 |
| 8,144,230 B2 | 3/2012 | Watanabe et al. | |
| 8,194,169 B2 | 6/2012 | Tamaki et al. | |
| 8,199,222 B2 | 6/2012 | Drimbarean et al. | |
| 8,237,841 B2 | 8/2012 | Tanida et al. | |
| 8,320,051 B2 | 11/2012 | Matsumura et al. | |
| 8,417,058 B2 | 4/2013 | Tardif | |
| 8,482,637 B2 | 7/2013 | Ohara et al. | |
| 8,520,022 B1 | 8/2013 | Cohen et al. | |
| 8,553,106 B2 | 10/2013 | Scarff | |
| 8,619,082 B1 | 12/2013 | Ciurea et al. | |
| 8,639,296 B2 | 1/2014 | Ahn et al. | |
| 8,665,341 B2 | 3/2014 | Georgiev et al. | |
| 8,704,944 B1 | 4/2014 | Wierzoch et al. | |
| 8,762,895 B2 | 6/2014 | Metha et al. | |
| 8,780,258 B2 | 7/2014 | Lee | |
| 8,810,683 B2 * | 8/2014 | Kotani ................. H04N 5/2226 |
| | | | 348/208.12 |
| 8,896,655 B2 | 11/2014 | Mauchly et al. | |
| 9,041,826 B2 | 5/2015 | Jung et al. | |
| 9,055,218 B2 * | 6/2015 | Nishiyama ............. H04N 5/217 |
| 9,104,705 B2 | 8/2015 | Fujinaga | |
| 9,135,732 B2 | 9/2015 | Winn et al. | |
| 9,282,228 B2 | 3/2016 | Laroia | |
| 9,374,514 B2 | 6/2016 | Laroia | |
| 9,426,365 B2 * | 8/2016 | Laroia .................... G02B 27/58 |
| 9,445,003 B1 * | 9/2016 | Lelescu ............... H04N 5/23232 |
| 2002/0047901 A1 * | 4/2002 | Nobori .................... B60R 1/00 |
| | | | 348/149 |
| 2002/0149691 A1 | 10/2002 | Pereira et al. | |
| 2003/0018427 A1 | 1/2003 | Yakota et al. | |
| 2003/0020814 A1 | 1/2003 | Ono | |
| 2003/0185551 A1 | 10/2003 | Chen | |
| 2004/0100479 A1 | 5/2004 | Nakano et al. | |
| 2004/0227839 A1 | 11/2004 | Stavley et al. | |
| 2005/0088546 A1 | 4/2005 | Wang | |
| 2005/0200012 A1 | 9/2005 | Kinsman | |
| 2006/0067672 A1 | 3/2006 | Washisu et al. | |
| 2006/0082644 A1 * | 4/2006 | Tsubaki ............. H04N 13/0282 |
| | | | 348/42 |
| 2006/0132612 A1 * | 6/2006 | Kawahara .......... H04N 5/23248 |
| | | | 348/208.6 |
| 2006/0187338 A1 | 8/2006 | May et al. | |
| 2006/0221218 A1 | 10/2006 | Adler et al. | |
| 2006/0238886 A1 | 10/2006 | Kushida et al. | |
| 2006/0281453 A1 | 12/2006 | Jaiswal et al. | |
| 2007/0050139 A1 | 3/2007 | Sidman | |
| 2007/0065012 A1 | 3/2007 | Yamakado et al. | |
| 2007/0127915 A1 | 6/2007 | Lu et al. | |
| 2007/0159535 A1 * | 7/2007 | Kumagai ............. H04N 5/2254 |
| | | | 348/218.1 |
| 2007/0177047 A1 | 8/2007 | Goto | |
| 2007/0182528 A1 | 8/2007 | Breed et al. | |
| 2007/0291850 A1 * | 12/2007 | Ishikawa .......... H04N 21/21805 |
| | | | 375/240.24 |
| 2008/0030592 A1 | 2/2008 | Border et al. | |
| 2008/0074755 A1 | 3/2008 | Smith | |
| 2008/0079839 A1 * | 4/2008 | Sung ...................... G02B 7/38 |
| | | | 348/345 |
| 2008/0084484 A1 | 4/2008 | Ochi et al. | |
| 2008/0111881 A1 | 5/2008 | Gibbs et al. | |
| 2008/0180562 A1 | 7/2008 | Kobayashi | |
| 2008/0211941 A1 | 9/2008 | Deever et al. | |
| 2008/0219654 A1 | 9/2008 | Border et al. | |
| 2008/0240698 A1 | 10/2008 | Bartilson et al. | |
| 2008/0247745 A1 | 10/2008 | Nilsson | |
| 2008/0251697 A1 | 10/2008 | Park et al. | |
| 2008/0278610 A1 | 11/2008 | Boettiger | |
| 2009/0086032 A1 | 4/2009 | Li | |
| 2009/0136223 A1 | 5/2009 | Motomura et al. | |
| 2009/0154821 A1 | 6/2009 | Sorek et al. | |
| 2009/0225203 A1 | 9/2009 | Tanida et al. | |
| 2009/0232216 A1 * | 9/2009 | Kurata .................... H04N 5/144 |
| | | | 375/240.16 |
| 2009/0244301 A1 * | 10/2009 | Border ............... H04N 5/23232 |
| | | | 348/208.99 |
| 2009/0278950 A1 | 11/2009 | Deng et al. | |
| 2009/0290042 A1 | 11/2009 | Shiohara | |
| 2010/0013906 A1 | 1/2010 | Border et al. | |
| 2010/0034531 A1 | 2/2010 | Go | |
| 2010/0045774 A1 | 2/2010 | Len et al. | |
| 2010/0053414 A1 | 3/2010 | Tamaki et al. | |
| 2010/0079635 A1 | 4/2010 | Yano et al. | |
| 2010/0091089 A1 | 4/2010 | Cromwell et al. | |
| 2010/0097443 A1 | 4/2010 | Lablans | |
| 2010/0141802 A1 * | 6/2010 | Knight ............... H04N 5/23212 |
| | | | 348/240.3 |
| 2010/0225755 A1 | 9/2010 | Tamaki et al. | |
| 2010/0238327 A1 | 9/2010 | Griffith et al. | |

(56) References Cited

U.S. PATENT DOCUMENTS

| | | |
|---|---|---|
| 2010/0265346 A1 | 10/2010 | Iizuka |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0090323 A1* | 4/2011 | Shibata ............... H04N 13/0018 348/54 |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0249146 A1* | 10/2011 | Ishida ................ H04N 5/23238 348/231.99 |
| 2011/0280565 A1 | 11/2011 | Chapman et al. |
| 2011/0285895 A1 | 11/2011 | Weng et al. |
| 2011/0298917 A1* | 12/2011 | Yanagita ................. G03B 5/02 348/135 |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0176506 A1* | 7/2012 | Tajiri ................... H04N 5/2254 348/222.1 |
| 2012/0188391 A1 | 7/2012 | Smith |
| 2012/0207462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2012/0307092 A1* | 12/2012 | Kotani ................ H04N 5/2226 348/218.1 |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0055621 A1* | 2/2014 | Shirani .................... H04N 7/18 348/159 |
| 2014/0063018 A1 | 3/2014 | Takeshita |
| 2014/0092281 A1* | 4/2014 | Nisenzon ........... H04N 13/0232 348/262 |
| 2014/0111650 A1 | 4/2014 | Georgiev et al. |
| 2014/0132804 A1* | 5/2014 | Guissin ................. G02B 13/06 348/239 |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0198230 A1* | 7/2014 | Tsutsumi ............. H04N 5/2258 348/218.1 |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0267802 A1* | 9/2014 | Sachs ................. H04N 5/23267 348/208.1 |
| 2014/0293079 A1 | 10/2014 | Milanfar et al. |
| 2014/0294231 A1* | 10/2014 | Datta ..................... G06T 7/292 382/103 |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0055010 A1* | 2/2015 | Eguchi ................... G03B 13/36 348/349 |
| 2015/0062410 A1* | 3/2015 | Kim ..................... H04N 5/2353 348/362 |
| 2015/0130995 A1* | 5/2015 | Nishiyama ........... H04N 5/2354 348/370 |
| 2015/0154449 A1 | 6/2015 | Ito et al. |
| 2015/0156399 A1 | 6/2015 | Chen et al. |
| 2015/0163406 A1 | 6/2015 | Laroia et al. |
| 2015/0181124 A1* | 6/2015 | S V ..................... H04N 5/23258 348/46 |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |
| 2016/0309084 A1* | 10/2016 | Venkataraman ... H04N 5/23232 |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

International Search Report and Written Opinion of the International Searching Authority from International Application No. PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

(56) References Cited

OTHER PUBLICATIONS

International Search Report and Written Opinion of the International Searching Authority from International Application No. PCT/US2014/072907, pp. 1-11, dated Mar. 27, 2015.

* cited by examiner

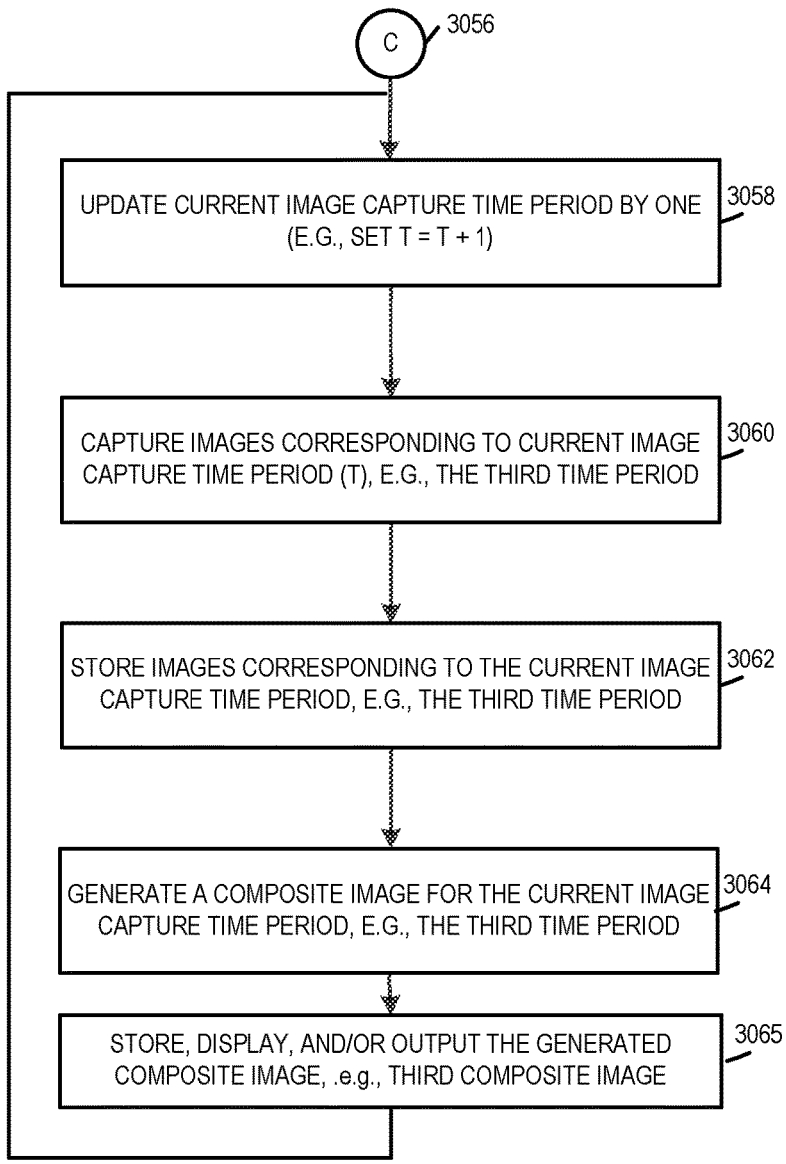

METHODS AND APPARATUS RELATING TO IMAGE STABILIZATION

RELATED APPLICATIONS

The present application claims the benefit of U.S. Provisional Patent Application Ser. No. 61/899,097 filed Nov. 1, 2013 which is hereby expressly incorporated by reference in its entirety.

FIELD

The present application relates to image processing methods and apparatus and, more particularly, to methods and apparatus related to image stabilization in still images and/or a sequence of images, e.g., video or a burst of frames.

BACKGROUND

High quality digital cameras have to a large extent replaced film cameras. However, like film cameras, with digital cameras much attention has been placed by the camera industry on the size and quality of lenses which are used on the camera. Individuals seeking to take quality photographs are often encouraged to invest in large bulky and often costly lenses for a variety of reasons. Among the reasons for using large aperture lenses is their ability to capture a large amount of light in a given time period as compared to smaller aperture lenses. Telephoto lenses tend to be large not only because of their large apertures but also because of their long focal lengths. Generally, the longer the focal length, the larger the lens. A long focal length gives the photographer the ability to take pictures from far away.

In the quest for high quality photos, the amount of light which can be captured is often important to the final image quality. Having a large aperture lens allows a large amount of light to be captured allowing for shorter exposure times than would be required to capture the same amount of light using a small lens. The use of short exposure times can reduce blurriness especially with regard to images with motion. The ability to capture large amounts of light can also facilitate the taking of quality images even in low light conditions. In addition, using a large aperture lens makes it possible to have artistic effects such as small depth of field for portrait photography.

Large lenses sometimes also offer the opportunity to support mechanical zoom features that allow a user to optically zoom in or out and/or to alter the focal length of the lens which is important for framing a scene without the need to move closer or further from the subject.

While large lenses have many advantages with regard to the ability to capture relatively large amounts of light compared to smaller lenses, support large zoom ranges, and often allow for good control over focus, there are many disadvantages to using large lenses.

Large lenses tend to be heavy requiring relatively strong and often large support structures to keep the various lenses of a camera assembly in alignment. The heavy weight of large lenses makes cameras with such lenses difficult and bulky to transport. Furthermore, cameras with large lenses often need a tripod or other support to be used for extended periods of time given that the sheer weight of a camera with a large lens can become tiresome for an individual to hold in a short amount of time.

In addition to weight and size drawbacks, large lenses also have the disadvantage of being costly. This is because of, among other things, the difficulty in manufacturing large high quality optics and packaging them in a manner in which they will maintain proper alignment over a period of time which may reflect the many years of use a camera lenses is expected to provide.

A great deal of effort has been directed in the camera industry to supporting the use of large camera lenses and packaging them in a way that allows different lenses to be used in an interchangeable manner on a camera body. However, for the vast majority of camera users, the drawbacks to cameras with large lenses means that camera users tend not to use large lenses with such lenses often being left to professionals and/or photo enthusiasts willing to incur the expense and trouble of buying and using large lenses.

In fact, many camera owners who own cameras with large high quality lenses often find themselves taking pictures with small pocket size cameras, often integrated into other devices such as their cell phones, personal digital assistants or the like, simply because they are more convenient to carry. For example, cell phone mounted cameras are often more readily available for use when an unexpected photo opportunity arises or in the case of a general family outing where carrying large bulky camera equipment may be uncomfortable or undesirable.

To frame a given scene from a given point, the focal length (hence size) of the lens depends on the size (area) of the image sensor. The smaller the image sensor, the smaller the focal length and the smaller the lens required. With advances in sensor technology, it is now possible to make small sensors, e.g., 5×7 mm$^2$ sensors, with relatively high pixel count, e.g., 8 megapixels. This has enabled the embedding of relatively high resolution cameras in small devices such as cell phones. The small sensor size (compared to larger cameras such as changeable lens single-lens reflex (SRL) cameras) enables small focal length lenses which are much smaller and lighter than larger focal length lenses required for cameras with larger sensors.

Cell phone mounted cameras and other pocket sized digital cameras sometimes rely on a fixed focal length lens which is also sometimes referred to as a focus-free lens. With such lenses the focus is set at the time of manufacture, and remains fixed. Rather than having a method of determining the correct focusing distance and setting the lens to that focal point, a small aperture fixed-focus lens relies on a large depth of field which is sufficient to produce acceptably sharp images. Many cameras, including those found on most cell phones, with focus free lenses also have relatively small apertures which provide a relatively large depth of field. There are also some high end cell phones that use auto focus cameras.

For a lens of a digital camera to be useful, it needs to be paired with a device which detects the light passing through the lens and converts it to pixel (picture element) values. A megapixel (MP or Mpx) is one million pixels. The term is often used to indicate the number of pixels in an image or to express the number of image sensor elements of a digital camera where each sensor element normally corresponds to one pixel. Multi-color pixels normally include one pixel value for each of the red, green, and blue pixel components.

In digital cameras, the photosensitive electronics used as the light sensing device is often either a charge coupled device (CCD) or a complementary metal oxide semiconductor (CMOS) image sensor, comprising a large number of single sensor elements, each of which records a measured intensity level.

In many digital cameras, the sensor array is covered with a patterned color filter mosaic having red, green, and blue regions in an arrangement. In such a filter based approach to capturing a color image, each sensor element can record the intensity of a single primary color of light. The camera then will normally interpolate the color information of neighboring sensor elements, through a process sometimes called demosaicing, to create the final image. The sensor elements in a sensor array using a color filter are often called "pixels", even though they only record 1 channel (only red, or green, or blue) of the final color image due to the filter used over the sensor element.

While a filter arrangement over a sensor array can be used to allow different sensor elements to capture different colors of light thus allowing a single sensor to capture a color image, the need to carefully align the filter area with individual pixel size sensor elements complicates the manufacture of sensor arrays as compared to arrays which do not require the use of a multi-color filter array.

While small focal length lenses paired with relatively high resolution sensors have achieved widespread commercial success in cell phones and pocket cameras, they often leave their owners longing for better picture quality, e.g., picture quality that can only be achieved with a larger pixel area and a larger lens opening to collect more light.

Smaller sensors require smaller focal length lenses (hence smaller lenses) to frame the same scene from the same point. Availability of high pixel count small sensors means that a smaller lens can be used. However, there are a few disadvantages to using smaller sensors and lenses. First, the small pixel size limits the dynamic range of the sensor as only a small amount of light can saturate the sensor. Second, small lenses collect less total light which can result in grainy pictures. Third, small lenses have small maximum apertures which make artistic effects like small depth of field for portrait pictures not possible.

One application for cameras is video. In movie productions, stage productions, studio noise productions and/or other applications where high quality video is desired, cameras are often mounted on tracks along which a camera can be rolled as it captures images. The track mounting arrangement avoids or reduces the risk of jerky movements that may occur in the case of handheld video or other cameras particularly where a camera is being moved altering the distance between the camera and the object or objects in the scene being captured.

In view of the above discussion it should be appreciated that there is a need for improved method or apparatus which can address the effect of motion of an image capture device, e.g., camera device. In particular it would be desirable if motion of a camera device could be taken into consideration when generating an image or a sequence of images to eliminate or reduce the effect of unintended motion. While track systems can provide for smooth camera motion, it would be desirable if image stabilization techniques could be developed which would allow for handheld cameras to provide video or capture images which allow for the generation of video with smooth intended motion without the undesirable motion often associated with video produced by handheld devices. It would be desirable if methods and/or apparatus could be developed which would allow for a camera device, e.g., a handheld camera device, to capture images and then for the camera device or another device to be able to processor one or more images to produce an image taking into consideration motion, e.g., motion between images due to camera movement. It would be desirable if at least some of the methods allowed for image stabilization and generation of one or more images without the need for tracks and/or other complicated camera mounting arrangements intended to limit camera motion to a smooth physical path of motion. While it would be desirable to address one or more of the above discussed problems it should be appreciated that any method or apparatus which could improve the image quality of an image or sequence of images generated from one or more images captured by a device which may be subject to motion, and especially unintentional motion, would be desirable even if it did not address all of the above discussed problems.

SUMMARY OF THE INVENTION

Various embodiments are directed to methods of generating one or more images, e.g., a sequence of images, using a camera including multiple optical chains or a light field camera taking into consideration camera motion. Camera motion is detected, e.g., tracked, by using sensors in the camera device and/or by comparing one or more images captured by the camera device.

Images are generated from multiple sets of image data, e.g., images captured by different optical chains or portions of a light field camera sensor in a way which allows the image being generated to have one of a plurality of different points of view. The point of view is controlled, along with optional use of cropping, in the generation of an image in a manner that gives the appearance of images corresponding to sequential time periods being captured by a camera moving along a smooth track of motion. Thus, since the image generation process takes into consideration camera motion and the generation of a composite image is done in a way that can reduce or minimize the effect of unintentional motion at least in some embodiments the image generation results in or facilitates image stabilization.

In one embodiment while each image in a sequence corresponds to a different, e.g., sequential time period, the generated image corresponding to one time period in the sequence is generated from captured image data which is captured by multiple different individual optical chain modules operating in parallel during the time period to which the individual generated image corresponds. As part of the image generation process, the images captured by different optical chain modules corresponding to an individual time period may be combined based on a point of view that is determined based on camera motion. The motion may, and in some embodiments is, detected through the use of a gyroscope and/or accelerometers. The point of view used from one frame to the next is selected in some embodiments to provide the appearance of a consistent or smoothly changing point of view as opposed to relying on a center portion of the camera device or center of a set of optical chain modules as the point of view. Thus, the point of view used for controlling the combining process maybe different from the point of view of the individual optical chain modules used to capture the image data being combined. It should be appreciated that due to the multiple points-of-view corresponding to the images captured by different camera modules, it is also possible to extrapolate and/or otherwise simulate a virtual point of view that could exist between the actual point of view of two optical chains. Accordingly, if motion information indicates that the desired perspective is from such an in-between virtual reference point, it is possible to generate a reference image corresponding to the in-between point reference point providing a perspective which is between the perspective of two actual modules.

Thus, as part of the combining operation the point of view may be determined and adjusted as may be necessary to simulate a smooth track of motion taking into consideration the images that may be captured by the optical chains having different points of view. Image cropping may be used as part of the combining and/or image data processing operation as well as point of view control to ensure that area included in the output video sequence remains relatively consistent and changes gradually over time as might be expected by smooth intentional camera motion as opposed to inadvertent motion. As should be appreciated inadvertent motion often takes the form of sudden or jerky camera motion, that may be the result of the use of a handheld camera device. Such motion can be detected by sensing a position change within a time period that exceeds an expected amount of motion in the case of a smooth intentional change. Other techniques for be used for detecting inadvertent motion as well or alternatively.

By using a large synthetic aperture, e.g., simulated aperture generated by using multiple smaller apertures in combination and by outputting an image smaller than the maximum image size which may be captured, image adjustments, in the form of cropping and altering the point of view used for generating an image, can be used to reduce or eliminate the effect of unintended motion as a camera device is moved along a path, e.g., a path which is intended to be smooth but may be jerky or subject to unintentional changes in the actual point of view of individual optical chain modules as a result of unintended motion.

Various methods and apparatus of the present invention are directed to methods and apparatus for obtaining some or all of the benefits of using relatively large and long lens assemblies without the need for large lens and/or long lens assemblies, through the use of multiple optical chain modules in combination.

Furthermore, in at least some embodiments the benefits of using track or other camera support system can be simulated and/or at least partially obtained without the need for track or other complicated camera support/motion control systems.

Using the methods and apparatus of the present invention, a handheld camera can provide improved video generation results than might be achieved without the use of the methods described herein.

Optical chain modules including, in some embodiments, relatively short focal length lenses which require relatively little depth within a camera are used in some embodiments. While use of short focal length lens can have advantages in terms of small lens width, the methods and apparatus of the present are not limited to the use of such lenses and can be used with a wide variety of lens types. In addition, while numerous embodiments are directed to autofocus embodiments, fixed focus embodiments are also possible and supported.

An optical chain, in various embodiments, includes a first lens and an image sensor. Additional lenses and/or one or more optical filters may be included between the first lens of an optical chain module and the image sensor depending on the particular embodiment. In some cases there may be one or more optical filters before the first lens.

The use of multiple optical chain modules is well suited for use in devices such as cell phones and/or portable camera devices intended to have a thin form factor, e.g., thin enough to place in a pocket or purse. By using multiple optical chains and then combining the captured images or portions of the captured images to produce a combined image, improved images are produced as compared to the case where a single optical chain module of the same size is used.

While in various embodiments separate image sensors are used for each of the individual optical chain modules, in some embodiments the image sensor of an individual optical chain module is a portion of a CCD or other optical sensor dedicated to the individual optical chain module with different portions of the same sensor serving as the image sensors of different optical chain modules.

In various embodiments, images of a scene area are captured by different optical chain modules and then subsequently combined either by the processor included in the camera device which captured the images or by another device, e.g., a personal or other computer which processes the images captured by the multiple optical chains after offloading from the camera device which captured the images.

The combined image has, in some embodiments a dynamic range that is larger than the dynamic range of an individual image used to generate the combined image.

In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

An exemplary method of zooming video in a continuous manner, in accordance with some embodiments, includes: providing N optical chains, said N optical chains including at least a first group of optical chains and a second group of optical chains; discretely transitioning the first group of optical chains from a first fixed focal length to a second fixed focal length during a first period of time; capturing images from the second group of optical chains during said first period of time; discretely transitioning the second group of optical chains from the first fixed focal length to the second fixed focal length during a second period of time; and capturing images from the first group of optical chains during said second period of time. Various described methods and apparatus use multiple groups of lenses to support continuous zooming with a combination of digital zoom and discrete lens focal length changes.

An exemplary method of generating video from a sequence of image data captured by a camera moving along a path, in accordance with some embodiments, includes: detecting motion, e.g. tracking the path of motion, of the moving camera, said moving camera including multiple optical chains or being a light field camera (Lytro camera), said moving camera supporting image synthesis from any of a plurality of points of view within a synthetic aperture region (e.g., set of all the points of view from which an image can be synthesized by the camera) of said camera; and performing a track stabilization operation. In some such embodiments, the track stabilization operation includes: determining a sequence of points of view to be used for synthesizing a sequence of images of said video based on said path of motion; and synthesizing said sequence of images, said synthesized sequence of images based on said determined sequence of points of view. In various embodiments, the exemplary method further includes outputting said synthesized sequence of images as said video.

An exemplary camera system, in accordance with some embodiments, includes: an image capture device including a plurality of camera modules or a light field camera configured to capture a sequence of image data as the image capture device is moved along a path; a module configured to track the path of image capture device; and a track stabilization apparatus. In some such embodiments, said track stabilization apparatus includes a module configured to determine a sequence of points of view to be used for synthesizing a sequence of images of said video based on said path of motion; and a synthesization module configure to synthesize said sequence of images, said synthesized sequence of images being based on said determined sequence of points of view. In some such embodiments, the camera system further includes an output module configured to output said synthesized sequence of images as said video.

An exemplary method of generating images, in accordance with some embodiments, comprises: detecting an amount of motion, said detected amount of motion being a detected amount of motion of a camera device including multiple optical chains or a detected amount of motion between an image corresponding to a second time period and an image corresponding to a first time period; producing a second reference image, from a first plurality of images captured by different optical chains of said camera device during the second time period; and using the second reference image and at least one other image in said first plurality of images to generate a composite image corresponding to said second time period. In some such embodiments, producing a second reference image includes at least one of: i) selecting a reference image from images captured by different optical chain modules during said second time period based on the detected amount of motion or ii) synthesizing a reference image from at least two of said multiple images captured by different optical chain modules during said second time period based on the detected amount of motion.

An exemplary camera device, in accordance with some embodiments, includes: a plurality of optical chain modules; a module configured to detect an amount of motion; a module configured to produce a second reference image, from a first plurality of images (e.g., frames—one per optical chain) captured by different optical chains of said camera device during the second time period, producing a second reference image including at least one of: i) selecting a reference image from images captured by different optical chain modules during said second time period based on the detected amount of motion or ii) synthesizing a reference image from at least two of said multiple images captured by different optical chain modules during said second time period based on the detected amount of motion; and a module configured to use the second reference image and at least one other image in said first plurality of images to generate a composite image corresponding to said second time period.

Numerous additional features and embodiments are described in the detailed description which follows.

BRIEF DESCRIPTION OF THE DRAWINGS

FIG. 17D is a fourth part of a flowchart of an exemplary method of generating images in accordance with an exemplary embodiment.

DETAILED DESCRIPTION

Figure 1A:
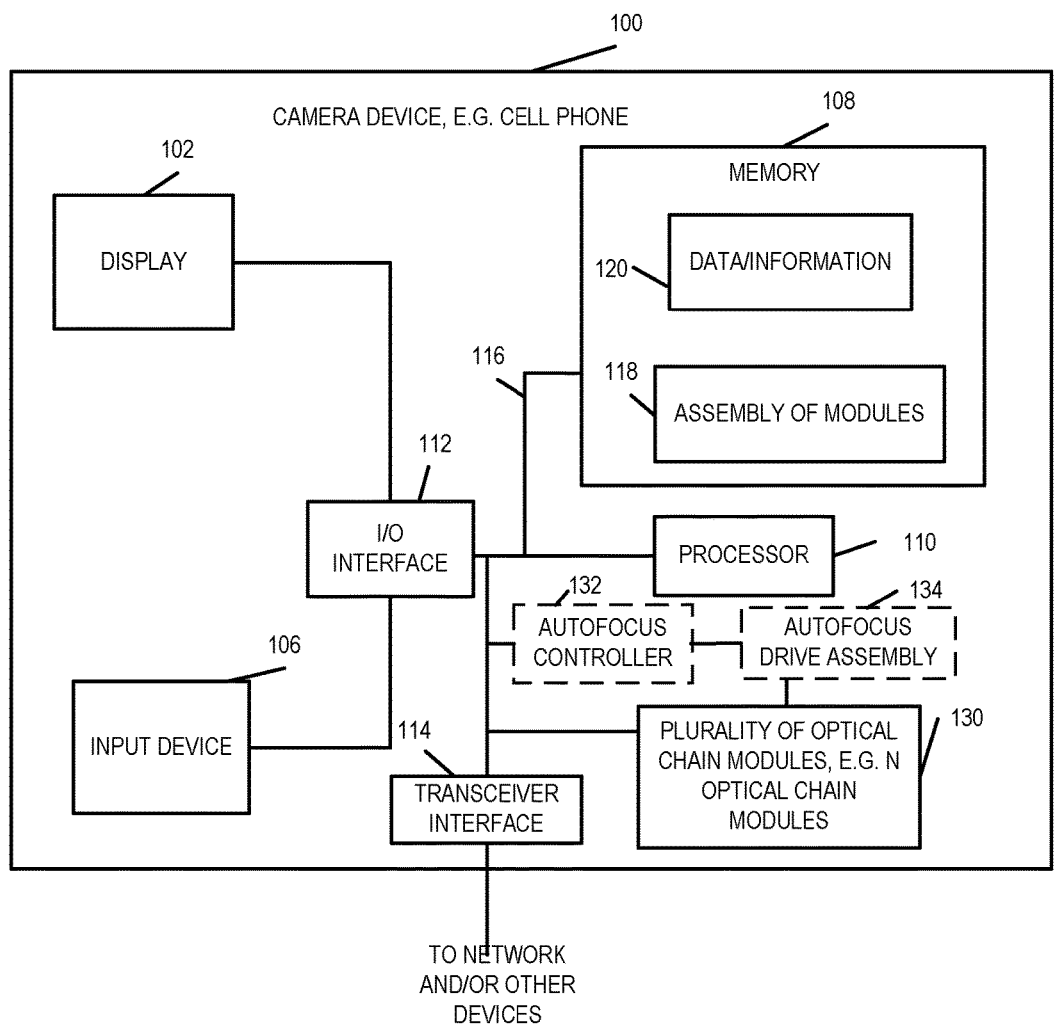
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, an input device 106, memory 108, a processor 110, a transceiver interface 114, e.g., a cellular interface, a WIFI interface, or a USB interface, an I/O interface 112, and a bus 116 which are mounted in a housing represented by the rectangular box touched by the line leading to reference number 100. The input device 106 may be, and in some embodiments is, e.g., keypad, touch screen, or similar device that may be used for inputting information, data and for instructions. The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, a transceiver interface 114, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. Transceiver interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The transceiver interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively. Dashed line 101 of FIG. 1B indicates a cross section line corresponding to the FIG. 1C view.

Box 117 represents a key and indicates that OCM=optical chain module and each L1 represents an outermost lens in an optical chain module. Box 119 represents a key and indicates that S=sensor, F=filter, L=lens, L1 represents an outermost lens in an optical chain module, and L2 represents an inner lens in an optical chain module.

Figure 1B:
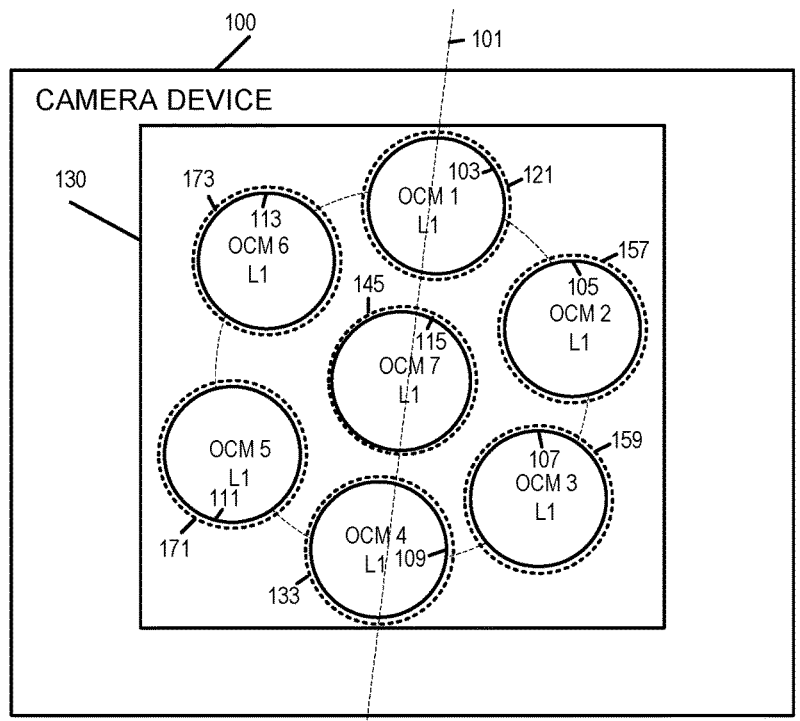
FIG. 1B illustrates a frontal view of an apparatus implemented in accordance with an exemplary embodiment of the present invention which incorporates multiple optical chain modules in accordance with the present invention with lenses which are viewable from the front of the camera.

FIG. 1B shows the front of the camera device 100. Rays of light 131, which is light toward the front of the camera assembly, shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

Figure 1C:
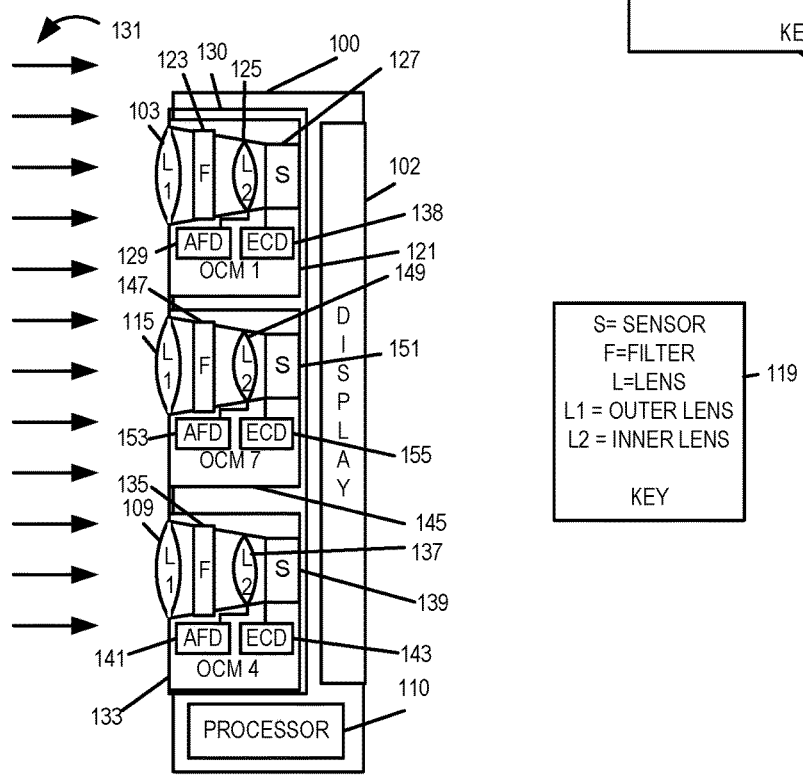
FIG. 1C, which is a side view of the exemplary apparatus of FIG. 1, illustrates further details of the exemplary apparatus.

FIG. 1C, which shows a side perspective of camera device 100, illustrates three of the seven optical chain modules (OCM 1 121, OCM 7 145, OCM 4 133) of the set of optical chain modules 130, display 102 and processor 110. OCM 1 121 includes an outer lens L1 103, a filter 123, an inner lens L2 125, and a sensor 127. OCM 1 121 further includes autofocus drive (AFD) 129 for controlling the position of lens L2 125, and exposure control device (ECD) 138 for controlling sensor 127. The AFD 129 includes a motor or other drive mechanism which can move the lens (or sensor) to which it is connected. While the AFD 129 is shown coupled, e.g., connected, to the lens L2 125 and thus can move the position of the lens L2 as part of a focus operation, in other embodiments the AFD 129 is coupled to the sensor 127 and moves the position of the sensor 127, e.g., to change the distance between the sensor 127 and the lens 125 as part of a focus operation. OCM 7 145 includes an outer lens L1 115, a filter 147, an inner lens L2 149, and a sensor 151. OCM 7 145 further includes AFD 153 for controlling the position of lens L2 149 and ECD 155 for controlling sensor 151.

OCM 4 133 includes an outer lens L1 109, a filter 135, an inner lens L2 137, and a sensor 139. The AFD 153 includes a motor or other drive mechanism which can move the lens (or sensor) to which it is connected. While the AFD 153 is shown coupled, e.g., connected, to the lens L2 149 and thus can move the position of the lens L2 as part of a focus operation, in other embodiments the AFD 149 is coupled to the sensor 151 and moves the position of the sensor 151, e.g., to change the distance between the sensor 151 and the lens 149 as part of a focus operation.

OCM 4 133 further includes AFD 141 for controlling the position of lens L2 137 and ECD 143 for controlling sensor 139. The AFD 141 includes a motor or other drive mechanism which can move the lens (or sensor) to which it is connected. While the AFD 141 is shown coupled, e.g., connected, to the lens L2 137 and thus can move the position of the lens L2 as part of a focus operation, in other embodiments the AFD 141 is coupled to the sensor 139 and moves the position of the sensor 139, e.g., to change the distance between the sensor 139 and the lens 137 as part of a focus operation.

While only three of the OCMs are shown in FIG. 1C it should be appreciated that the other OCMS of the camera device 100 may, and in some embodiments do, have the same or similar structure.

FIG. 1C and the optical chain modules (OCMs), also sometimes referred to as optical camera modules, illustrated therein are illustrative of the general structure of OCMs used in various embodiments. However, as will be discussed in detail below, numerous modifications and particular configurations are possible. Many of the particular configurations will be discussed below with use of reference to the optical camera modules shown in FIG. 1C. While reference to elements of FIG. 1C may be made, it is to be understood that the OCMs in a particular embodiment will be configured as described with regard to the particular embodiment. Thus, for example, the filter may be of a particular color. Similarly, in embodiments where the filter is expressly omitted and described as being omitted or an element which allows all light to pass, while reference may be made to the OCMs of FIG. 1C, it should be appreciated that the filter will be omitted in an embodiment where it is indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1C mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 121, 145, 133, shown in FIG. 1C will have their own optical axis which corresponds to the path light entering the particular OCM will follow as it passes from the lens 103, 115, or 109 at the front of the optical chain and passes through the OCM to the corresponding sensor 127, 151, 139.

While the processor 110 is not shown being coupled to the AFD, ECD and sensors 127, 151, 139 it is to be appreciated that such connections exist and are omitted from FIG. 1C to facilitate the illustration of the configuration of the exemplary OCMs.

As should be appreciated the number and arrangement of lens, filters and/or mirrors can vary depending on the particular embodiment and the arrangement shown in FIG. 1C is intended to be exemplary and to facilitate an understanding of the invention rather than limiting in nature.

The front of the plurality of optical chain modules 130 is visible in FIG. 1B with the outermost lens of each optical chain module appearing as a circle represented using a solid line (OCM 1 L1 103, OCM 2 L1 105, OCM 3 L1 107, OCM 4 L1 109, OCM 5 L1 111, OCM 6 L1 113, OCM 7 L1 115). In the FIG. 1B example, the plurality of optical chain modules 130 include seven optical chain modules, OCM 1 121, OCM 2 157, OCM 3 159, OCM 4 133, OCM 5 171, OCM 6 173, OCM 7 145, which include lenses (OCM 1 L1 103, OCM 2 L1 105, OCM 3 L1 107, OCM 4 L1 109, OCM 5 L1 111, OCM 6 L1 113, OCM 7 L1 115), respectively, represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain.

Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1 121, OCM 7 145, OCM 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes an auto focus drive (AFD) also sometimes referred to as an auto focus device which can alter the position of the second lens L2, e.g., move it forward or back, as part of a focus operation. An exposure control device (ECD) which controls the light exposure time of the sensor to which the ECD corresponds, is also included in each of the OCMs shown in the FIG. 1C embodiment. The AFD of each optical chain module operates under the control of the autofocus controller 132 which is responsive to user input which identifies the focus distance, e.g., by the user highlighting an object in a preview image to which the focus is to be set. The autofocus controller while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., ⅕th, 1/10th, 1/20th or even less than the overall side to side length or even top to bottom length of the camera device visible in FIG. 1B.

Figure 1D:
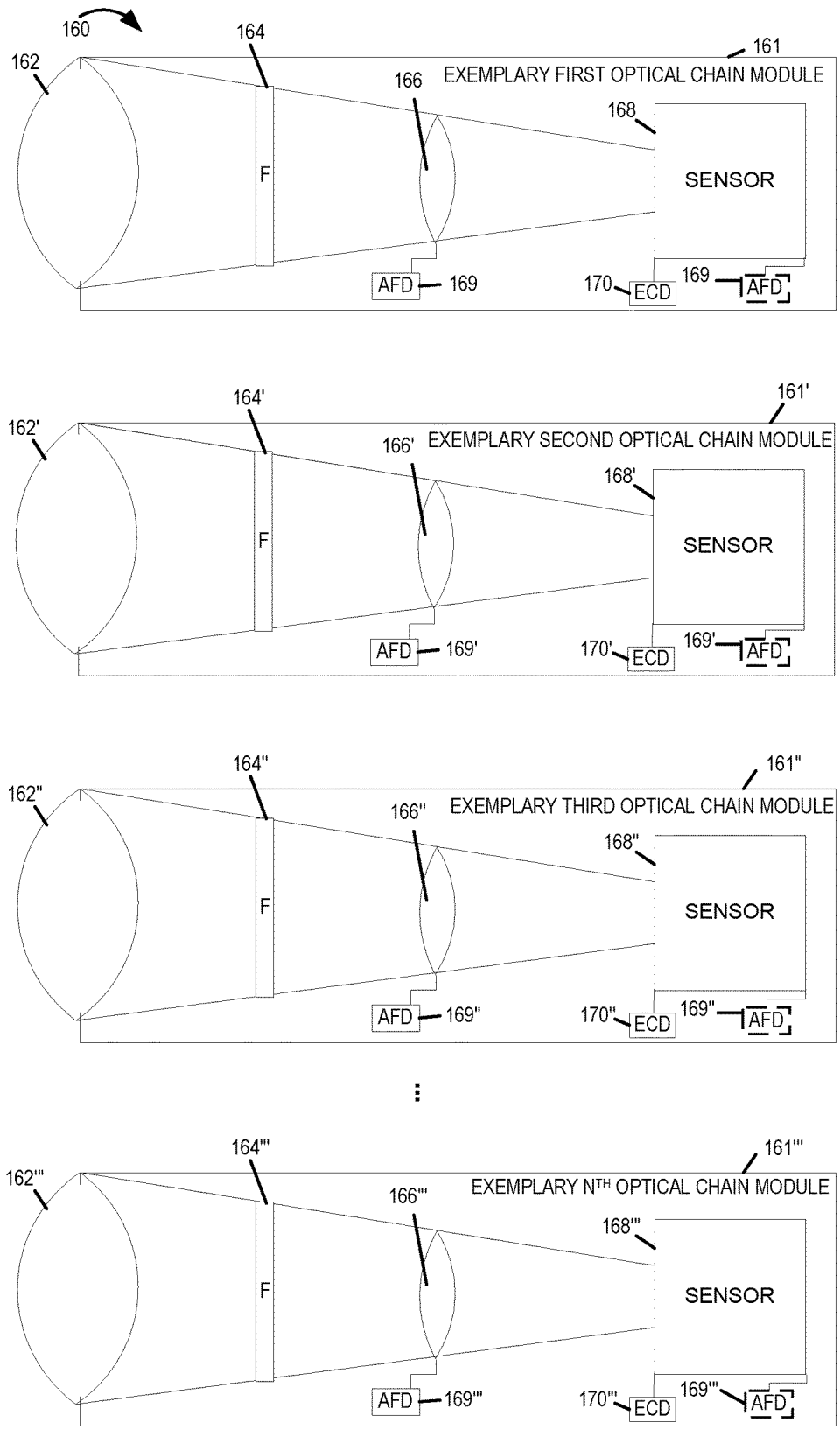
FIG. 1D illustrates a plurality of optical chain modules that can be used in an exemplary device implemented in accordance with the invention.

FIG. 1D illustrates a plurality of optical chain modules 160 that can be used in an exemplary device implemented in accordance with the invention. The optical chain modules (OCMs) shown in FIG. 1D are illustrative of the general structure of OCMs used in various embodiments. However, as will be discussed in detail below, numerous modifications and particular configurations are possible. Many of the particular configurations will be discussed below with use of reference to the optical camera modules shown in FIG. 1D to support the particular exemplary embodiments. While reference to elements of FIG. 1D may and will be made with regard to particular embodiments, it is to be understood that the OCMs in a particular embodiment will be configured as described with regard to the particular embodiment. Thus, for example, in a particular embodiment one or of the OCMS may use filters of a particular color or may even omit the filter 164, 164', 164'' or 164'''. Similarly, in embodiments where the filter is expressly omitted and described as being omitted or an element which allows all light to pass, while reference may be made to the OCMs of FIG. 1D, it should be appreciated that the filter will be omitted in such an embodiment where it is expressly indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1D mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 164, 164', 164''. 164', shown in FIG. 1C will have their own optical axis which corresponds to the path light entering the particular OCM will follow as it passes from the lens 162, 162', 162'', 162''' at the front of the optical chain and passes through the OCM to the corresponding sensor 168, 168', 168'', 168'.

The plurality of optical chain modules 160 includes N exemplary optical chain modules as illustrated in FIG. 1D where N may be any number but usually a number greater than one, and in many cases greater than 2, 6 or even a larger number. The plurality of optical chain modules 160 includes a first optical chain module (OCM) 161, a second optical chain module 161', a third optical chain module 161'', and Nth optical chain module 161'''.

Each optical chain module illustrated in FIG. 1D includes many or all of the same elements shown in each optical chain illustrated in FIG. 1C such as, e.g., optical chain module 121. The first exemplary OCM 161 includes an outer lens 162, a filter 164, an inner lens 166, a sensor 168, an auto focus drive (AFD) 169 and an exposure control device (ECD) 170. Each of the other optical chain modules include similar elements as described above with regard to the first OCM 160, with the like elements in each of the other optical chain modules being identified using a prime ('), double prime (''), or triple prime ('''). For example, the exemplary second OCM 161' includes an outer lens 162', a filter 164', an inner lens 166', a sensor 168', an auto focus drive (AFD) 169' and an exposure control device (ECD) 170', the exemplary third OCM 161'' includes an outer lens 162'', a filter 164'', an inner lens 166'', a sensor 168'', an auto focus drive (AFD) 169" and an exposure control device (ECD) 170" and so on. Similarly, the Nth OCM 161' includes an outer lens 162''', a filter 164', an inner lens 166''', a sensor 168''', an auto focus drive (AFD) 169' and an exposure control device (ECD) 170'''. The operation and functionality of each of the OCMs and their elements is the same as or similar the functionality of optical chain modules discussed earlier with respect to FIG. 1C and thus will not be repeated. Note that two versions of the AFD 169, 169', 169" or 169''' are shown in each optical chain module with the AFD connected to a lens being shown using solid lines and an alternative AFD shown using dashed lines being connected to the sensor 168, 168', 168" or 168'''. The AFD shown with dashed lines adjusts the position of the sensor 168, 168', 168" or 168''' to which it is connected as part of an autofocus operation, e.g., moving the sensor forward or backward to alter distance between the sensor and a lens. The AFD shown in solid lines is used in systems where a lens rather than a sensor is moved as part of an AFD operation. In some embodiments the AFD controls the position of a lens and/or sensor in which case the AFD module is connected to both a lens support mechanism or lens and the sensor.

The plurality of optical chain modules 160 of FIG. 1D can be used as, e.g., the plurality of optical modules 130 of the exemplary device 100 or any other device implemented in accordance with the invention. The number and particular configuration of optical chains in the step of optical chains 160 maybe as per various embodiments which will be described in the following detailed description. Accordingly, while a particular embodiment may be described in one more subsequent portions of this application, it is to be understood that the optical chains 160 may be used in such embodiments with the particular configuration of filters, lens, and element supports being as described with respect to the particular exemplary embodiment being discussed.

Figure 2:
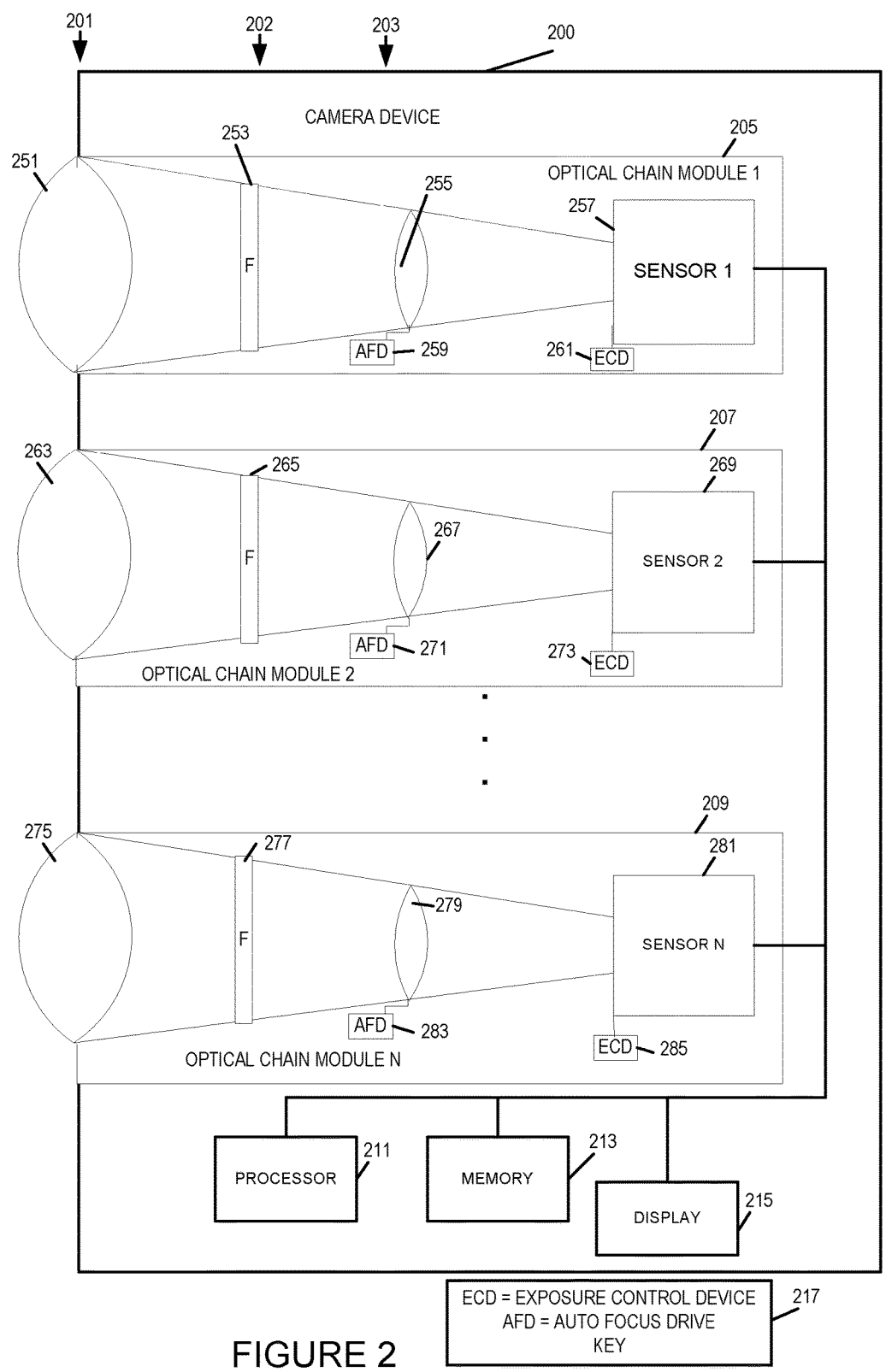
FIG. 2 illustrates a camera device implemented in accordance with one embodiment of the present invention.

FIG. 2 illustrates a camera device 200 implemented in accordance with the invention. The FIG. 2 camera device 200 includes many or all of the same elements shown in the device 100 of FIGS. 1A-1C. Exemplary camera device 200 includes a plurality of optical chain modules (OCM 1 205, OCM 2 207, . . . , OCM N 209, a processor 211, memory 213 and a display 215, coupled together. OCM 1 205 includes outer lens L1 251, filter 253, inner lens L2 255, sensor 1 257, AFD 259 and ECD 261. In some embodiments, processor 211 of camera device 200 of FIG. 2 is the same as processor 110 of device 100 of FIG. 1A, memory 213 of device 200 of FIG. 2 is the same as memory 108 of device 100 of FIG. 1A, and display 215 of device 200 of FIG. 2 is the same as display 102 of device 100 of FIG. 1A.

OCM 2 207 includes outer lens L1 263, filter 265, inner lens L2 267, sensor 2 269, AFD 271 and ECD 273. OCM N 209 includes outer lens L1 275, filter 277, inner lens L2 279, sensor N 281, AFD 283 and ECD 285. Box 217, which represents a key, indicates that ECD=exposure control device and AFD=auto focus drive.

In the FIG. 2 embodiment the optical chain modules (optical chain module 1 205, optical chain module 2 207, . . . , optical chain module N 209) are shown as independent assemblies with the autofocus drive of each module being a separate AFD element (AFD 259, AFD 271, AFD 283), respectively.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device 200 to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
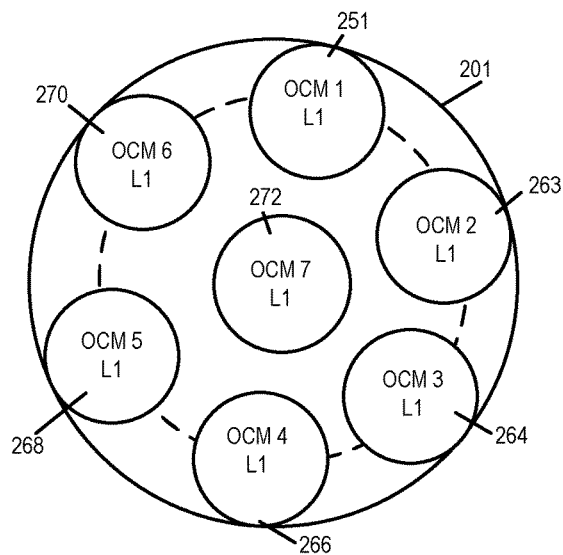
FIG. 3A shows an exemplary lens configuration which may be used for the set of outer lenses of the camera device shown in FIGS. 1A-1C.
Figure 3B:
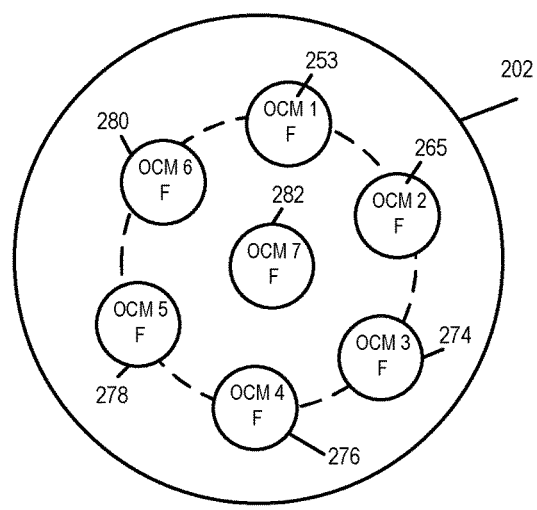
FIG. 3B illustrates an exemplary filter arrangement which is used in the camera of FIGS. 1A-1C in some embodiments.
Figure 3C:
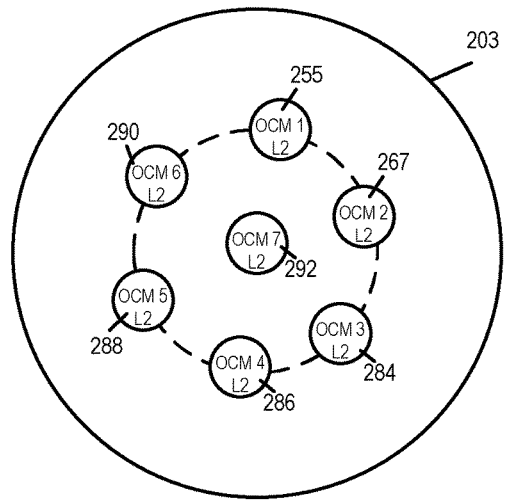
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 (OCM 1 L1 251, OCM 2 L1 263, OCM 3 L1 264, OCM 4 L1 266, OCM 5 L1 268, OCM 6 L1 270, OCM 7 L1 272) occupy much of the outer circular area corresponding to the front of the camera modules as previously shown in FIG. 1B. However, as shown in FIG. 3B the filters (OCM 1 F 253, OCM 2 F 265, OCM 3 F 274, OCM 4 F 276, OCM 5 F 278, OCM 6 F 280, OCM 7 F 282) corresponding to plane 202 occupy less space than the lenses shown in FIG. 3A while the inner lenses L2 (OCM 1 L2 255, OCM 2 L2 267, OCM 3 L2 284, OCM 4 L2 286, OCM 5 L2 288, OCM 6 L2 290, OCM 7 L2 292) shown in FIG. 3C occupy even less space. In some embodiments, where N=7, outer lens L1 275, filter F 277, and inner lens L2 279 of FIG. 2 are the same as OCM 7 L1 272 of FIG. 3A, OCM 7 F 282 of FIG. 3B and OCM 7 L2 292 of FIG. 3C, respectively.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
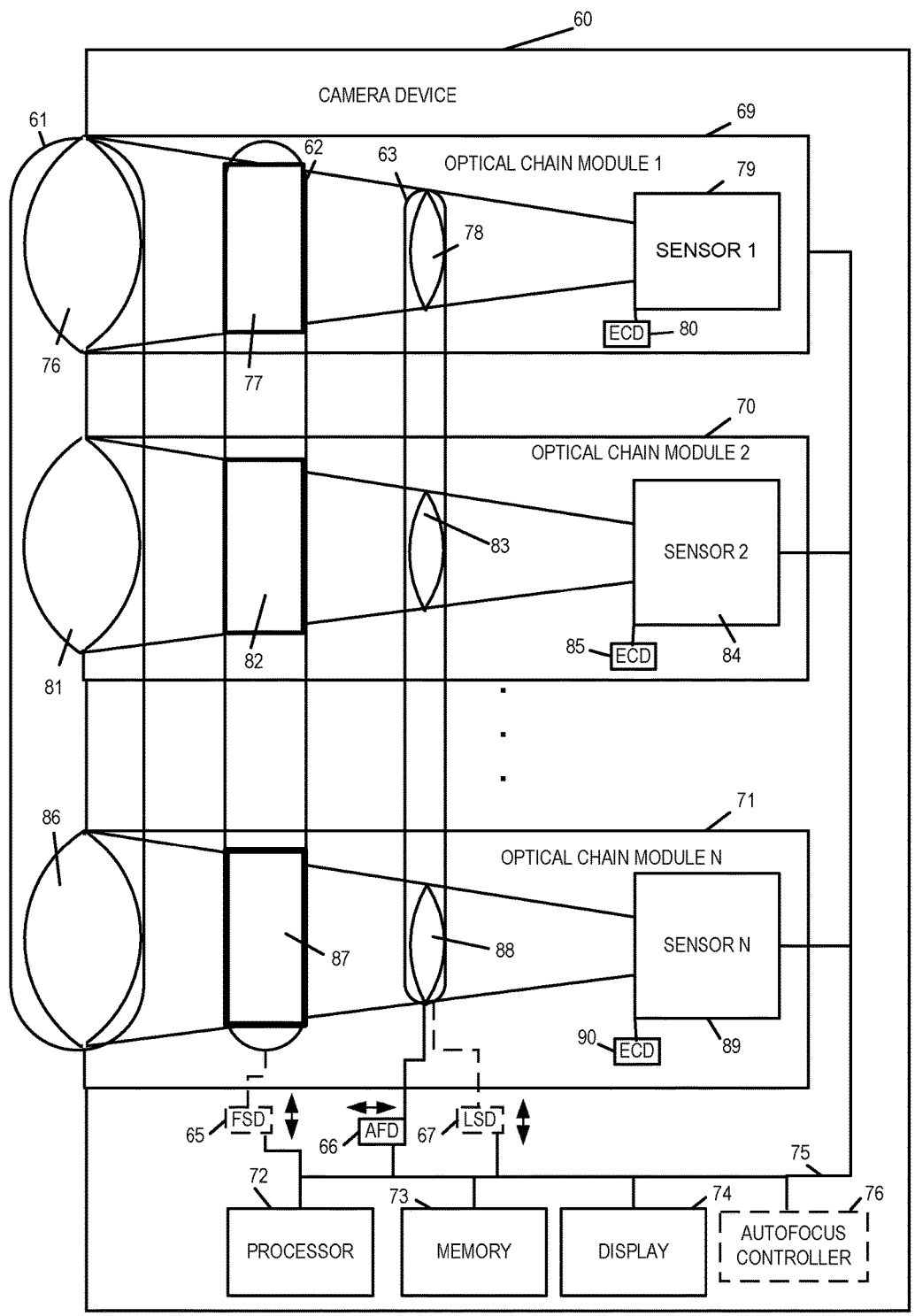
FIG. 4 illustrates an exemplary camera device in which the sets of outer lenses, filters, and inner lenses are mounted on corresponding platters.

A camera device 60 which includes platters of lenses and/or filters (61, 62, 63) is shown in FIG. 4. Camera device 60 includes a plurality of optical chain modules (optical chain module 1 69, optical chain module 2 70, . . . , optical chain module N 71), processor 72, memory 73, and display 74 coupled together via bus 75. Optical chain module 1 69 includes sensor 1 79 and ECD 80; optical chain module 2 70 includes sensor 2 84 and ECD 85; and optical chain module N 71 includes sensor N 89 and ECD 90. In some embodiments, processor 72, memory 73, display 74, and autofocus controller 76 of device 60 of FIG. 4 are the same as processor 110, memory 108, display 102, and autofocus controller 132 of device 100 of FIG. 1A.

Element 61 represents a platter of outer lenses L1 with 3 of the lenses (76, 81, 86) being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F, which include the three filters (77, 82, 87) while platter 63 includes the inner lenses L2, which include the three lenses (78, 83, 88). As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 76 which may be, and often is, included in the camera device 60. A filter shift drive (FSD) 65 is included in embodiments where shifting of the platter 62 is supported as part of a filter change operation. The FSD 65 is responsive to the processor 72 which operates in response to user selection of a particular mode of operation and/or an automatically selected mode of operation and can move the platter 62 vertically, horizontally or in some combination of vertical and horizontal motion to implement a filter change operation. The FSD 62 may be implemented with a motor and mechanical linkage to the platter 62. In some embodiments, the platter 62 may also be rotated to support changes. The rotation may be an off center rotation and/or may be performed in combination with one or more other platter position changes.

A lens shift drive (LSD) 67 is included in embodiments where shifting of the platter 63 is supported as part of a filter change operation. The LSD 67 is responsive to the processor 72 which operates in response to user selection of a particular mode of operation and/or an automatically selected mode of operation and can move the platter 63 vertically, horizontally or in some combination of vertical and horizontal motion to implement a lens change operation. The LSD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5:
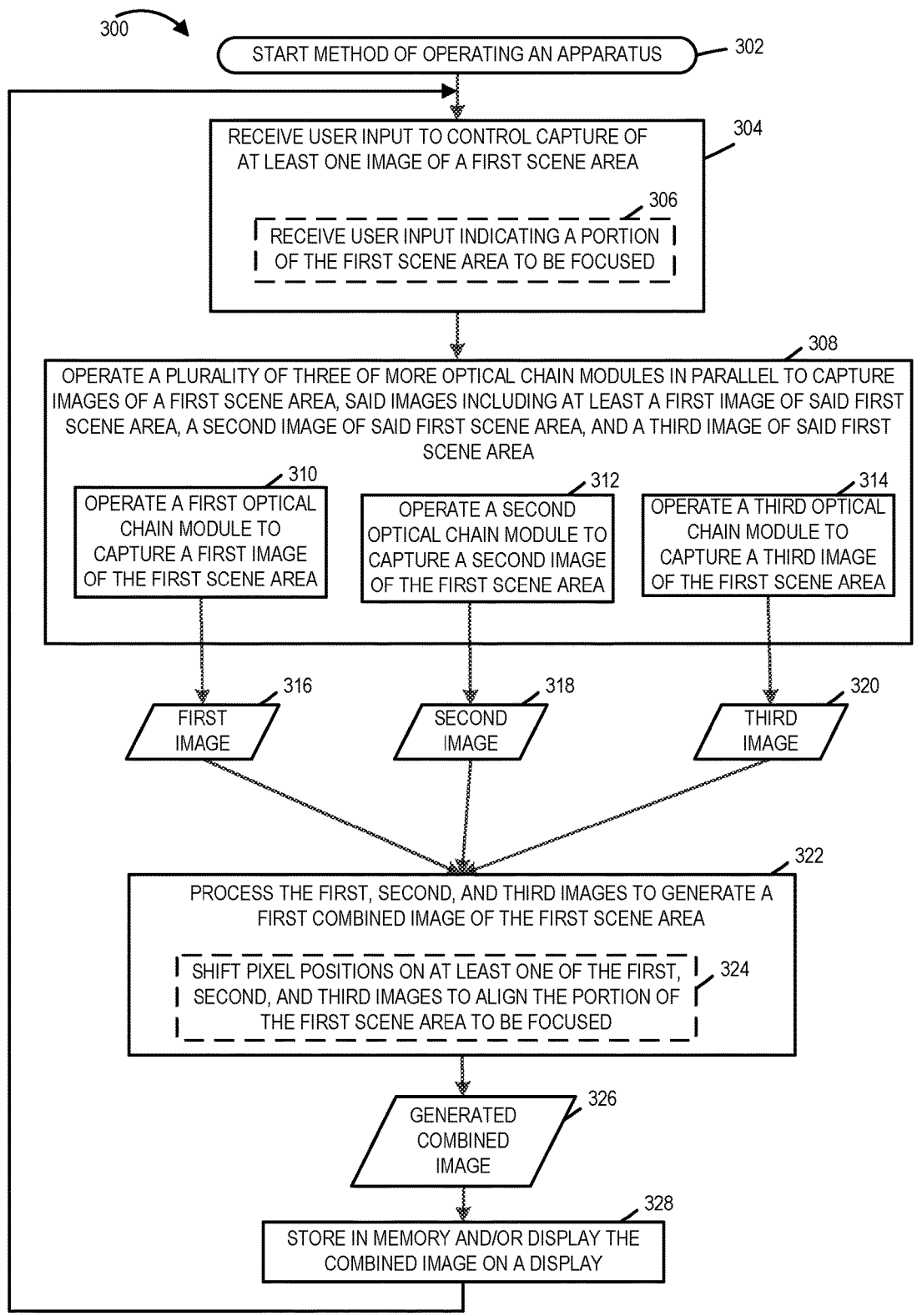
FIG. 5 illustrates an exemplary method of producing at least one image of a first scene area by operating a plurality of optical chain modules in accordance with one embodiment of the present invention.

Method 300 of FIG. 5 illustrates one exemplary method of producing at least one image of a first scene area in accordance with the present invention. The processing steps of the method 300 of FIG. 5 will now be explained in view of the camera device 100 of FIG. 1A.

The method 300 of FIG. 5 starts at start step 302 with the start of the steps of the method being implemented, e.g., on processor 110. Operation proceeds from start step 302 to step 304. In step 304, user input is received to control the capture of at least one image of the first scene area. The user input is received via input device 106 which may be, and in some embodiments is, a button or touch sensitive screen. In optional sub-step 306, the user input may, and in some embodiments does, indicate a portion of the first scene area that is to be focused, e.g., in an image to be captured or a combined image to be generated from two or more captured images. From step 304 processing proceeds to step 308.

In step 308, a plurality of three or more optical chain modules (OCMs), e.g., optical chain modules 130 of FIG. 1A, are operated in parallel to capture images of the first scene area, said images including at least a first image of said first scene area, a second image of said first scene area, and a third image of said first scene area. In some embodiments each one of the first, second and third optical chain modules captures a corresponding one of the first, second and third image respectively. In some embodiments, operating a plurality of three or more optical chain modules in parallel to capture images of the first scene area, said images including at least a first image of said first scene area, a second image of said first scene area, and a third image of said first scene area includes sub-processing steps 310, 312, and 314.

In sub-step 310 a first optical chain module is operated to capture a first image 316 of the first scene area. In most, but not all, embodiments, on capture of the first image 316, the image data and other data such as camera device configuration information associated with the first image is stored in the data/information 120 portion of memory 108 for later processing, output or display. In parallel with the processing of sub-step 310 processing of sub-steps 312 and 314 also occur. In sub-step 312 a second optical chain module is operated to capture a second image 318 of the first scene area. In most, but not all, embodiments on capture of the second image 318, the image data and other data such as camera device configuration information associated with the second image is stored in the data/information 120 portion of memory 108 for later processing, output or display. In sub-step 314 a third optical chain module is operated to capture a third image 320 of the first scene area. In most, but not all, embodiments on capture of the third image 320, the image data and other data such as camera device configuration information associated with the third image is stored in the data/information 120 portion of memory 108 for later processing, output or display. Processing then proceeds from step 308 to step 322.

In some embodiments, each optical chain module of the plurality of optical chain modules includes a lens and the lenses of the plurality of the optical chain modules are arranged along a circle. For example, when there are three optical chain modules, i.e., a first optical chain module, a second optical chain module, and a third optical chain module, the first optical chain module includes a first lens, the second optical chain module includes a second lens, and the third optical chain module includes a third lens. The first, second and third lenses are arranged uniformly along a circle, e.g. on the vertices of an equilateral triangle. In some embodiments the camera device 100 includes a fourth optical chain module including a fourth lens, said fourth lens being positioned in the center of the circle. Each of the first, second, third and fourth lens may be, and in some embodiments of the present invention are, the outer lens of each of their respective optical chain modules and are all positioned in the same plane. More generally, in some embodiments of the present invention, there are a plurality of N optical chain modules each including a lens. N−1 lenses of the plurality of optical chain modules are arranged along a circle with Nth lens being positioned in the center of the circle. FIG. 1B illustrates and example of a camera device 100 with seven optical chain modules which include 7 outer lenses shown as circles, i.e., OCM1, OCM2, OCM3, OCM4, OCM5, OCM6, and OCM7. The outer lens of optical chain modules OCM 1, OCM2, OCM3, OCM4, OCM5, and OCM6 are arranged along a circle and the outer lens of optical chain module OCM7 is positioned in the center of the circle.

In some embodiments of the present invention, the first optical chain module includes in addition to the first lens an image sensor referred to as a first image sensor. In some embodiments of the present invention, the second optical chain module includes an image sensor referred to as a second image sensor. In some embodiments of the present invention, the third optical chain module includes an image sensor referred to as a third image sensor. In some embodiments of the present invention the plurality of lenses of the plurality of optical chain modules are mounted in a cell phone housing with the plurality of lenses oriented in the same direction and in the same plane of the housing. For example in the case of three optical chain modules, in some embodiments of the present invention, the first, second and third lenses of the first, second, and third optical chain modules respectively are mounted in a cell phone housing and are oriented in the same direction and in the same plane of the housing.

In step 322, said first, second, and third images are processed by processor 110 to generate a first combined image 326 of said first scene area. In some embodiments, including those embodiments of the present invention in which user input is received indicating a portion of the first scene area to be focused in the combined image, step 322 may, and in some embodiments does, include sub-step 324 wherein pixel positions on at least one of said first, second, and third images is shifted prior to generating said first combined image to align the portion of the first scene to be focused. Processing then proceeds to step 328 where the generated combined image is stored in data/information 120 of memory 108, e.g., for potential later display, output from the camera device, and/or additional processing and/or displayed on display 102 of camera device 100.

In some embodiments, processing step 322 and/or sub-step 324 are performed on an external device such as a computer. In such cases, the first, second and third images are outputted from the camera device 100 via transceiver 114 to the external computer for processing to generate the first combined image 326. The first combined image may then be stored in memory associated with the external device and/or displayed on a display associated with the external computer. In some embodiments of the present invention, the first combined image of the first scene area includes the same or fewer pixel values than either of said first, second or third images.

From step 328 processing proceeds to step 304 where processing continues and the method is repeated.

In some embodiments of the present invention, the size of the diameter of the first, second and third lens of the first, second, and third optical chain modules respectively are the same and the sensors of the first, second and third optical chain modules have the same number of pixels. In other embodiments of the present invention, one or more optical chain modules may, and in some embodiments do, have lenses with different diameter sizes and/or sensors with different numbers of pixels. In some embodiments of the present invention, the first, second and third lenses of the first, second and third optical chain modules respectively, are less than 2 cm in diameter and each of the first, second and third image sensors of the first, second and third optical chain modules support at least 8 Mpixels. In some embodiments of the present invention, the first and second lenses are each less than 2 cm in diameter and each of the first and second image sensors support at least 5 Mpixels. However in many embodiments the image sensors support 8 Mpixels or even more and in some embodiments the lenses are larger than 2 cm. Various combinations of lens and sensors may be used with a variety of lens sizes being used for different optical chains in some embodiments. In addition different optical chains may use lenses with different shapes, e.g., while the lens may be a spherical lens the perimeter of the lens may be cut into one of a variety of shapes. In one embodiment, lenses of different optical chain modules are shaped and arranged to minimize gaps between lenses. Such an approach can have the advantage of resulting in a smoother blur with regard to portions of captured images which are out of focus when combining images captured by different optical chain modules and result in an overall image which more closely approximates what might be expected had a single large lens been used to capture the scene shown in the combined image.

In accordance with some aspects of the present invention, the diameter size and arrangement of the lenses of the plurality of optical modules may and do vary. Similarly the number of pixels supported by the sensors of each of the plurality of optical modules may also vary for example depending on the desired resolution of the optical chain module.

In some embodiments, different shifts are used for different portions of the scene to create a single composite image. In some embodiments, the generated combined image is a panoramic image.

In various embodiments, the optical chain modules are independently focused to the same focal distance. In some embodiments, the optical chain modules are focused together. In some such embodiments, the optical chain modules are focused together by moving a platter on which lenses corresponding to different optical chains are mounted.

Figure 6:
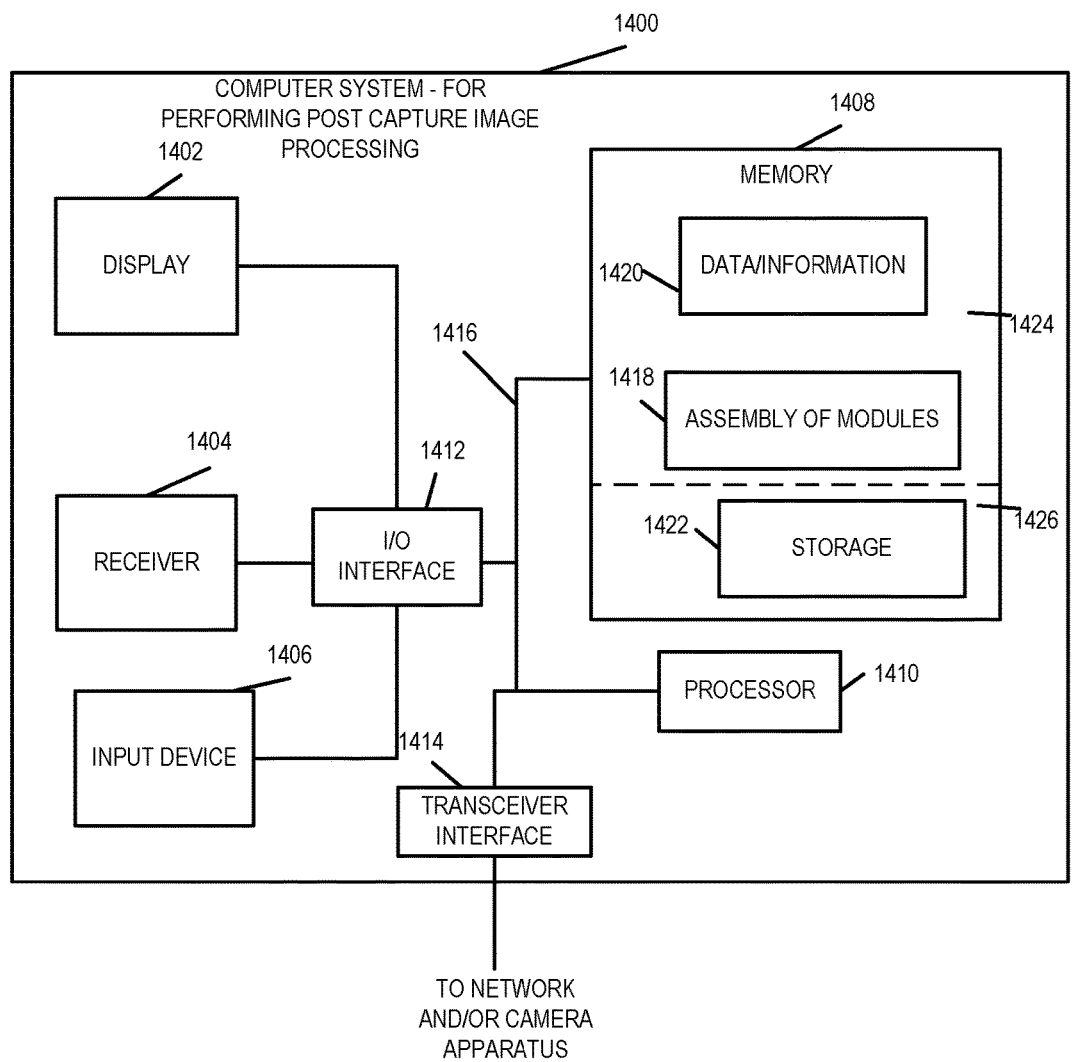
FIG. 6 illustrates a computer system which can be used for post processing of images captured using a camera device.

FIG. 6 illustrates a computer system which can be used for post processing of images captured using a camera device. The computer system 1400 includes a display 1402, Input/Output (I/O) interface 1412, receiver 1404, input device 1406, transceiver interface 1414, processor 1410 and memory 1408. Memory 1408 includes a first portion 1424 including data/information 1420 and an assembly of modules 1418, and a second portion 1426 including storage 1422. The memory 1408 is coupled to the processor 1410, I/O interface 1412 and transceiver interface 1414 via bus 1416 through which the elements of the computer system 1400 can exchange data and can communicate with other devices via the I/O interface 1412 and/or interface 1414 which can couple the system 1400 to a network and/or camera apparatus. It should be appreciated that via interface 1414 image data can be loaded on to the computer system 1400 and subject to processing, e.g., post capture processing. The images may be stored in the storage portion 1422 of memory 1408 for processing. Data/information 1420 includes, e.g., intermediate processing data and information and criteria used for processing e.g., weighting information, exposure time information, etc. The assembly of modules 1418 includes one or more modules or routines which, when executed by the processor 1410, control the computer system to implement one or more of the image processing operations described in the present application. The output of multiple optical receiver chains can be, and in some embodiments is, combined to generate one or more images. The resulting images are stored in the storage portion of the memory 1408 prior to being output via the network interface 1414, though another interface, or displayed on the display 1402. Thus, via the display 1402 a user can view image data corresponding to one or more individual optical chain modules as well as the result, e.g., image, generated by combining the images captured by one or optical chain modules.

Figure 7:
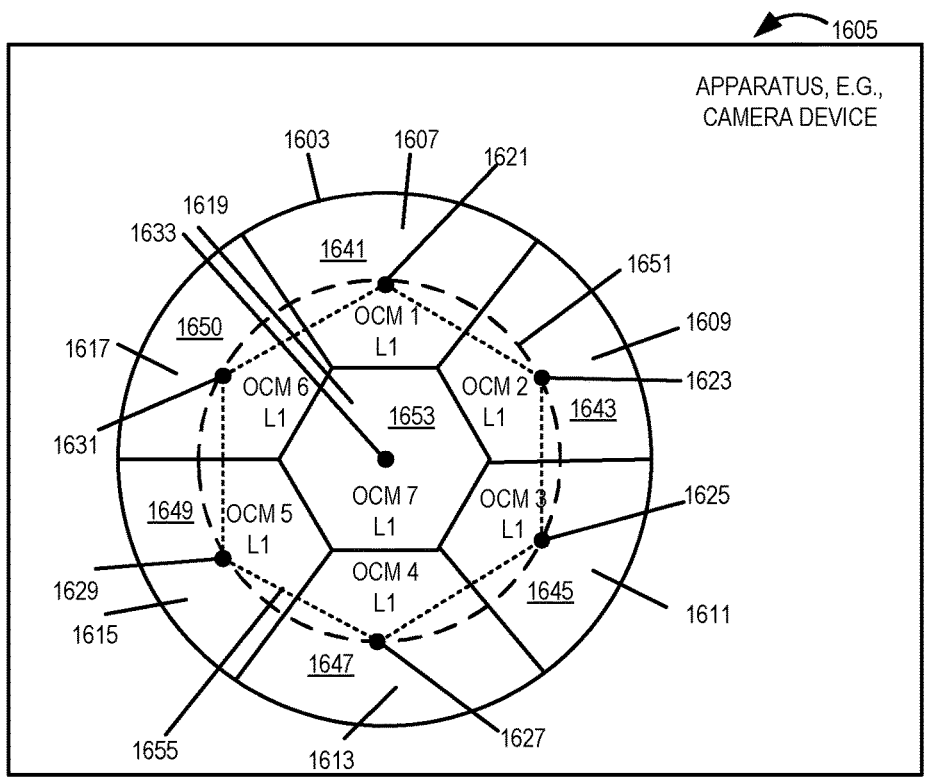
FIG. 7 illustrates a frontal view of the outer lens assembly of an apparatus implemented in accordance with one embodiment of the present invention where the apparatus incorporates multiple optical chain modules and outer lenses configured with little or no gaps between the lenses.

FIG. 7 illustrates a frontal view of the outer lenses of an apparatus 1605, e.g., a camera device, implemented in accordance with one embodiment of the present invention which incorporates multiple optical chain modules and which is designed to have little or no gaps between the outer most lenses of the different optical chain modules. The outer most lenses may be the aperture stop lenses in the FIG. 16 embodiment. Apparatus 1605 of FIG. 7 includes 7 optical chain modules OCM1, OCM2, OCM3, OCM4, OCM5, OCM6 and OCM7 with the outer lens plane corresponding to lenses L1 as viewed from the front of the camera device being shown in FIG. 7.

Figure 16:
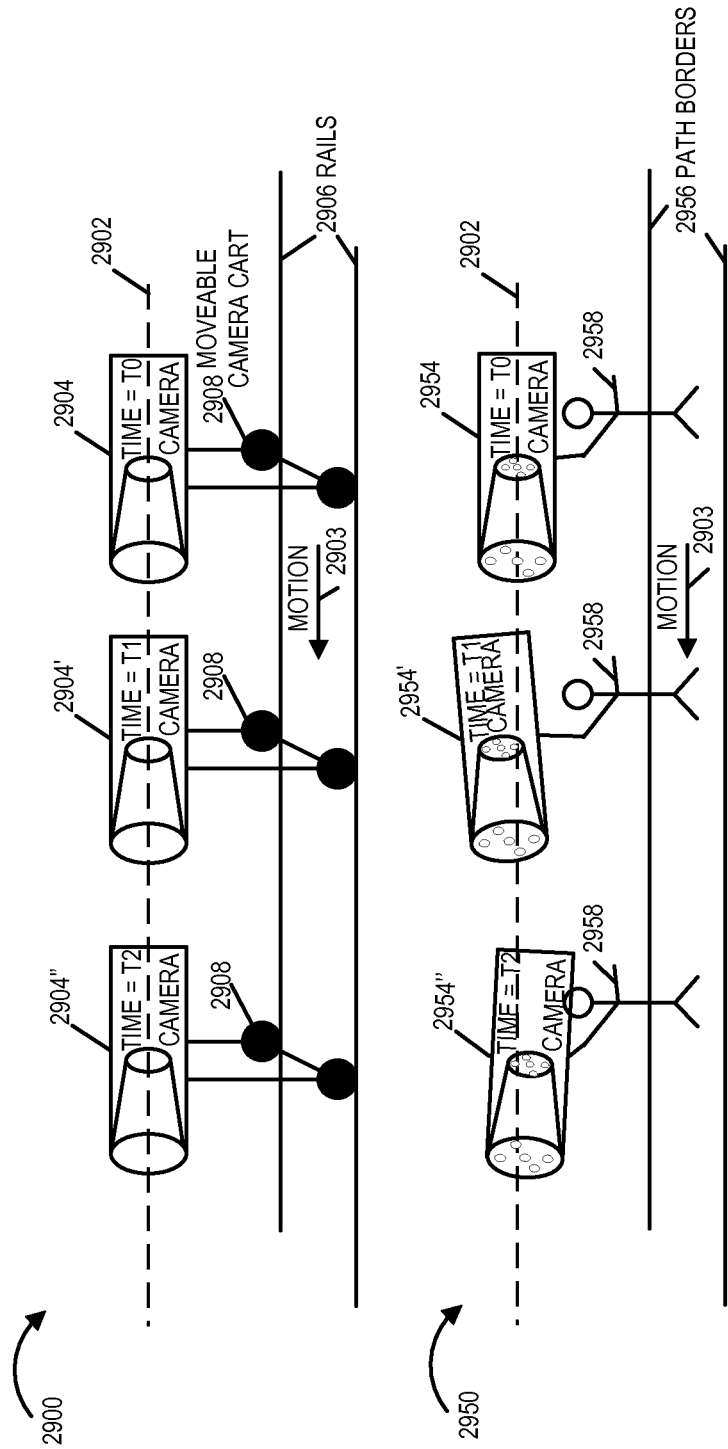
FIG. 16 illustrates an exemplary handheld camera, in accordance with an exemplary embodiment of the present invention, with multiple optical chains, with gyroscopes and with accelerometers, being moved.

The 7 optical chain modules are, e.g., optical chain modules (OCM 1 161, OCM 2 161', OCM 3 161", . . . , OCM 7 161'''), of FIG. 1D with the outer lens (OCM 1 L1 162, OCM 2 L1 162', OCM 3 L1 162", . . . , OCM 7 L1 162''') being outer lenses (OCM 1 L1 1607, OCM 2 L1 1609, OCM 3 L1 1611, . . . , OCM 7 L1 1619) of FIG. 16, respectively.

The outer lenses L1 of optical chain modules 1, 2, 3, 4, 5, and 6, OCM 1 L1 1607, OCM 2 L1 1609, OCM 3 L1 1611, OCM 4 L1 1613, OCM 5 L1 1615, OCM 6 L1 1617, are positioned so as to surround the outer lens L1 of the optical chain module 7, OCM 7 L1 1619. The outer lens L1 of the optical chain module 7 1619 being formed in the shape of a hexagon, i.e., a six sided polygon. The outer lenses L1 of optical chain modules 1, 2, 3, 4, 5 and 6 (1607, 1609, 1611, 1613, 1615, 1617) being of same shape and size and when combined with lens L1 of optical module 7 (1619) forming a circle. The optical center of each lens L1 of optical chain modules (OCM 1 L1 1607, OCM 2 L1 1609, OCM 3 L1 1611, OCM 4 L1 1613, OCM 5 L1 1615, OCM 6 L1 1617) shown as a dark solid dot (1621, 1623, 1625, 1627, 1629, 1631) on the dashed circle 1651. The optical center of lens L1 1619 of optical chain module 7 shown as a dot 1633 in the center of the hexagon and also in center of the dashed line 1651. A block separator or other light block may be used between the lenses to stop light leakage between the different lenses. The dots (1621, 1623, 1625, 1627, 1629, 1631, 1633) in FIG. 7 represent the optical center of the individual lenses (1607, 1609, 1611, 1613, 1615, 1617, 1619), respectively. In some embodiments each outermost lens is a round convex lens with its parameter cut to the shape shown in FIG. 7 so that the lenses fight closely together. The little or no gap between the front lenses, e.g., the total area of the gap between the lenses occupies less than 5% of the total area of the front area of the lens assembly, e.g., circle shown in FIG. 16, occupied by the lenses when assembled together. The lack of or small size of the gaps facilitates generating combined images with a desirable bokehs or blurs in the combined image with regard to image portions which are out of focus, e.g., in some cases without the need for extensive and potentially complex processing to generate the combined image.

In FIG. 7, circle 1603 represents a circular aperture for the camera device 1605. In other embodiments, the aperture for the camera device 1605 is a polygon shaped aperture. The plurality of lenses (1607, 1609, 1611, 1613, 1615, 1615, 1617, 1619) are configured to partition the aperture 1603 into a plurality of light capture areas (1641, 1643, 1645, 1647, 1649, 1650, 1653), occupying substantially the entire area of the first aperture.

In some embodiments, the seven optical chains included in camera device 1605 are the N optical chains (161, 161', 161" . . . , 161'''), where N=7, where the outer lenses configuration of FIG. 16 is used. For example, OCM 1 L1 162 of FIG. 1D is OCM L1 1607 of FIG. 16, OCM 2 L1 162' of FIG. 1D is OCM 2 L1 1609 of FIG. 16, OCM 3 L1 162" of FIG. 1D is OCM 3 L1 1611 of FIG. 16, . . . , and OCM N L1 162''' of FIG. 1D is OCM 7 L1 1619 of FIG. 16.

In various embodiments, the sensor included in each optical chain in camera device 1605 is a semiconductor sensor. In various embodiments, first aperture of camera device 1605 is one of a circular or polygon shaped aperture. The first aperture of camera device 1605 corresponds to circle 1603. In some other embodiments, the first aperture corresponds to a polygon, e.g., a polygon approximately the same size as circle 1603. In some embodiments, the polygon fits inside circle 1603. In some embodiments, the polygon is a regular polygon.

The lenses (1607, 1609, 1611, 1613, 1615, 1617) in said plurality of lenses (1607, 1609, 1611, 1613, 1615, 1617, 1619) which are arranged along the perimeter of said first aperture 1603 have optical centers (1621, 1623, 1625, 1627, 1629, 1631) which are arranged along a circle 1651. The lenses (1607, 1609, 1611, 1613, 1615, 1617) in said plurality of lenses (1607, 1609, 1611, 1613, 1615, 1617, 1619) which are arranged along the perimeter of said first aperture 1603 have optical centers (1621, 1623, 1625, 1627, 1629, 1631) which form the vertices (corners) of a regular polygon 1655.

The plurality of lenses (1607, 1609, 1611, 1613, 1615, 1617, 1619) includes at least one inner lens 1619 in addition to said lenses (1607, 1609, 1611, 1613, 1615, 1617) arranged along the perimeter of said first aperture 1603. The plurality of lenses (1607, 1609, 1611, 1613, 1615, 1617, 1619) includes a total of six lenses (1607, 1609, 1611, 1613, 1615, 1617) along the perimeter of said first aperture 1603 and a single lens (1619) in the center of said six lenses (1607, 1609, 1611, 1613, 1615, 1617) arranged along the perimeter of said first aperture 1603.

The non-circular aperture of each of said plurality of lenses (1607, 1609, 1611, 1613, 1615, 1617, 1619) is an aperture stop in a corresponding optical chain.

Each lens in said plurality of lenses (1607, 1609, 1611, 1613, 1615, 1617, 1619) is part of a corresponding optical chain, each individual optical chain includes a separate sensor for capturing an image corresponding to said individual optical chain.

Apparatus 1605, e.g., a camera device, further includes a module for combining images captured by separate optical chains into a single combined image. In various embodiments, the combining images, e.g., performed by a module for combining images, includes a shift and add based on the position of lenses in said plurality of lenses (1607, 1609, 1611, 1613, 1615, 1617, 1619).

Camera device 1605 further includes additional elements shown in FIG. 1A including a processor, a memory and a display.

Figure 8:
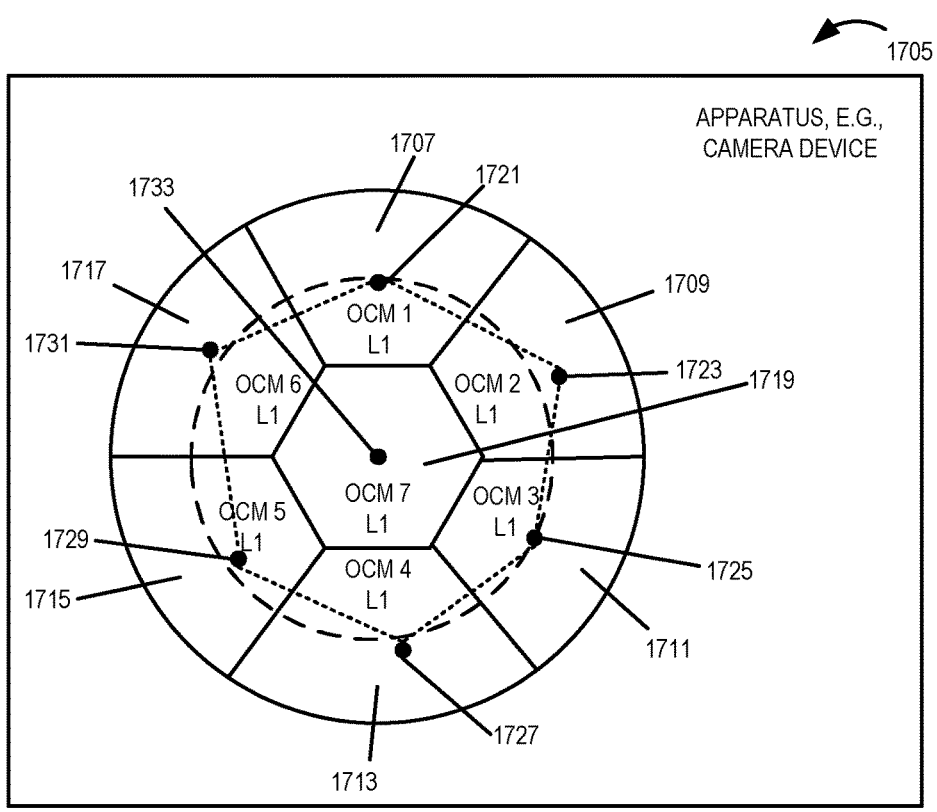
FIG. 8 illustrates a frontal view of the outer lenses of a lens assembly implemented in accordance with one embodiment of the present invention where the apparatus incorporates multiple optical chain modules with lenses configured with little or no gaps between the lenses but non-uniform spacing between the optical centers of at least some of the lenses.

FIG. 8 illustrates a frontal view of the outer lenses of an apparatus 1705 implemented in accordance with one embodiment of the present invention which incorporates multiple optical chain modules and outer lenses, e.g., the aperture stop lens for each of the corresponding optical chains, arranged to have non-uniform spacing between the optical centers of the lenses. Thus the FIG. 8 embodiment is similar to the FIG. 7 embodiment but with non-uniform spacing of the optical centers of lenses along the outer parameter of the lens assembly. The non-uniform spacing facilitates depth of field determinations particularly when performing block processing and the entire field of view may not be under consideration when processing a block or sub-portion of the captured field of view. The optical chain modules shown in FIGS. 7 and 8 are the same or similar to those previously described with reference to FIG. 3 but differ in terms of lens shape, size and/or configuration. The dots (1721, 1723, 1725, 1727, 1729, 1731, 1733) in FIG. 8 represent the optical center of the individual lenses (1707, 1709, 1711, 1713, 1715, 1717, 1719), respectively.

Figure 9:
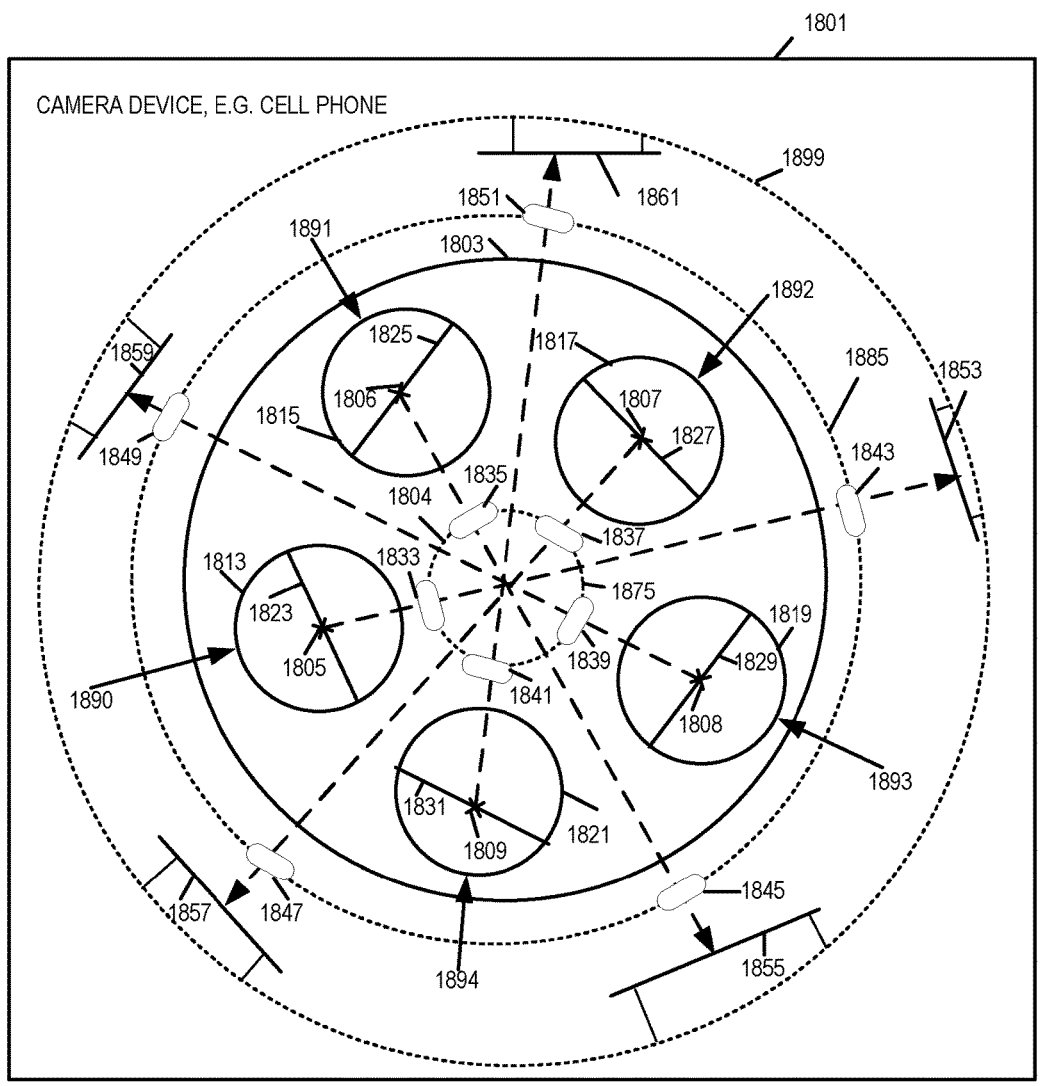
FIG. 9 illustrates a camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.

FIG. 9 illustrates another exemplary camera device 1801 including a plurality of first through fifth optical chain modules (1890, 1891, 1892, 1893, 1894) each of which includes an outer lens (1813, 1815, 1817, 1819, 1821), respectively, represented as a circle on the outer lens platter 1803. Each outer lens (1813, 1815, 1817, 1819, 1821) has an optical axis (1805, 1806, 1807, 1808, 1809), respectively. The optical axis (1805, 1806, 1807, 1808, 1809) is represented by an X, indicating that the axis goes down into the lens (1813, 1815, 1817, 1819, 1821). The optical axis (1805, 1806, 1807, 1808, 1809), are parallel to each other. In both FIGS. 18 and 19 arrows made of dashed lines represent the path of light for the corresponding optical chain module after light which entered the outer lens along the optical axis of the outer lens is redirected by the mirror or other light redirection device. Thus, the arrows represents the direction and general light path towards the sensor of the optical chain to which the arrow corresponds. In various embodiments, the image deflection element, e.g., a mirror, of the optical chain changes the direction of the optical rays passing along the optical axis of the outer lens by substantially 90 degrees to direct the optical rays passing along the optical axis onto the sensor. For example, with regard to optical chain 1890, the image deflection element 1823, e.g., a mirror, of the optical chain 1890 changes the direction of the optical rays passing along the optical axis 1805 of the outer lens 1813 by substantially 90 degrees to direct the optical rays passing along the optical axis onto the sensor 1853.

In the FIG. 9 embodiment each of the optical chain modules (1890, 1891, 1892, 1893, 1894) includes, in addition to an outer lens (1813, 1815, 1817, 1819, 1821,) a mirror or other device, e.g., prism, (1823, 1825, 1827, 1829, 1831), respectively, for changing the angle of light received via the corresponding outer lens (1813, 1815, 1817, 1819, 1821), respectively. Additionally, as in some of the previously described embodiments such as the FIGS. 1A, 1B, 1C, 1D, and 3 embodiments, each optical chain module (1890, 1891, 1892, 1893, 1894), includes a filter (1833, 1835, 1837, 1839, 1841), respectively, and an inner lens (1843, 1845, 1847, 1849, 1851), respectively. In addition each optical chain module (1890, 1891, 1892, 1893, 1894) includes a sensor (1853, 1855, 1857, 1859, 1861), respectively. For example, the first optical chain module (OCM 1 1890) include outer lens L1 1813, mirror 1823, filter 1833, inner lens L2 1843 and sensor 1853.

Filters 1833, 1835, 1837, 1839, and 1841 are mounted on a movable cylinder 1875 represented as a circle shown using small dashed lines. The cylinder 1875 may be rotated and/or moved forward or backward allowing lenses and/or filters on the cylinder to be easily replaced with other lenses, filter, or holes mounted on the cylinder 1875. While in the FIG. 9 example, an exit hole is provided to allow light to exit cylinder 1875 after passing through one of the filters 1833, 1835, 1837, 1839, or 1841 it should be appreciated that rather than an exit hole another lens or filter may be mounted on the cylinder 1875 allowing two opportunities for the light to be filtered and/or passed through a lens as is passes through the cylinder 1875. Thus, in at least some embodiments a second filter or lens which is not shown in FIG. 18 for simplicity is included at the exit point for the light as it passes through cylinder 1804. Inner lenses are mounted on cylinder 1885 which is actually closer to the outside sidewalls of the camera device 1801 than the filters mounted on cylinder 1875. Given the large diameter of movable cylinder 1885 and the relatively small diameter of the light beam as it nears the sensor, it should be appreciated that a large number of alternative filters, lenses and/or holes can be mounded on cylinder 1885. As with cylinder 1875 the light can be filtered and/or processed by a lens as it enters and leaves cylinder 1885 prior to reaching the sensor of the corresponding optical chain.

In some embodiments lenses mounted on a moveable platter positioned between the outer lens platter 1803 and mirrors which may, and in some embodiments are, also mounted on a platter are used to support autofocus. In such an embodiment the lens platter between the outer lens platter and mirror platter is moved in or out to perform focus operations for each of the optical chain modules in parallel. In another embodiment, different sets of lens are mounted on the drum 1885 or 1875 with different lens sets being mounted with a different offset distance from the surface of the drum. By switching between the different sets of lenses by rotating the drum on which the different lens sets are mounted, focusing between different predetermined focus set points can, and in some embodiments is achieved, by simply rotating the drum on which the lens sets, corresponding to the different focal distance set points, are mounted.

Notably, the FIG. 9 embodiment, by changing the direction of light through the use of mirrors, prisms and/or other devices allows for the length of the individual optical chains to be longer than the camera device is thick. That is, the side to side length of the camera device 1801 can be used in combination with a portion of the front to back length to create optical chains having a length longer than the depth of the camera device 1801. The longer optical chain length allows for more lenses and/or filters to be used as compared to what may be possible with shorter optical chain lengths. Furthermore, the change in the direction of light allows for the use of cylinders for mounting lenses, filters and/or holes which can be easily interchanged by a simple rotation or axial, e.g., front to back movement, of the cylinder on which the lenses, filters and/or holes corresponding to multiple optical chains are mounted.

In the FIG. 9 embodiment sensors may be fixed and/or mounted on a movable cylinder 1899. Thus, not only can the lenses, filters and/or holes be easily switched, changes between sensors or sets of sensor can be easily made by rotating the cylinder on which the sensors are mounted. While a single mirror is shown in FIG. 9 in each optical chain module, additional mirrors may be used to further extend the length of the optical path by reflecting in yet another direction within the housing of the camera device 1801.

It should be appreciated that the FIG. 9 embodiment allows for a combination of lens, filter, and/or hole mounting platters arranged parallel with the platter extending left to right within the camera device and cylinders arranged so that the top and bottom of the cylinder extend in the front to back direction with respect to the camera body, e.g., with the front of the camera being shown in FIG. 9. Cylinders may be mounted inside of one another providing a large number of opportunities to mount lens, filters and/or holes along the optical paths of each optical chain module and allowing for a large number of possible filter/lens/sensor combinations to be supported, e.g., by allowing for different combinations of cylinder positions for different modes of operation.

While changing sensors mounted on a cylinder can be achieved by rotating a cylinder, in the earlier embodiments in which sensors may be mounted on platters, sensors may be changed by rotating or otherwise moving a platter on which the sensors are mounted.

Note that in the FIG. 9 embodiment the outer lenses (1813, 1815, 1817, 1819, 1821, of the optical chain modules (1890, 1891, 1892, 1893, 1894), respectively, are mounted near the center of the front of the camera device 1801 as shown, e.g., forming a generally circular pattern of outer lenses 1813, 1815, 1817, 1819, 1821.

In camera device 1801 the optical axes (1805, 1806, 1807, 1808, 1809) of lenses (1813, 1815, 1817, 1819, 1821) said optical chain modules (1890, 1891, 1892, 1893, 1894) are parallel to each other but at least two mirrors (1823, 1825) corresponding to different optical chains (1890, 1891) are not parallel. The light rays of at least two different optical chains (1890, 1891) cross prior to reaching the sensor (1853, 1855) to which the rays of said at least two different optical chain modules (1890, 1891) correspond.

In various embodiments, each optical chain module (1890, 1891, 1892, 1893, 1894) includes an image deflection element which includes at least one mirror positioned at 45 degree to said optical axis (1890, 1891, 1892, 1893, 1894) of said lens of the optical chain module. For example, with regard to optical chain module 1 1890, in one embodiments, the image deflection element 1823 is a mirror positioned at 45 degree to the optical axis 1805 of lens 1813.

In some embodiments, an image deflection element, e.g., image deflection element 1823 includes a prism. In some embodiments, an image deflection element includes multiple mirrors. In some embodiments, an image deflection element includes a combination including at least one mirror and at least one prism.

Figure 10:
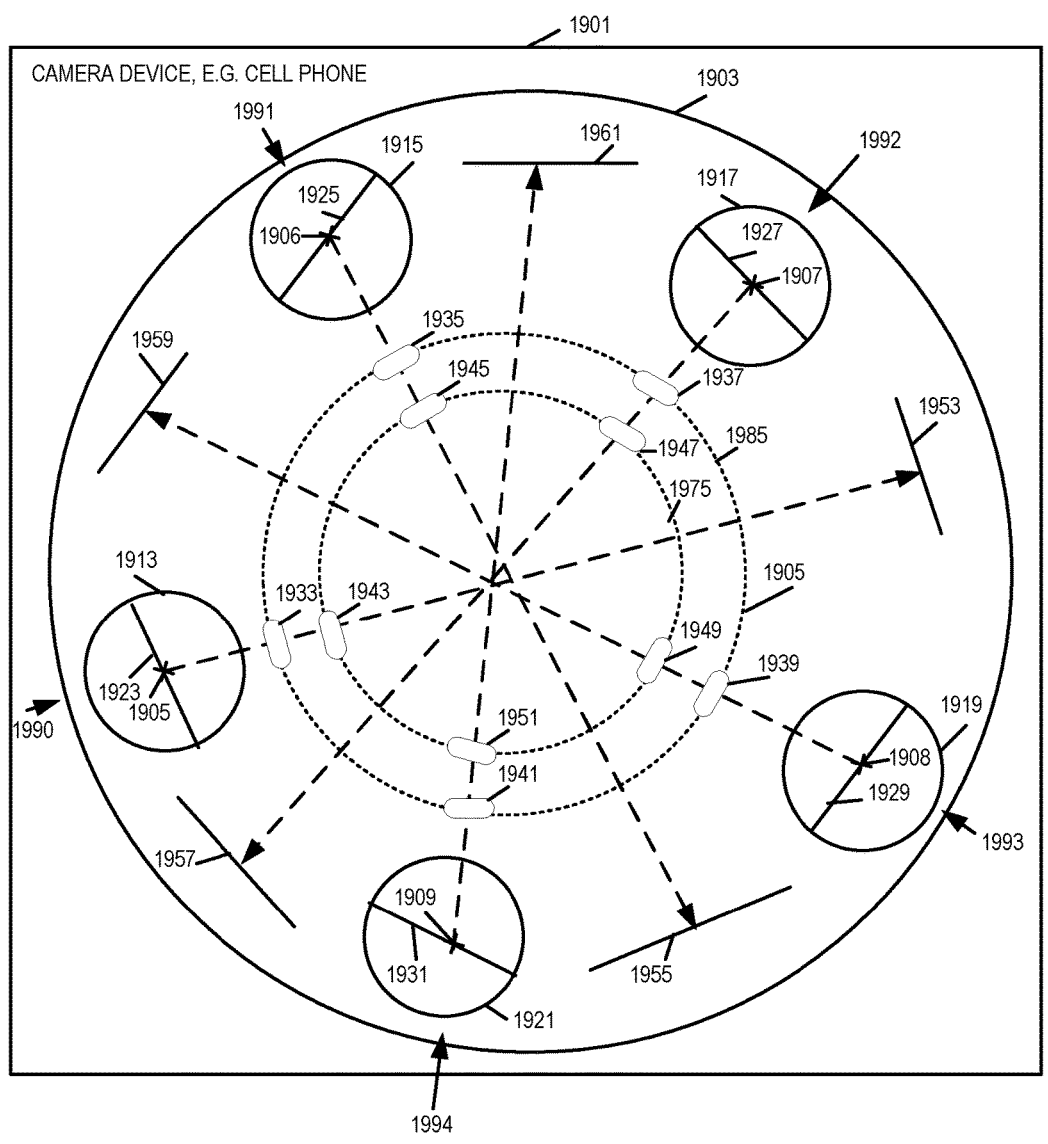
FIG. 10 illustrates another camera device including a plurality of optical chain modules which includes mirrors or another device for changing the angle of light entering the optical chain module and thereby allowing at least a portion of the optical chain module to extend in a direction, e.g., a perpendicular direction, which is not a straight front to back direction with respect to the camera device.

FIG. 10 is similar to the FIG. 9 embodiment in that it illustrates another camera device 1901 including a plurality of optical chain modules which include mirrors or another device for changing the angle of light entering the optical chain module and thereby allowing at least a portion of the optical chain module to extend in a direction, e.g., a perpendicular direction, which is not a straight front to back direction with respect to the camera device. FIG. 10 illustrates another exemplary camera device 1901 including a plurality of first through fifth optical chain modules (1990, 1991, 1992, 1993, 1994) each of which includes an outer lens (1913, 1915, 1917, 1919, 1921), respectively, represented as a circle on the outer lens platter 1903. FIG. 10 differs from the FIG. 9 embodiment in that the outer lenses (1913, 1915, 1917, 1919, 1921) of the first through fifth optical chain modules (1990, 1991, 1992, 1993, 1994) are positioned near the perimeter of the face of the camera device 1901. This allows for the length of the optical chain module to be longer than the length of the optical chains shown in FIG. 9. FIG. 10 shows outer and inner cylinders, also some times referred to as drums, 1975, 1985, upon which filters, lenses and holes can and in various embodiments are mounted as discussed with regard to the FIG. 9 embodiment. Thus cylinders 1975 and 1985 server the same or similar purpose served by cylinders 1875, 1885, respectively. It should be appreciated that in some embodiments the FIG. 10 embodiment includes filters and lenses mounted on the inner and outer cylinders in the same or similar manner as filters and lenses are mounted on the cylinders 1875, 1885 shown in FIG. 9.

Figure 18A:
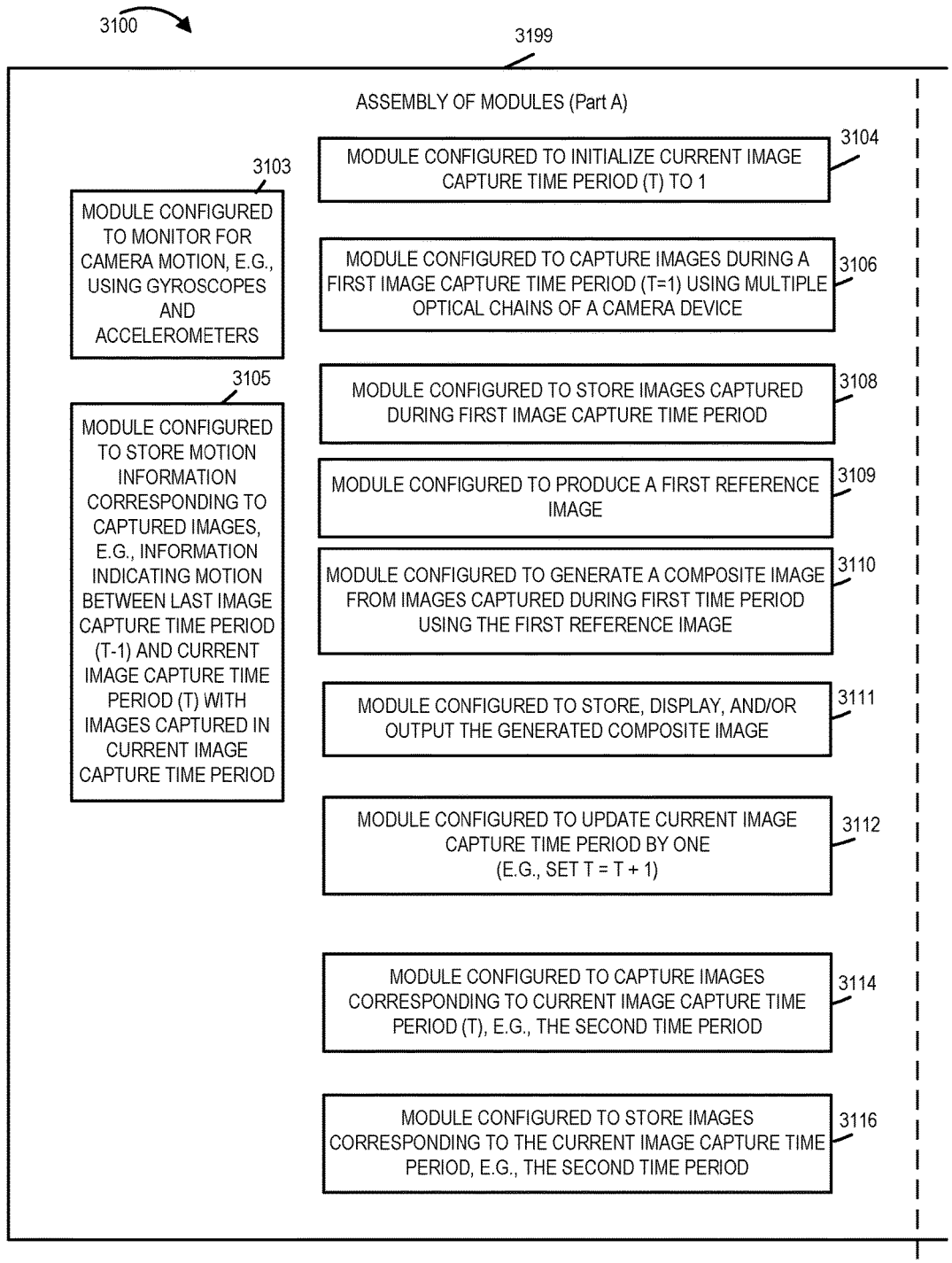
FIG. 18A is a first portion of an assembly of modules which may be used in accordance with one or more exemplary embodiments.
Figure 18B:
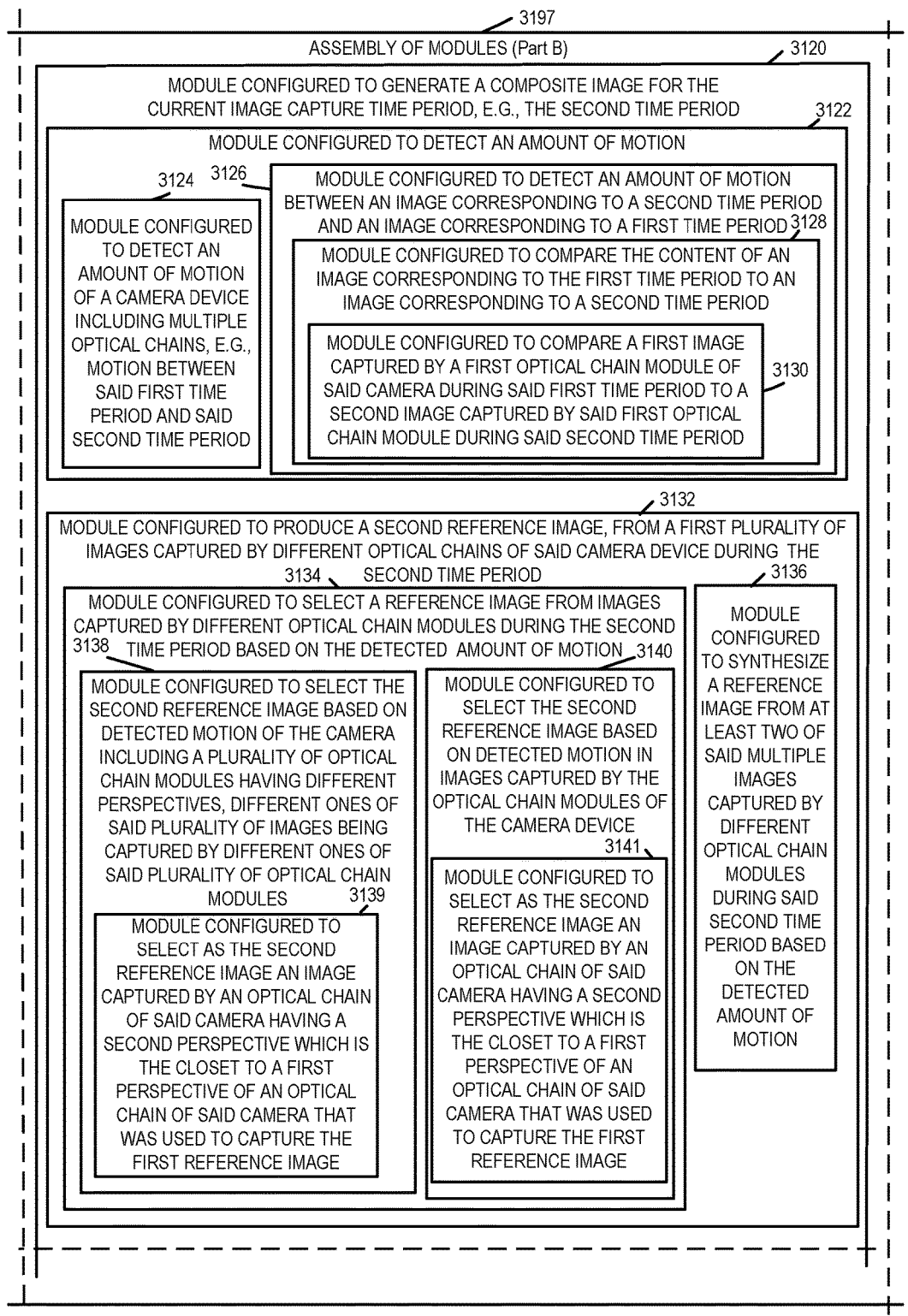
FIG. 18B is a second portion of the assembly of modules which may be used in accordance with one or more exemplary embodiments.
Figure 18C:
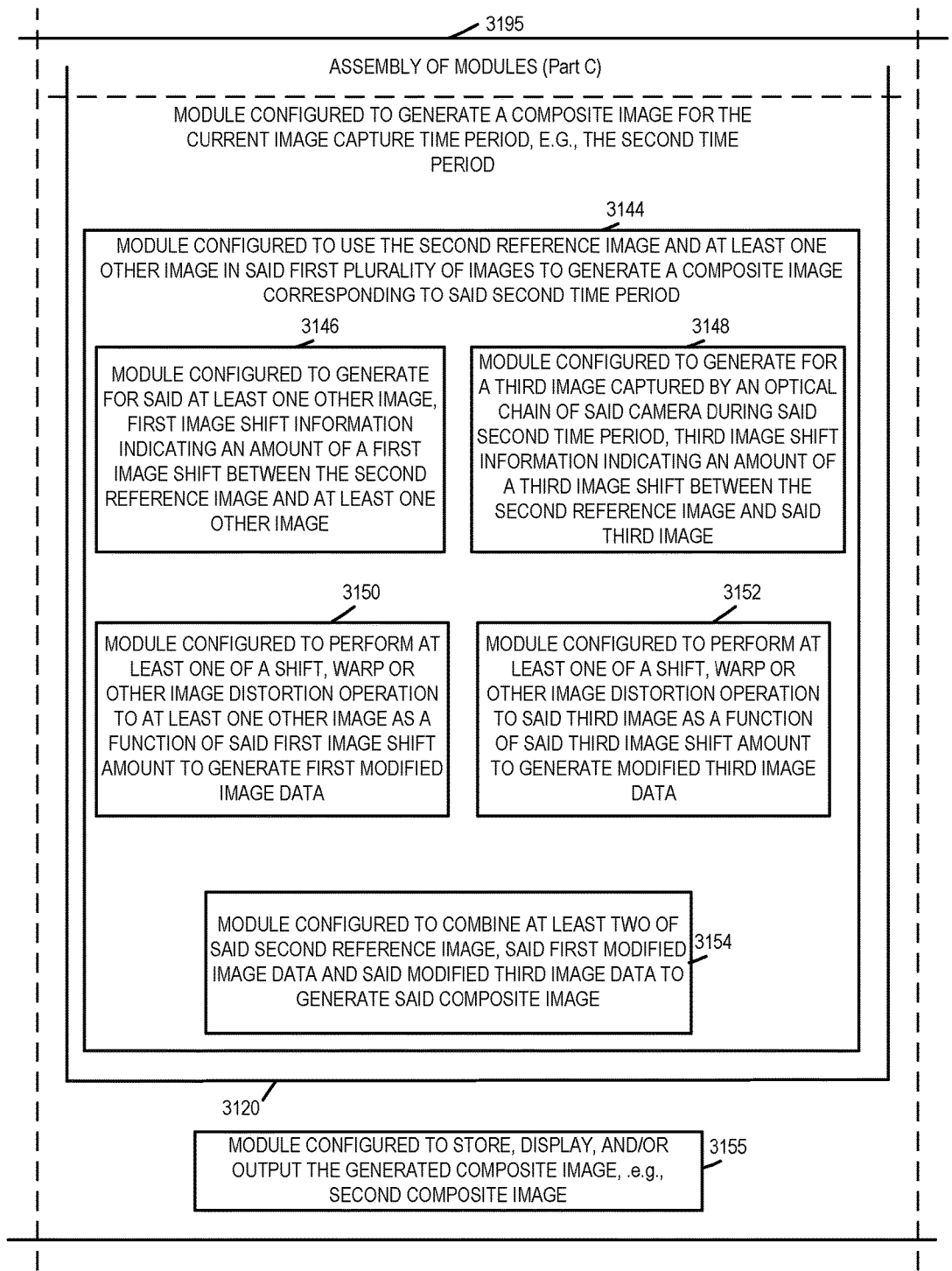
FIG. 18C is a third portion of the assembly of modules which may be used in accordance with one or more exemplary embodiments.
Figures 18, 18D:
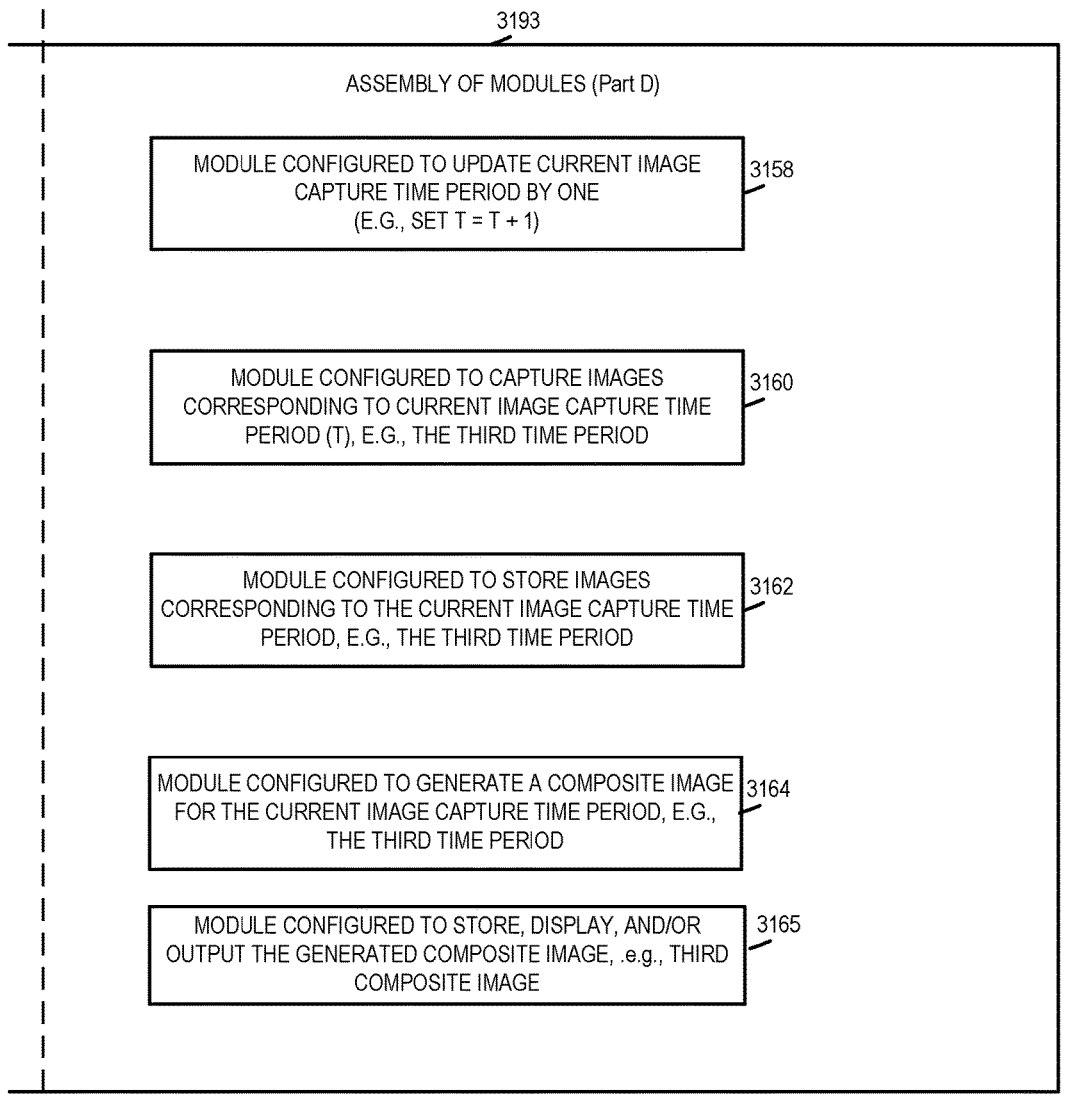
FIG. 18D is a fourth portion of the assembly of modules which may be used in accordance with one or more exemplary embodiments.

Elements of the FIG. 10 embodiment which are the same or similar to the elements of the FIG. 18 embodiment are identified beginning with "19" instead of "18" and for the sake of brevity will not be described again in detail. For example element 1961 is used to refer to the sensor for the optical chain module 1994 which includes outer lens 1921, mirror/light redirection device 1931, filter 1941 and inner lens 1951. The cylinder 1975 is used to mount the filters while cylinder 1985 is used to mount the inner lenses.

Each outer lens (1913, 1915, 1917, 1919, 1921) has an optical axis (1905, 1906, 1907, 1908, 1909), respectively. The optical axis (1905, 1906, 1907, 1908, 1909) is represented by an X, indicating that the axis goes down into the lens (1913, 1915, 1917, 1919, 1921). The optical axis (1905, 1906, 1907, 1908, 1909), are parallel to each other.

The camera devices 1801 and 1901 may, and in some embodiments do, include a processor, display and/or other components of the camera device shown in FIG. 1A but such elements are not explicitly shown in the FIGS. 9 and 10 embodiments to avoid complicating the figures and being repetitive.

Various functions of the present invention may be and are implemented as modules in some embodiments. An assembly of modules, e.g., software or hardware modules, may be and are used for performing various functions of a image processing system or apparatus used to process images in accordance with embodiments of the present invention. When the modules are implemented as software modules they may be, and in some embodiments of the present invention are, stored in memory 108 of FIG. 1A in the section of memory identified as assembly of modules 118. These modules may be implemented instead as hardware modules, e.g., circuits.

The ideas and concepts described with regard to various embodiments such as those shown in FIG. 10 can be extended so that the input sensors can be located in a plane, e.g., at the back of the camera device and/or at the front of the camera device. In some such embodiments the sensors of multiple optical chains are mounted on a flat printed circuit board or backplane device. The printed circuit board, e.g. backplane, can be mounted or coupled to horizontal or vertical actuators which can be moved in response to detected camera motion, e.g., as part of a shake compensation process which will be discussed further below. In some such embodiments, pairs of light diverting devices, e.g., mirrors, are used to direct the light so that at least a portion of each optical chain extends perpendicular or generally perpendicular to the input and/or sensor plane. Such embodiments allow for relatively long optical paths which take advantage of the width of the camera by using mirrors or other light diverting devices to alter the path of light passing through an optical chain so that at least a portion of the light path extends in a direction perpendicular or generally perpendicular to the front of the camera device. The use of mirrors or other light diverting devices allows the sensors to be located on a plane at the rear or front of the camera device as will now be discussed in detail.

While the invention has been explained using convex lenses in many of the diagrams, it should be appreciated that any of a wide variety of different types of lenses may be used in the optical chain modules including, e.g., convex, concave, and meniscus lenses. In addition, while lenses and filters have been described as separate elements, lenses and filters may be combined and used. For example, a color lens may, and in some embodiments is, used to both filter light and alter the lights path. Furthermore, while many of the embodiments have been described with a color filter preceding the image sensor of an optical chain or as using an image sensor with an integrated color filter, e.g., a Bayer pattern filter, it should be appreciated that use of color filters and/or sensors with color filters is not required and in some embodiments one or more optical chain modules are used which do not include a color filter and also do not use a sensor with a color filter. Thus, in some embodiments one or more optical chain modules which sense a wide spectrum of color light are used. Such optical chain modules are particularly well suited for generating black and white images.

In various embodiments image processing is used to simulate a wide variety of user selectable lens bokehs or blurs in the combined image with regard to image portions which are out of focus. Thus, while multiple lenses are used to capture the light used to generate a combined image, the image quality is not limited to that of an individual one of the lenses and a variety of bokehs can be achieved depending on the particular bokeh desired for the combined image being generated. In some embodiments, multiple combined images with different simulated bokehs are generated using post image capture processing with the user being provided the opportunity to save one or more of the generated combined images for subsequent viewing and/or printing. Thus, in at least some embodiments a physical result, e.g., a printed version of one or more combined images is produced. In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

While different optical chain modules are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amounts of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules. The camera devices of the present invention supports multiple modes of operation with switching between panoramic mode in which different areas are captured, e.g., using multiple lenses per area, and a normal mode in which multiple lens pointed same direction are used to capture the same scene. Different exposure modes and filter modes may also be supported and switched between, e.g., based on user input.

Figure 11:
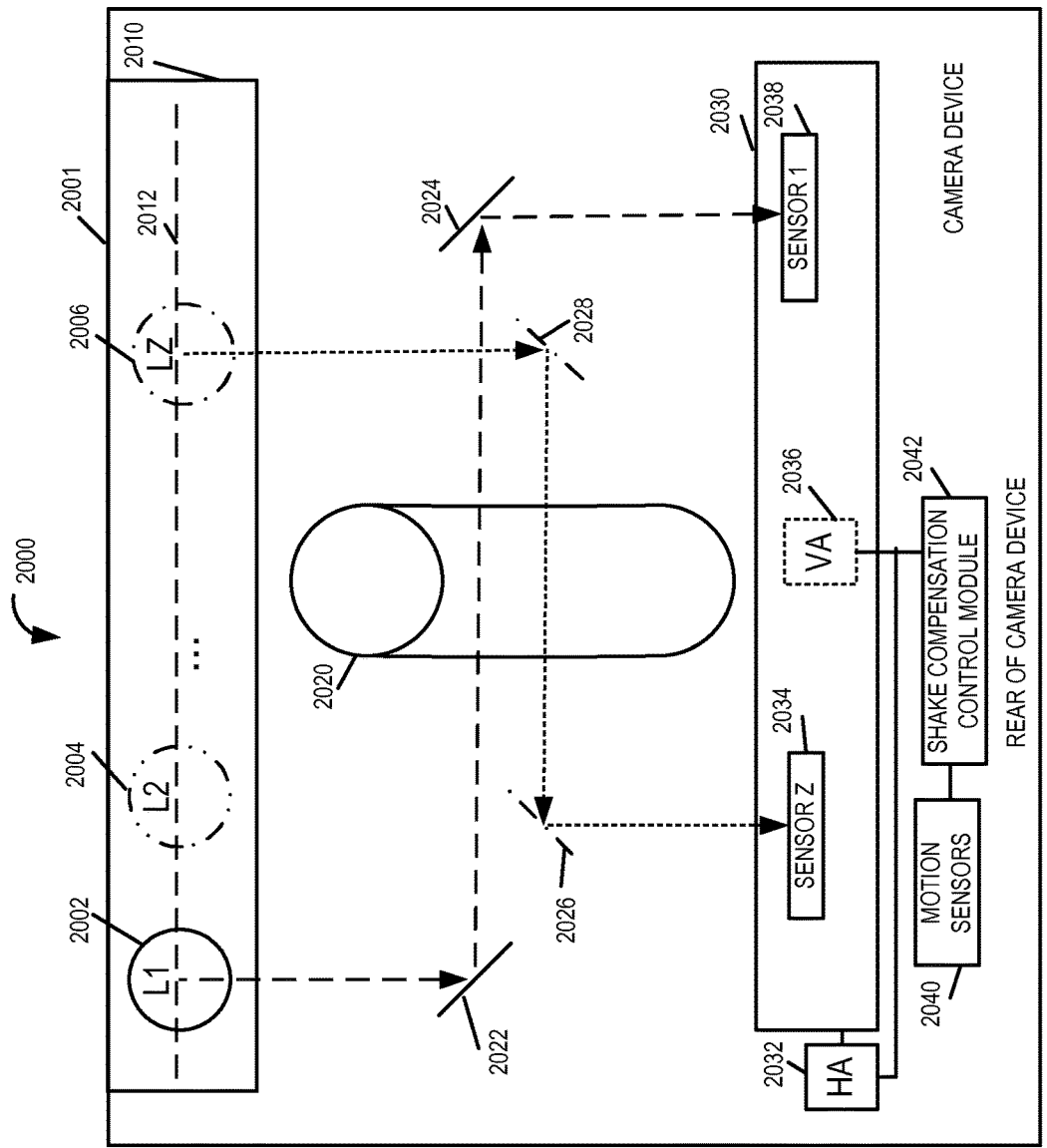
FIG. 11 illustrates an additional exemplary camera device in which mirrors and/or other light redirecting elements are used to alter the path of light in the optical chains so that both the input lenses and/or openings through which light enters the optical chains can be arranged in a plane, and also so that the optical sensors of the optical chains can be arranged in a plane, while allowing at least a portion of the light path through the optical chains to extend in a direction perpendicular to the input and/or output planes.
Figure 12:
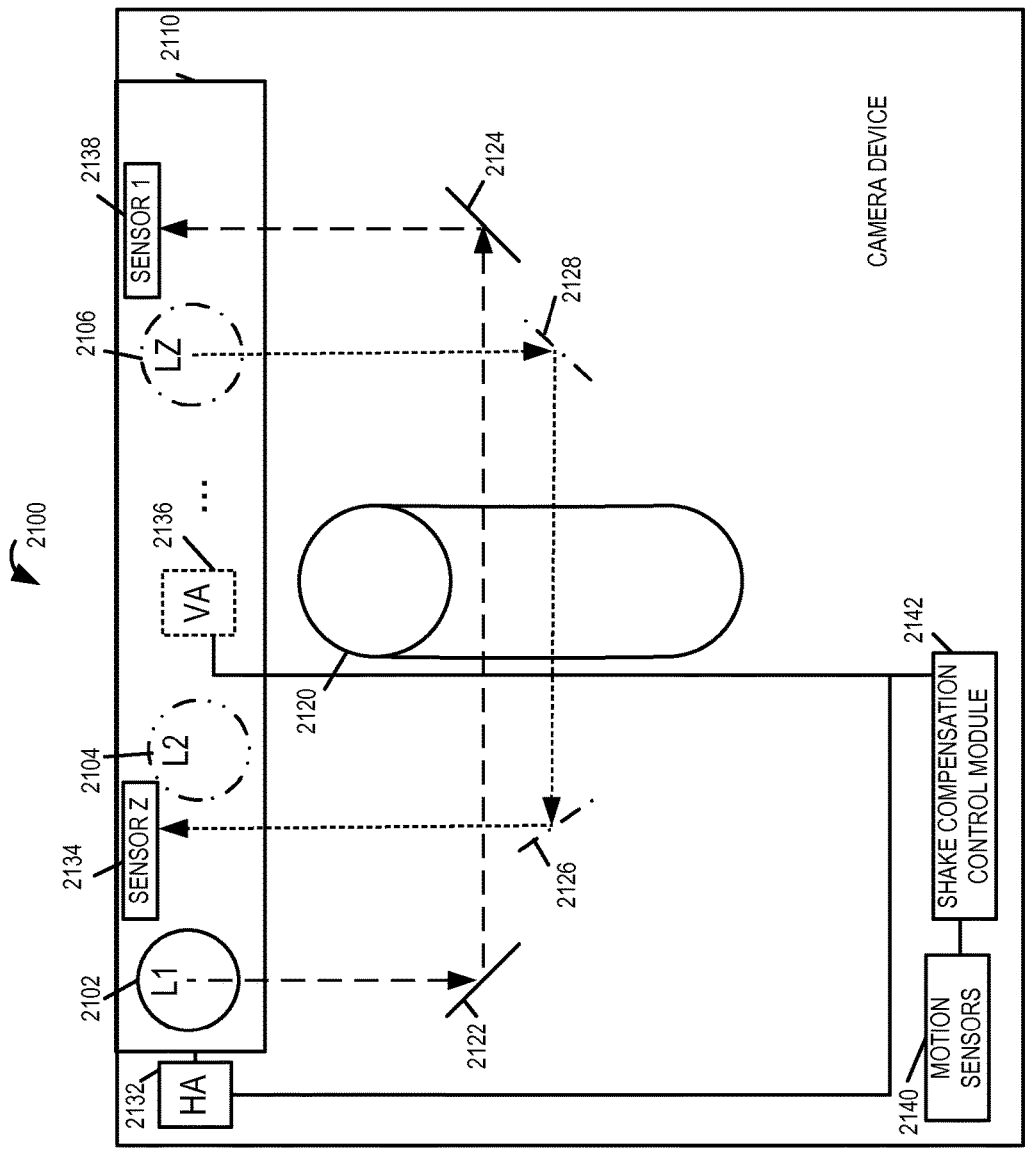
FIG. 12 illustrates an additional exemplary camera device in which mirrors and/or other light redirecting elements are used to alter the path of light in the optical chains so that the input lenses and/or openings, as well as the light sensors of the different optical chains, can be arranged in one or more planes at the front of the camera.

In the FIGS. 11 and 12 embodiments two or more deflection elements are used in each optical chain. Mirrors are exemplary deflection elements that may and sometimes are used in the FIGS. 11 and 12 embodiments. Thus, at least in some embodiments each optical chain includes multiple deflection elements in the form of mirrors. In FIGS. 11 and 12 embodiments two deflection elements are used in each optical chain with each deflection element, e.g., mirror, deflecting the light 90 degrees.

FIG. 11 illustrates an exemplary diagram of a camera device 2000 implemented in accordance with one exemplary embodiment of the invention. The FIG. 11 diagram is intended for explanation purposes to facilitate an understanding of various features and thus is not a precise view of the camera device as perceived from the top but a functional diagram of the elements from a top view perspective which is intended to convey various aspects of the optical chain configurations used in the device 2000. The top portion of FIG. 11 corresponds to the front of the camera device 2000 while the bottom portion corresponds to the back of the camera device 2000. The body 2001 of the camera extends from left to right with the lens and/or openings 2002, 2004, 2006 corresponding to multiple optical chains being mounted in front portion 2010 of the camera device 2000. A LCD or other display (not shown) may and in some embodiments is, located at the rear of the camera device 2000.

In the camera device 2000 includes a plurality of lens or openings L1 through LZ 2002, 2004, 2006 each corresponding to a different one of Z optical chains. Note that in FIG. 11 the lenses 2002, 2004 and 2006 are loaded in a plane represented by dashed line 2012 which extends down towards the bottom of the camera device 2000 which is not visible in the FIG. 11 diagram. The lenses 2002, 2004, and 2006 may be arranged in a circular or other pattern on the front of the camera device 2002. Each optical chain in the FIG. 11 embodiment includes multiple mirrors or other light redirecting devices and a sensor positioned at the end of the optical chain. For example, optical chain 1 includes lens 2002, first mirror 2022, second mirror 2024 and sensor 2038. Optical chain Z includes lens LZ 2006, first mirror 2028, second mirror 2026 and sensor Z 2034. It should be appreciated that mirrors of the first and second optical chains are located around the cylinder 2020 on which one or more lenses or filters may be mounted as discussed with regard to the other embodiments. The mirrors may be arranged in a plane positioned parallel to the input plane 2012 with the light of the different optical chains passing each other, e.g., crossing, within the cylinder 2020. While a single cylinder 2020 is shown in FIG. 11, multiple cylinders, lenses and/or filters may, and in some embodiments are, used as discussed with regard to the other embodiments. Note that in the FIG. 11 embodiment the mirrors (2022, 2024), (2028, 2026) redirect the light passing through the optical chain to which the mirrors correspond so that at least a portion of the optical path of the optical chain extends perpendicular or generally perpendicular to the input direction in which the input lenses L1, L2, LZ face and parallel to the input plane 2012. The input plane may be implemented as a mounting device, e.g., circuit board, upon one or more input lenses or openings L1, L2, LZ are mounted or included in. This allows the optical chain to take advantage of the left to right width of a camera permitting an overall optical chain length than would be possible if the optical chain was limited to the front to back depth of camera device 2000. This allows for thin cameras with relatively long optical chains. Notably, the use of two 45 degree mirrors 2022, 2024 allows the sensors of the optical chain to be mounted in a backplane 2030 with the sensors being arranged on the backplane 2030 in a plane which is parallel to the input plane 2012. The ability to mount the sensors on a single backplane allows for the simple movement of the sensors as an assembly maintaining the relative position of the sensors 2034, 2038 to one another on the backplane 2030 even if the backplane is moved. The cylinder and mirrors may, but need not be, mounted in a manner so that they will move with the backplane 2030 maintaining the alignment of the optical chains to one another as the backplane 2030 is moved, e.g., up or down or left to right in the camera body 2000. Thus, in some embodiments the backplane 2030 and sensors 2034, 2038 can be moved in unison, e.g., by applying a force to the backplane 2030 to induce motion as may be desired.

In one embodiment, motion sensors 2040 are included in the camera device 2000. The motion sensors 2040 may be accelerometers and/or gyroscopes used to detect motion along one or more axis of the camera. In one particular embodiment a shake compensation module 2042 is included in the camera device 2000. The shake compensation module 2042 receives output from the motion sensors 2040 and detects camera movement, e.g., movement indicative of un-intentional shaking as is common in the case of hand held cameras. The shake compensation control module is coupled to a horizontal actuator 2032 and a vertical actuator 2036 which are in contact with the backplane 2030 which may be a circuit board. The vertical actuator 2036 is shown in dashed lines since it is positioned below backplane 2030 and would not be visible from the top. The vertical actuator 2036 can be used to move the backplane 2030, e.g. circuit board, up or down while actuator 2032 can be used to move the backplane 2030 left or right. In at least one embodiment backplane 2030 is mounted in a manner that allows motion left and right, up and down, but which maintains its parallel relationship to the input plane 2012. In some embodiments backplane 2030 is mounted in a slot which is part of the housing of the camera device 2000. The actuators 2032, 3036 may be motorized or implemented using elements which expand or contract when a voltage is supplied. The shake compensation control module 2042 controls the supply of power and/or control signals to actuators 2032, 2036 which induces motion of the backplane 2030 and sensors mounted thereon which is intended to counteract the shaking. The motion of the backplane 2030 is normally not detectable to the holder of the camera but can reduce the distorting in the captured images induced by shaking of the camera housing in which the various elements of the camera are mounted. The lenses and/or openings 2002, 2004, 2006 may not distort or focus the incoming light and may remain fixed while one or more of the other elements of the optical chains move, e.g., to compensate for shaking and/or changes the lenses on the cylinder or drum 2020 through which light will pass.

The FIG. 11 embodiment is particular well suited for embodiments where it is desirable from a manufacturing standpoint and/or shake compensation standpoint to mount the sensors 2034, 2038 on backplanes such as printed circuit boards or other relatively flat mounting devices whether they be out of metal, plastic, another material or a combination of materials.

It should be appreciated that the camera device 2000, as well as the camera device 2100 shown in FIG. 12 may include the elements of the camera device 100 shown in FIG. 1A in addition to those shown in FIGS. 11 and 12 but that such elements are omitted to facilitate an understanding of the elements and configuration which is explained using FIGS. 11 and 12.

FIG. 12 illustrates an additional exemplary camera device 2100 in which mirrors (2122, 2124), (2128, 2126) and/or other light redirecting elements are used to alter the path of light in the optical chains so that the input light input lenses and/or opens can be arranged in one or more planes at the front of the camera where the lens and/or openings through which light enters the optical chains are also located. Elements in FIG. 12 which are the same or similar the elements of FIG. 11 are numbered using similar numbers but starting with the first two digits 21 instead of 20. Such similar elements will not be described again expect to point out some of the differences between the FIG. 12 and FIG. 11 configurations.

One of the important differences between the devices 2100 and 2000 is that in the camera device 2100 both the sensors 2134, 2138 and external lenses/openings of the optical chains are located in the front of the camera. This is made possible by having the second mirror 2124 or 2126 direct light to the front of the camera rather than the back of the camera. In the FIG. 12 embodiment the input plane and the sensor plane may be the same plane or positioned in close proximity to each other. As in the case of the FIG. 11 embodiment vertical and horizontal actuators 2132, 2136 may be provided and used to mechanically compensate for detected camera shaking.

The FIG. 12 embodiment may be desirable where a manufacturer may want to combine the input plane assembly and sensor plane assembly into a single unit as part of the manufacturing processor prior to combining it with the cylinder/lens assembly 2120.

Numerous variations on the designs shown in FIGS. 11 and 12 are possible. Significantly, the methods and apparatus of the present invention allow for sensors to be arranged parallel to or on any internal wall of a camera device while still allowing for a camera device to include multiple optical chains in a relatively thin camera. By configuring the sensors parallel to the front or rear walls of the camera rather than the side walls, the sensors and/or lens can be spread out and occupy a greater surface area than might be possible if the camera sensors were restricted to the sidewalls or some other arrangement.

Notably many of the embodiments are well suited for allowing a LCD or other display to be placed at the back of the camera facing out without the display panel significantly interfering with the overall length of the individual optical chain modules included in the camera.

While the invention has been explained using convex lenses in many of the diagrams, it should be appreciated that any of a wide variety of different types of lenses may be used in the optical chain modules including, e.g., convex, concave, and meniscus lenses. In addition, while lenses and filters have been described as separate elements, lenses and filters may be combined and used. For example, a color lens may, and in some embodiments is, used to both filter light and alter the lights path. Furthermore, while many of the embodiments have been described with a color filter preceding the image sensor of an optical chain or as using an image sensor with an integrated color filter, e.g., a Bayer pattern filter, it should be appreciated that use of color filters and/or sensors with color filters is not required and in some embodiments one or more optical chain modules are used which do not include a color filter and also do not use a sensor with a color filter. Thus, in some embodiments one or more optical chain modules which sense a wide spectrum of color light are used. Such optical chain modules are particularly well suited for generating black and white images.

In various embodiments image processing is used to simulate a wide variety of user selectable lens bokehs or blurs in the combined image with regard to image portions which are out of focus. Thus, while multiple lenses are used to capture the light used to generate a combined image, the image quality is not limited to that of an individual one of the lenses and a variety of bokehs can be achieved depending on the particular bokeh desired for the combined image being generated. In some embodiments, multiple combined images with different simulated bokehs are generated using post image capture processing with the user being provided the opportunity to save one or more of the generated combined images for subsequent viewing and/or printing. Thus, in at least some embodiments a physical result, e.g., a printed version of one or more combined images is produced. In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

While different optical chain modules are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amounts of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules. The camera devices of the present invention supports multiple modes of operation with switching between panoramic mode in which different areas are captured, e.g., using multiple lenses per area, and a normal mode in which multiple lens pointed same direction are used to capture the same scene. Different exposure modes and filter modes may also be supported and switched between, e.g., based on user input.

Figure 13:
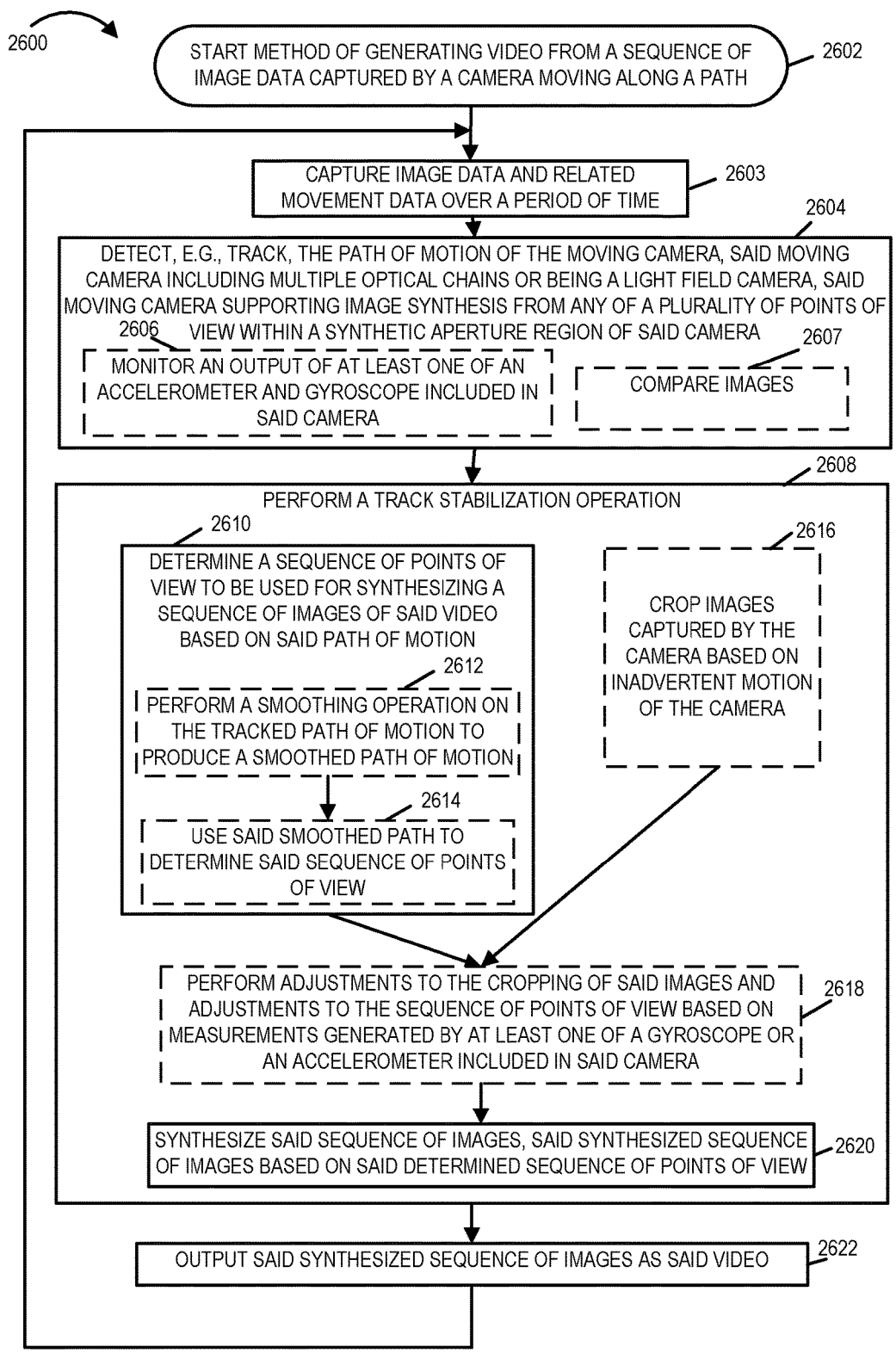
FIG. 13 is a flowchart of an exemplary method of generating video from a sequence of image data captured by a camera moving along a path in accordance with an exemplary embodiment.

FIG. 13 is a flowchart 2600 of an exemplary method of generating video from a sequence of image data captured by a camera moving along a path in accordance with an exemplary embodiment. Operation starts in step 2602 and proceeds to step 2603. In step 2603 the camera captures image data and related movement data over a period of time. Operation proceeds from step 2603 to step 2604.

In step 2604 camera motion is detected, e.g., the path of motion of the moving camera is tracked, said moving camera includes multiple optical chains or being a light field camera, e.g., a Lytro camera, said moving camera supporting image synthesis from any of a plurality of points of view within a synthetic aperture region, e.g., a set of all the points of view from which an image can by synthesized by the camera, of said camera. In some embodiments, step 2604 includes step 2606 in which at least one of an accelerometer and gyroscope included in said camera is monitored. The output of such devices is used to detect motion. In another embodiment step 2604 includes comparing images captured by the camera device to detect motion. For example an image captured at a first time may be compared to an image captured at a second time to detect motion. The compared images maybe from a camera module, e.g., optical chain, of the camera which captures the images at two different times, a first frame time and a second frame time. Motion maybe and sometimes is determined from a change in position of an object in the images which are compared where the object maybe a stationary object such as a tree which is part of a background portion of the image. Motion information may be, and sometimes is stored with captured images in memory so that it is available for use in generating one or more composite images at a later time. In the case where camera motion information is generated from the captured images, the motion information may be generated outside the camera device, e.g., by a device which processes captured images, e.g., prior to generating a composite image from the captured images.

Operation proceeds from step 2604 to step 2608. In step 2608, a track stabilization operation is performed. Step 2608 includes steps 2610 and step 2620. In some embodiments, step 2608 further includes step 2616. In some such embodiments, step 2608 further includes step 2618.

In step 2610 a sequence of points of view to be used for synthesizing a sequence of images of said video based on said path of motion is determined. In some embodiments, step 2610 includes steps 2612 and 2614. In step 2612 a smoothing operation on the tracked path of motion is performed to produce a smoothed path of motion, and in step 2614 the smoothed path is used to determine said sequence of points of view. In some embodiments, the smoothed path is a straight line. In some other embodiments, the smoothed path is a smooth curve. In some embodiments, operation proceeds from step 2610 to step 2620. In other embodiments, e.g., an embodiment including step 2616, operation proceeds from step 2610 to step 2618.

In step 2616 images captured by the camera are cropped based on an inadvertent motion, e.g., rotation and/or linear motion, of the camera. Operation proceeds from step 2616 to step 2618. In step 2618 adjustments are performed to the cropping of said images and adjustments are performed to the sequence of points of view based on measurements generated by a least one of a gyroscope or an accelerometer included in said camera. Operation proceeds from step 2618 to step 2620.

In step 2620 said sequence of images is synthesized, said synthesized sequence of images based the determined sequence of points of view. In some embodiments, each image in the sequence being synthesized from captured image outputs by multiple different optical chain modules, e.g., at the same time, with the synthesized center of the generated image being a function of a determined point of view to be used in generating the synthesized image. In some embodiments, the synthesized sequence of images has the determined sequence of points of view. In some other embodiments, the synthesized sequence of images has the adjusted determined sequence of points of view.

Operation proceeds from step 2608 to step 2622. In step 2622 the synthesized sequence of images is output as said video. Operation proceeds from step 2622 to step 2603.

In some embodiments, the synthetic aperture of the camera is sufficiently large to include expected points of view corresponding to a range of inadvertent track deviation expected to be encountered by a handheld camera. In some embodiments, the camera is a handheld camera that is manually moved along said path, and the path is a straight line. In various embodiments, the camera is a handheld camera and can be manually moved along a straight path providing the same or similar results to a camera mount and moved on a track.

In some embodiments, the camera is a portable camera that is mounted on a vehicle and the vehicle is driven or moved along said path, e.g., a straight path or a curved path. In some such embodiments, the vehicle and camera mount does not include inertial stabilization, e.g., the camera is not mounted on an initially stabilized platform. In various embodiments, the camera provides the same or similar results to a camera mounted on an inertially stabilized platform on a moving vehicle. In some embodiments, the vehicle on which the camera is mounted is an unmanned vehicle.

In some embodiments, each of the steps of flowchart 2600 are implemented by a camera device including multiple optical chains or being a light field camera, e.g., a Lytro camera. In some embodiments, the camera device, which includes multiple optical chains, or which is a light field camera, e.g. a Lytro camera, is a cell phone or other portable camera device, e.g., an electronic tablet, electronic pad, webcam device, surveillance device, etc. In one exemplary embodiment, camera device 2800 of FIG. 15 implements the steps of the method of flowchart 2600.

Figure 15:
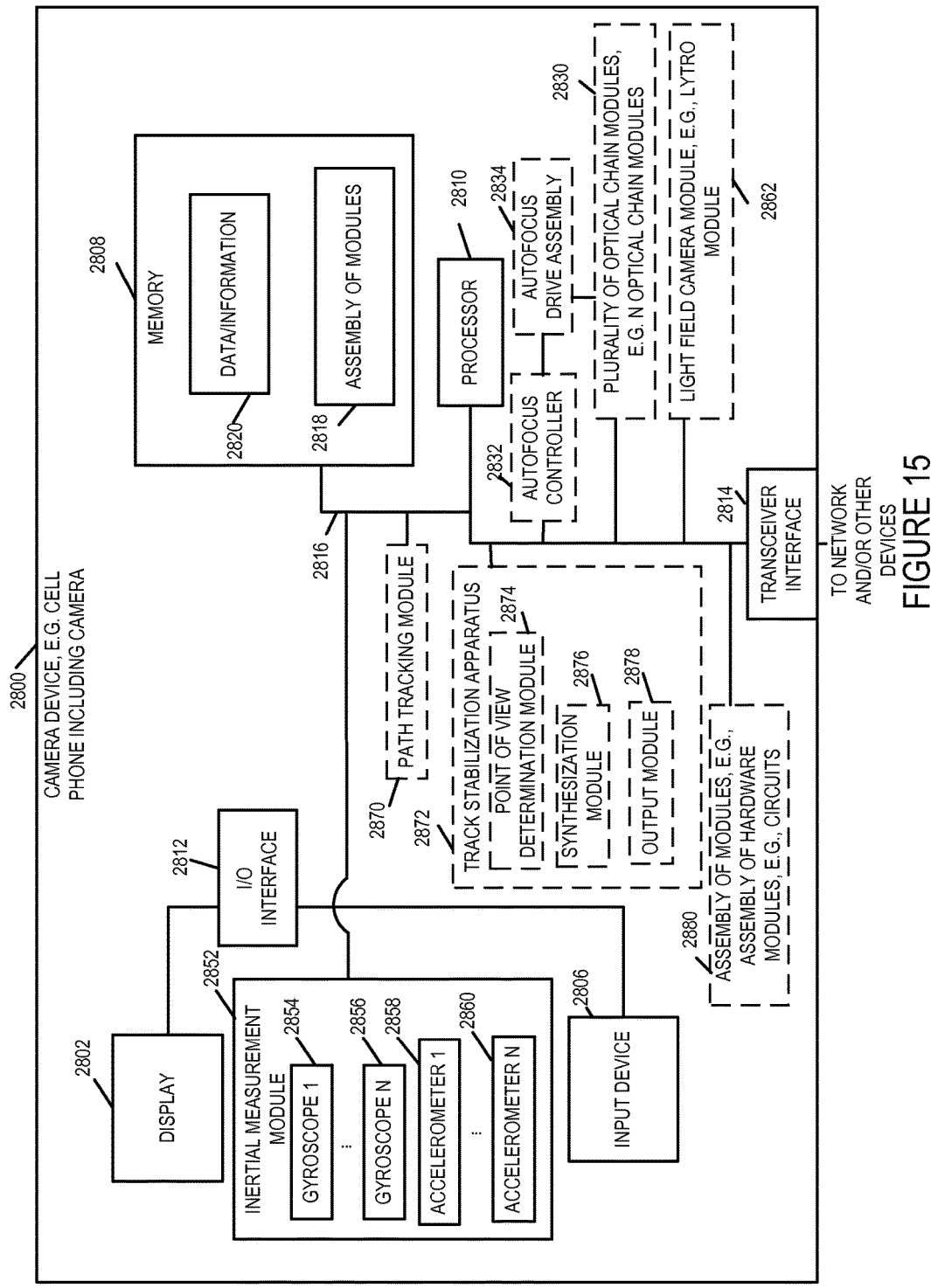
FIG. 15 is an exemplary block diagram of an exemplary apparatus, e.g., camera device, implemented in accordance with an exemplary embodiment of the present invention.

In other embodiments, some steps of flowchart 2600 are implemented by a device, e.g., a computer system, e.g., computer system 1400 of FIG. 6, external to the camera device, and the other steps of flowchart 2600 are implemented by the exemplary camera device including multiple optical chains or being a light field camera, e.g., a Lytro camera, e.g., camera device 2800 of FIG. 15.

Figure 14:
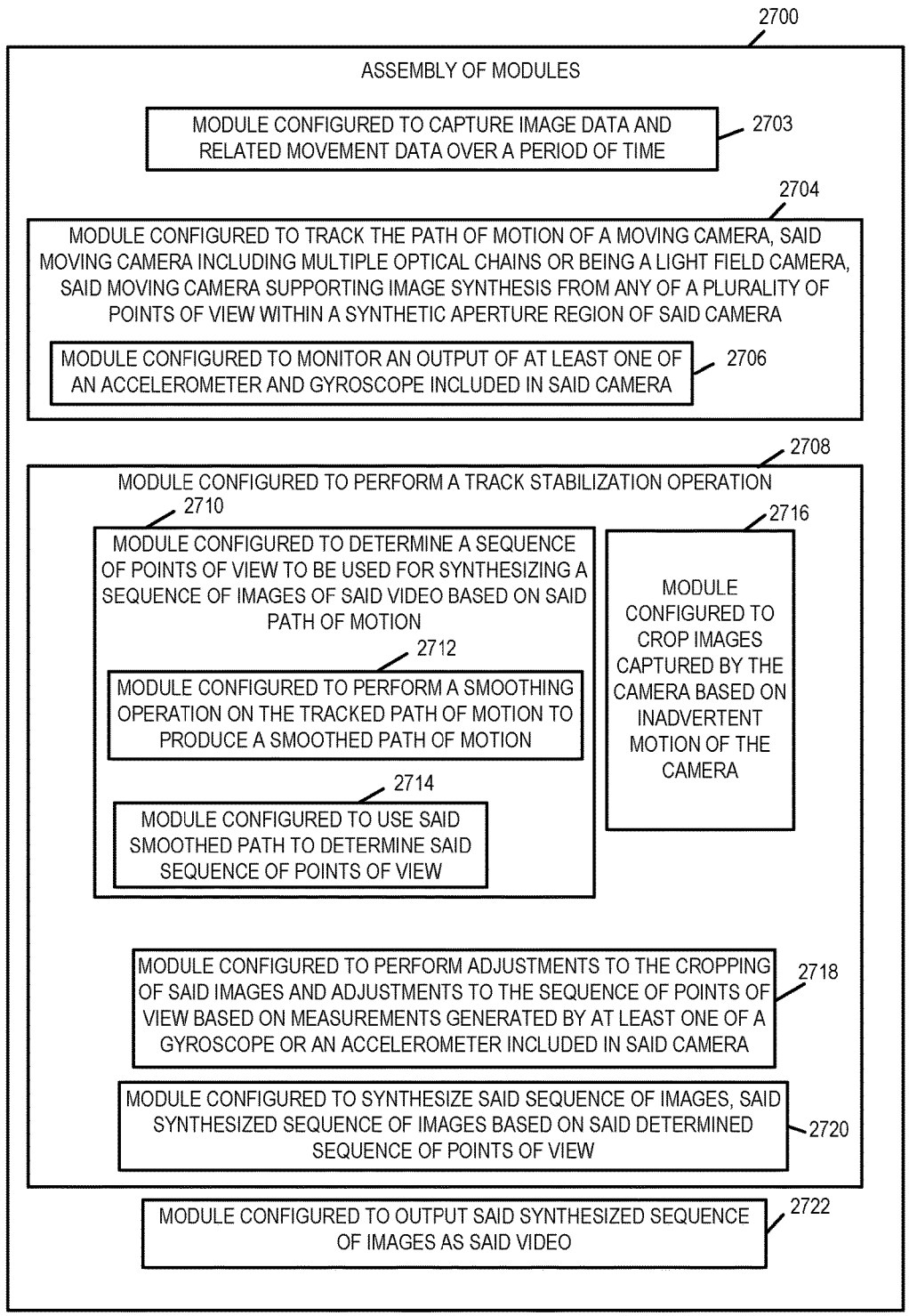
FIG. 14 is an exemplary assembly of modules, which may be included in an exemplary device, e.g., a camera device including multiple optical chains or a light field camera, or an exemplary combination of devices, e.g., a camera device including multiple optical chains or a light field camera, and a computer device external to the camera device, implementing the method of the flowchart of FIG. 13.

FIG. 14 is a drawing of an assembly of modules 2700, which may be included in camera device 2800 of FIG. 15 and/or in a camera device implementing a method in accordance with flowchart 1300 of FIG. 14. Assembly of modules 2700 includes a module 2703 configured to capture image data and related movement data over a period of time, a module 2704 configured to track the path of motion of a moving camera, said moving camera including multiple optical chains or being a light field camera, said moving camera supporting image synthesis from any of a plurality of points of view within a synthetic aperture region of said camera. Module 2704 includes a module 2706 configured to monitor an output of at least one of an accelerometer and gyroscope included in said camera. Assembly of modules 2700 further includes a module 2708 configured to perform a track stabilization operation. Module 2708 includes a module 2710 configured to determine a sequence of points of view to be used for synthesizing a sequence of images of said video based on said path of motion and a module 2716 configured to crop images captured by the camera based on inadvertent motion of the camera, e.g., inadvertent angular and/or inadvertent linear motion.

In some embodiments, module 2710 determines one point of view in the sequence being generated for each synthesized image to be produced and included in the sequence of images. Module 2710 includes a module 2712 configured to determine a sequence of points of view to be used for synthesizing a sequence of images of said video based on said path of motion and a module 2714 configured to use said smoothed path to determine said sequence of points of view. Assembly of modules 2708 further includes a module 2718 configured to perform adjustments to the cropping of said images and adjustment to the sequence of points of view based on measurements generated by at least one of a gyroscope and an accelerometer included in said camera, and a module 2720 configured to synthesize said sequence of images, said synthesized sequence of images based on said determined sequence of points of view. Assembly of modules 2700 further includes a module 2722 configured to output said synthesized sequence of images as said video.

In some embodiments, a module shown in assembly of modules 2700 as being included within another module may be implemented as a separate module, e.g., an independent module.

FIG. 15 illustrates an exemplary apparatus 2800, sometimes referred to hereinafter as a camera device, implemented in accordance with one exemplary embodiment of the present invention. The camera device 2800, in some embodiments, is a portable device, e.g., a cell phone or tablet including a camera assembly. In various embodiments camera device 2800 is a handheld device. Camera device 2800 is an image capture device which includes a plurality of camera modules, e.g., a plurality of optical chain modules 2830 and/or a light field camera module 2862, e.g., a LYTRO module. In various embodiments, camera device 2800 is configured to capture a sequence of image data as the camera device 2800 is moved along a path.

In various embodiments, the camera device 2800 is configured to support operation as a moving camera that supports image synthesis from any of a plurality of points of view within a synthetic aperture region. In some such embodiments, the synthetic aperature region is a region which corresponds to multiple camera modules included in said camera. In some such embodiments, the synthetic aperature region is a circular region having a diameter approximately the diameter of a circular area including the outermost lens of the multiple camera modules.

FIG. 15 illustrates the camera device 2800 in block diagram form showing the connections between various elements of the apparatus 2800. The exemplary camera device 2800 includes a display device 2802, an input device 2806, memory 2808, a processor 2810, a transceiver interface 2814, e.g., a cellular interface, a WIFI interface, or a USB interface, an I/O interface 2812, and a bus 2816 which are mounted in a housing represented by the rectangular box touched by the line leading to reference number 2800. The input device 2806 may be, and in some embodiments is, e.g., a keypad, a touch screen, or similar device that may be used for inputting information, data and for instructions. The display device 2802 may be, and in some embodiments is, a touch screen, used to display images, video, information regarding the configuration of the camera device, and/or status of data processing being performed on the camera device. In the case where the display device 2802 is a touch screen, the display device 2802 serves as an additional input device and/or as an alternative to the separate input device, e.g., buttons, 2806. The I/O interface 2812 couples the display 2802 and input device 2806 to the bus 2816 and interfaces between the display 2802, input device 2806 and the other elements of the camera which can communicate and interact via the bus 2816. In addition to being coupled to the I/O interface 2812, the bus 2816 is coupled to the memory 2808, processor 2810, an optional autofocus controller 2832, a transceiver interface 2814 and, in some embodiments, a plurality of optical chain modules 2830, e.g., N optical chain modules. The optical chain modules may, and in some embodiments are, the same as or similar to any of those shown in the FIGS. 1B, 1C, 1D, 2, 3, 4, 7 and 8 embodiments. In some embodiments N is an integer greater than 2, e.g., 3, 4, 7 or a larger value depending on the particular embodiment. Images captured by individual optical chain modules in the plurality of optical chain modules 2830 can be stored in memory 2808, e.g., as part of the data/information 2820 and processed by the processor 2810, e.g., to generate one or more composite images. Multiple captured images and/or composite images may be processed to form video, e.g., a series of images corresponding to a period of time. In some embodiments, camera device 2800 includes light field module 2862, e.g., a Lytro module for capturing a light field, coupled to bus 2816.

As should be appreciated the effective aperture of the camera device may be smaller or as large as the combination of apertures which are part of the camera device 2800. Thus, for example, when the optical camera modules having the arrangement shown in FIG. 7 or 8 are used the effective aperture maybe the same or smaller than the area occupied by the seven lenses which are included in the camera device 2800. A simulated aperture may be smaller than the combined aperture of the individual camera modules. This may be the result of cropping of one or more captured images which are combined. The point of view of the simulated aperture can be controlled as part of the process of combining the images of the multiple different capture modules. Thus, the point of view of the combined image need not correspond to the center of the set of optical modules which are included in the camera device 2800. As the camera device moves unintentional up or down for instance, the point of view may change. However, in the image combining process the point of view for different sequential frames may, and in some embodiments is, controlled so that the point of view in the sequential combined images appears as though it follows a smooth track of motion such as that which might be expected if the camera device capturing the image sequence was on an actual physical track rather than being handheld and subject to unintended motion or deviation from a smooth path.

Camera device 2800 further includes an inertial measurement module 2852, for measuring camera motion, coupled to bus 2816. Inertial measurement module 2852 includes a plurality of gyroscopes (gyroscope 1 2854, . . . , gyroscope N 2856), and a plurality of accelerometers (accelerometer 1 2858, . . . , accelerometer N 2860). In some embodiments, there are sufficient gyroscopes to measure angular rate on three orthogonal axis, e.g., three single axis gyroscopes, two dual axis gyroscopes, or one dual axis gyroscopes and one single axis gyroscope. In various embodiments, there are sufficient accelerometers to measure acceleration along 3 axis, e.g., three accelerometers mounted in a triad, with three substantially orthogonal accelerometer measurement axis. In some embodiments, the inertial measurement module 2852 is included in a single chip or portion of a single chip.

Transceiver interface 2814 couples the internal components of the camera device 2800 to an external network, e.g., the Internet, and/or one or more other devices e.g., memory or stand alone computer. Via interface 2814 the camera device 2800 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 2814 of the camera device 2800 may be, and in some instances is, coupled to a computer so that image data may be processed on the external computer. In some embodiments the external computer has a higher computational processing capability than the camera device 2800 which allows for more computationally complex image processing of the image data outputted to occur on the external computer. The transceiver interface 2814 also allows data, information and instructions to be supplied to the camera device 2800 from one or more networks and/or other external devices such as a computer or memory for storage and/or processing on the camera device 2800. For example, background images may be supplied to the camera device to be combined by the camera processor 2810 with one or more images captured by the camera device 2800. Instructions and/or data updates can be loaded onto the camera via interface 2814 and stored in memory 2808.

The camera device 2800 may include, and in some embodiments does include, an autofocus controller 2832 and/or autofocus drive assembly 2834. The autofocus controller 2832 is present in at least some autofocus embodiments but would be omitted in fixed focus embodiments. The autofocus controller 2832 controls adjustment of at least one lens position in the optical chain modules used to achieve a desired, e.g., user indicated, focus. In the case where individual drive assemblies are included in each optical chain module, the autofocus controller 2832 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 2834 is included as an element that is external to the individual optical chain modules with the drive assembly 2834 driving the platter including the lenses for multiple optical chains under control of the autofocus controller 2832. While the optical chain modules will in many embodiments be focused together to focus on an object at a particular distance from the camera device 2800, it is possible for different optical chain modules to be focused to different distances and in some embodiments different focus points are intentionally used for different optical chains to increase the post processing options which are available.

The processor 2810 controls operation of the camera device 2800 to control the elements of the camera device 2800 to implement the steps of the methods described herein. The processor may be a dedicated processor that is preconfigured to implement the methods. However, in many embodiments the processor 2810 operates under direction of software modules and/or routines stored in the memory 2808 which include instructions that, when executed, cause the processor to control the camera device 2800 to implement one, more or all of the methods described herein. Memory 2808 includes an assembly of modules 2818 wherein one or more modules include one or more software routines, e.g., machine executable instructions, for implementing the image capture and/or image data processing methods of the present invention. Individual steps and/or lines of code in the modules of 2818 when executed by the processor 2810 control the processor 2810 to perform steps of the method of the invention. When executed by processor 2810, the data processing modules 2818 cause at least some data to be processed by the processor 2810 in accordance with the method of the present invention. The resulting data and information are stored in data memory 2820 for future use, additional processing, and/or output, e.g., to display device 2802 for display or to another device for transmission, processing and/or display. The memory 2808 includes different types of memory for example, Random Access Memory (RAM) in which the assembly of modules 2818 and data/information 2820 may be, and in some embodiments are stored for future use. Read only Memory (ROM) in which the assembly of modules 2818 may be stored for power failures. Non-volatile memory such as flash memory for storage of data, information and instructions may also be used to implement memory 2808. Memory cards may be added to the device to provide additional memory for storing data (e.g., images and video) and/or instructions such as programming. Accordingly, memory 2808 may be implemented using any of a wide variety of non-transitory computer or machine readable mediums which serve as storage devices.

In one embodiment the assembly of modules 2700 shown in FIG. 14 is part of or used in place of the assembly of modules 2818. The modules in the assembly 2700, when executed by the processor 2810 control the camera device 2800 in one embodiment to implement the method described with regard to FIG. 13. While the modules of assembly of modules 2700 of FIG. 14 may, and in some embodiments are implemented using software, in other embodiments they are implemented in hardware, e.g., as circuits, which may and in some embodiments are included in the camera device 2800, e.g., as assembly of modules 2880.

In another embodiment, some of the modules of assembly of modules 2700 are included as part of assembly of modules 2818 and/or assembly of modules 2880 of camera device 2800 and some of the modules of assembly of modules 2700 are included as part of assembly of modules 1418 of computer system 1400. For example, in one exemplary embodiment, image data collection and camera motion measurements are be performed by the camera device 2800 and processing of the collected data and collected camera motion measurements is performed by computer system 1400. In other embodiments, some steps of the processing are performed by the camera device 2800 and other steps performed by the computer system 1400.

In some embodiments, camera device 2800 includes a path tracking module 2870 which detects camera motion, e.g., implemented as circuitry, and a track stabilization apparatus 2870. In some such embodiments, the track stabilization apparatus includes a point of view determination module 2874, a synthesization module 2876 and an output module 2878. Path tracking module 2870 is configured to track the path of the camera device 2800 which is an image capture device. Point of view determination module 2874 is configured to determine a sequence of points of view to be used for synthesizing a sequence of images of video based on the path of motion. Synthesization module 2876 is configured to synthesize a sequence of images, said synthesized sequence of images being based on the determined points of view. Output module 2878 is configured to output a synthesized sequence of images as video.

Drawing 2900 of FIG. 16 illustrates a camera mounted on a moveable camera cart 2908 with a single optical chain moving along a straight line track with rails 2906 in the direction of motion 2903. The path of motion of the camera is indicated by dotted line 2902. The camera at time T0 is shown as element 2904; the camera at time T1 is shown as element 2904' and the camera at time T2 is shown as element 2904".

Drawing 2950 of FIG. 16 illustrates an exemplary handheld camera, in accordance with an exemplary embodiment of the present invention, with multiple optical chains, with gyroscopes and with accelerometers, being moved. The information generated by such measurement devices can, and in some embodiments is, used to determine a path of motion and what point of view should be used, in some embodiments, for purposes of combining image data from different optical chain modules of the camera.

Exemplary person 2958 is holding the camera, including multiple optical chains, gyroscopes and accelerometers, and moving, e.g., walking, along a straight line path with path borders 2956 in the direction of motion 2903. In one example, the path borders 2956 are at the same location as rails 2906. The camera, including multiple optical chains, gyroscopes and accelerometers, at time T0 is shown as element 2954; the camera at time T1 is shown as element 2954' and the camera at time T2 is shown as element 2954". The nominal path of motion of the camera is indicated by dotted line 2902. There are inadvertent motions of the camera, e.g., rotations and linear motions, as the handheld camera is moved along the path 2902. The path of motion of the moving camera is tracked, a tracking stabilization operation is performed, and a synthesized sequence of images is output as video, e.g., in accordance with the method of flowchart 2600 of FIG. 26. The synthesized sequence of image may include a serious of images generated from images captured at different times.

In one embodiment while each image in a sequence corresponds to a different, e.g., sequential time period, the generated image corresponding to one time period in the sequence is generated from captured image data which is captured by multiple different individual optical chain modules operating in parallel during the time period to which the individual generated image corresponds. As part of the image generation process, the images captured by different optical chain modules corresponding to an individual time period may be combined based on a point of view that is determined based on camera motion. The point of view used from one frame to the next is selected in some embodiments to provide the appearance of a consistent or smoothly changing point of view as opposed to relying on a center portion of the camera device or set of optical chain modules as the point of view. Thus, the point of view used for controlling the combining process maybe different from the point of view of the individual optical chain modules used to capture the image data being combined. In this manner, as part of the combining operation the point of view may be adjusted as may be necessary to simulate a smooth track of motion. Image cropping may be used as part of the combining operation as well to ensure that area included in the output video sequence remains relatively consistent and changes gradually over time as might be expected by smooth intentional camera motion as opposed to inadvertent motion, which often takes the form of jerky camera motion, that may be the result of the use of a handheld camera device. Thus, by using a large synthetic aperture, e.g., simulated aperture generated by using multiple smaller apertures in combination and by outputting an image smaller than the maximum image size which may be captured, image adjustments in the form of cropping and altering the point of view used for generating an image can be used to reduce or eliminate the effect of unintended motion as a camera device is moved along a path, e.g., a path which is intended to be smooth but may be jerky or subject to unintentional changes in the actual point of view of individual optical chain modules as a result of unintended motion.

The exemplary camera device of drawing 2950 is in some embodiments, camera device 2800 of FIG. 15+.

Figure 17A:
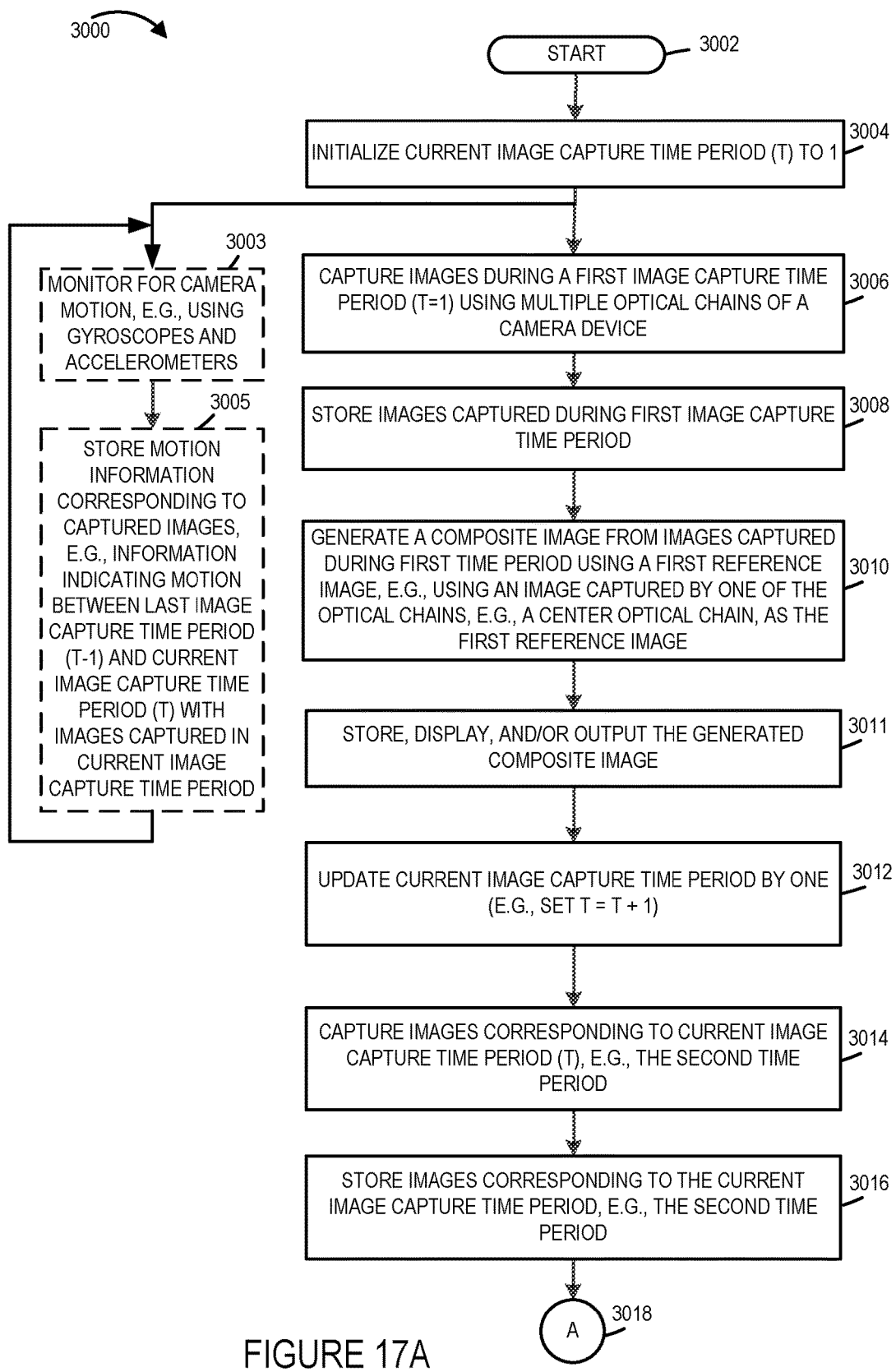
FIG. 17A is a first part of a flowchart of an exemplary method of generating images in accordance with an exemplary embodiment.
Figure 17B:
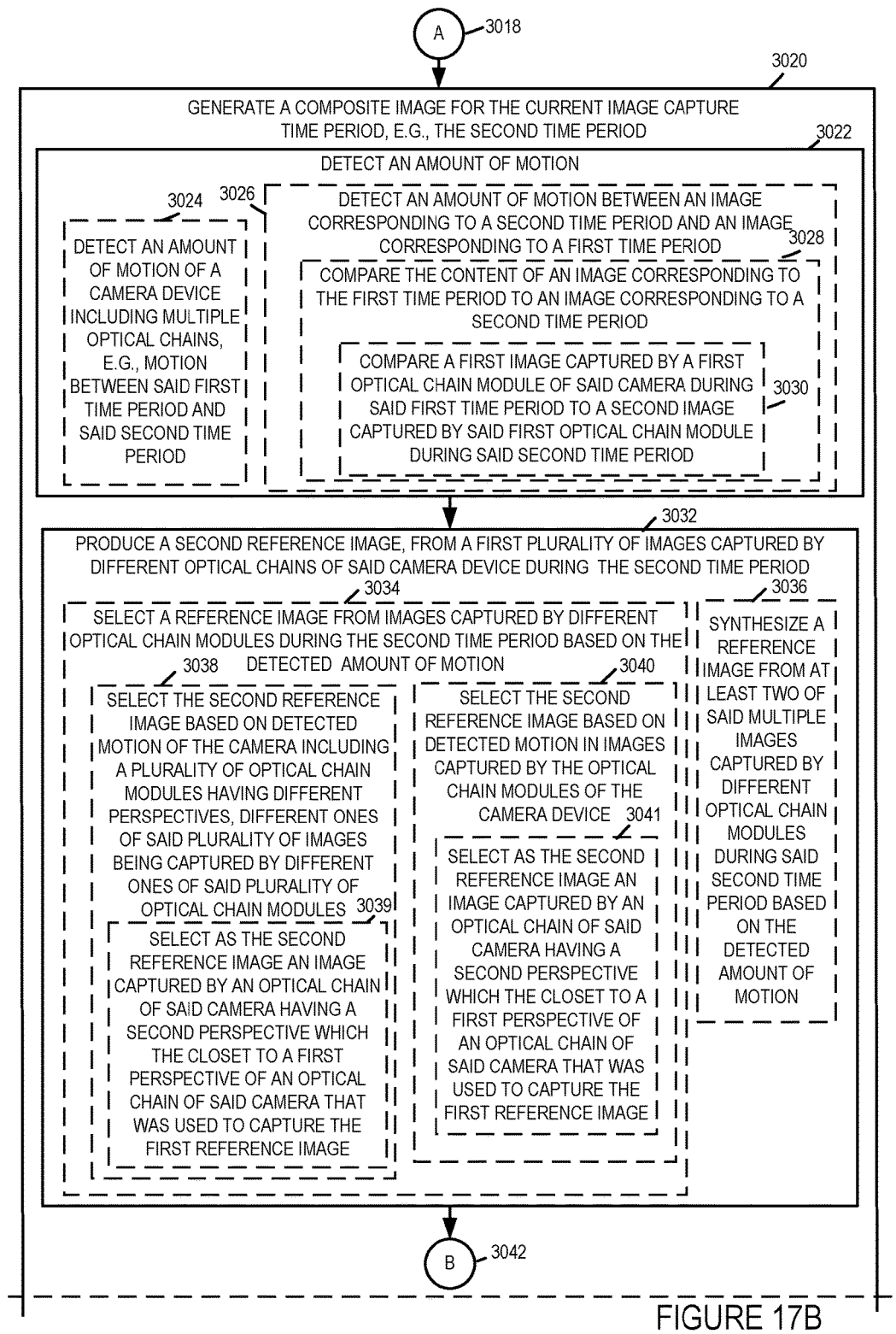
FIG. 17B is a second part of a flowchart of an exemplary method of generating images in accordance with an exemplary embodiment.
Figure 17C:
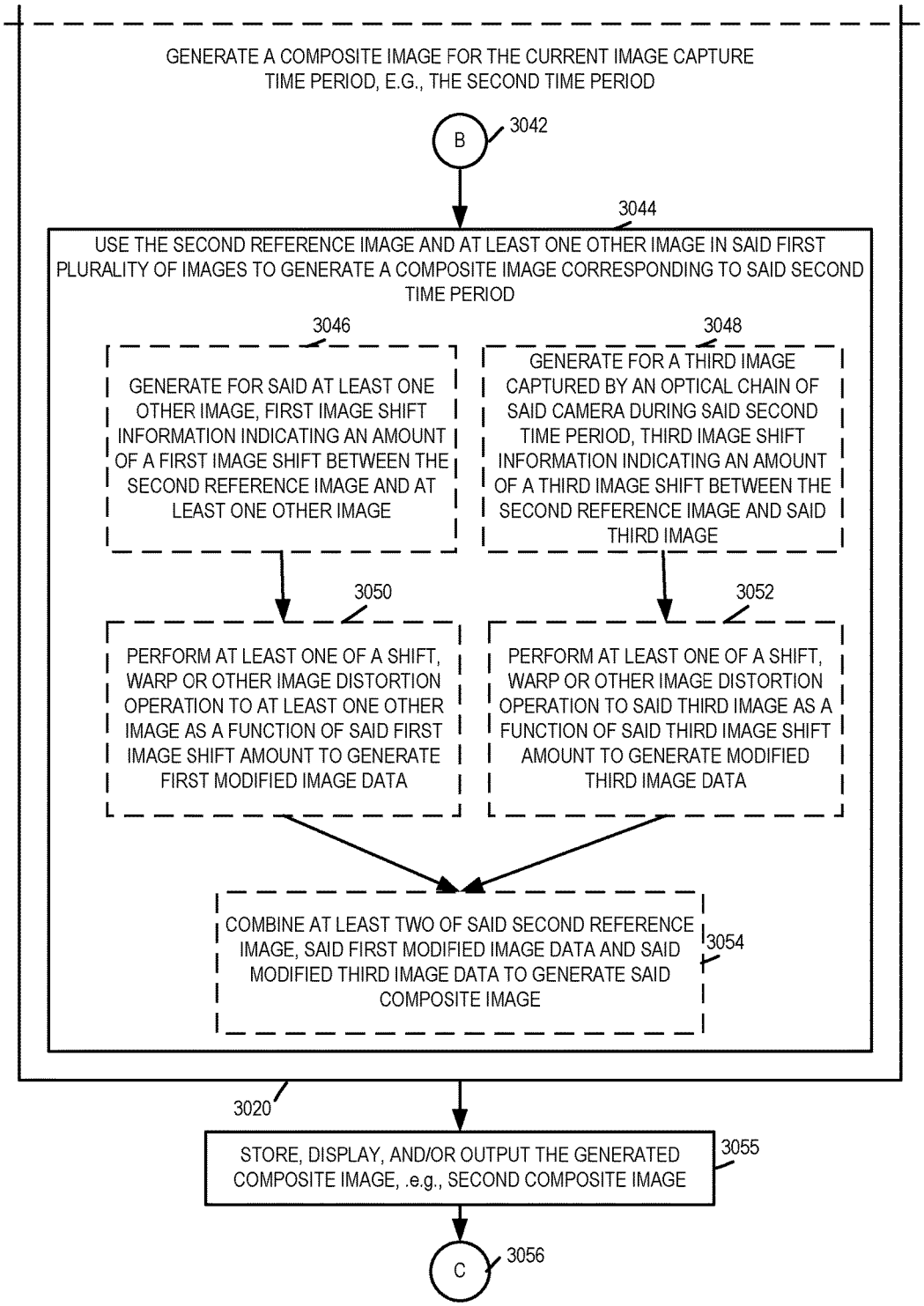
FIG. 17C is a third part of a flowchart of an exemplary method of generating images in accordance with an exemplary embodiment.

FIG. 17, comprising the combination of FIG. 17A, FIG. 17B, FIG. 17C and FIG. 17D, is a flowchart 3000 of an exemplary method of generating images in accordance with an exemplary embodiment. In some embodiments, the exemplary method of flowchart 3000 is performed by a camera device including multiple optical chains, e.g., camera device 2800 of FIG. 15. In other embodiments, some steps of flowchart 3000 are implemented by a camera device including multiple optical chains, e.g., camera device 2800 of FIG. 15, and other steps of flowchart 3000 are implemented by a device external to the camera device, e.g., a computer system such as computer system 1400 of FIG. 6. In one such embodiment, the captured images from the multiple optical chains of the camera device are processed externally from the camera device by a computer system which generate the composite images.

The exemplary method of flowchart 3000 will be described for an embodiment in which an exemplary camera device performs each of the steps; however, it should be appreciated that some of the steps of flowchart 3000, e.g., image processing steps, may be, and in some embodiments, are performed by another device, e.g., a computer system.

Operation of the exemplary method begins in step 3002 in which the camera device is powered on and initialized. Operation proceeds from step 3002 to step 3004, in which the camera device initializes the current image capture time period T to 1. Operation proceeds from step 3004 to step 3006, and in some embodiments to step 3003.

In step 3003, the camera device monitors for camera motion, e.g., using gyroscopes and accelerometers. Operation proceeds from step 3003 to step 3005, in which the camera device stores motion information corresponding to captured images, e.g., information indicating motion between the last capture time period (T−1) and the current image capture time period (T), with images captures in the current image capture time period. Operation proceeds from step 3005 to step 3003. The monitoring for motion and storing of motion information is performed on an ongoing basis.

Returning to step 3006, in step 3006 the camera device captures images during a first image capture time period (T=1) using multiple optical chains of the camera device. Operation proceeds from step 3006 to step 3008. In step 3008, the camera device stores images captured during the first image capture time period. Operation proceeds from step 3008 to step 3010. In step 3010 the camera device generates a composite image from images captured during the first time period using a first reference image. In some embodiments, the first reference image is an image captured by one of the optical chains, e.g., a center optical chain. In some embodiments, the first composite image is an image having the same perspective as the first reference image. Operation proceeds from step 3010 to step 3011.

In step 3011 the camera device stores, displays, and/or outputs the generated composite image. Operation proceeds from step 3011 to step 3012. In step 3012 the camera device updates the current image capture time period by one, e.g., sets T=T+1. Operation proceeds from step 3012 to step 3104. In step 3104, the camera device captures images corresponding to the current image capture time period (T), e.g., the second time period. Operation proceeds from step 3014 to step 3016. In step 3106, the camera device stores images corresponding to the current image capture time period, e.g., the second time period. Operation proceeds from step 3016, via connecting node A 3018, to step 3020.

In step 3020 the camera device generates a composite image for the current image capture time period, e.g., the second time period. Step 3020 includes step 3022, step 3032, and step 3044. In step 3022 the camera device detects an amount of motion. Step 3024 includes one or both of steps 3024 and 3026. In step 3024 the camera device detects an amount of motion of the camera device including multiple optical chains, e.g., motion between the first time period and the second time period. In various embodiments, the detection of step 3024 is based upon the stored motion information from step 3005, e.g., based on gyroscopes and/or accelerometer measurements.

In step 3026, the camera device detects an amount of motion between an image corresponding to the second time period and an image corresponding to the first time period. In some embodiments, step 3026 includes step 3028 in which the camera device compares the content of an image corresponding to the first time period to an image corresponding to the second time period. In some embodiments, step 3028 includes step 3030 in which the camera device compares a first image captured by a first optical chain module of said camera during the first time period to a second image captured by the first optical chain module during said second time period.

Operation proceeds from step 3030 to step 3032. In step 3032 the camera device produces a second reference image from a first plurality of images captured by different optical chains of said camera device during the second time period. In some embodiments, the first plurality of images is, e.g., a plurality of frames with one frame per optical chain. Step 3032 includes step 3034 or step 3036.

In step 3034 the camera device selects a reference image from images captured by different optical chain modules during the second time period based on the detected amount of motion. In some embodiments, step 3034 includes step 3038 or step 3040. In step 3038 the camera device selects the second reference image based on detected motion of the camera including a plurality of optical chain modules having different perspectives, different ones of said plurality of images being captured by different ones of said plurality of optical chain modules. In some embodiments step 3038 includes step 3039. In step 3039, the camera device selects as the second reference image an image captured by an optical chain of said camera having a second perspective which is the closest to a first perspective of an optical chain of said camera that was used to capture the first reference image.

In step 3040 the camera device selects the second reference image based on detected motion in images captured by the optical chain modules of the camera device, said motion being detected by comparing the content of an image corresponding to said first time period to an image corresponding to said second time period. In some embodiments, step 3040 includes step 3041. In step 3041, the camera device selects as the second reference image an image captured by an optical chain of said camera having a second perspective which is the closest to a first perspective of an optical chain of said camera that was used to capture the first reference image.

Returning to 3036, in step 3036 the camera device synthesizes a reference image from at least two of said multiple images captured by different optical chain modules during said second time period based on the detected amount of motion. Operation proceeds from step 3032, via connecting node B 3042, to step 3044.

In step 3044 the camera device uses the second reference image and at least one other image in said first plurality of images to generate a composite image corresponding to said second time period. In some embodiments, step 3044 includes one or more or all of steps 3046, 3048, 3050, 3052, and 3054.

In step 3046, the camera device generates for said at least one other image, first image shift information indicating an amount of a first image shift between the second reference image and at least one other image. Operation proceeds from step 3046 to step 3050. In step 3050 the camera device performs at least one of a shift, warp or other image distortion operation to at least one other image as a function of the first image shift amount to generate first modified image data.

In step 3048, the camera device generates for a third image captured by an optical chain of said camera during the second time period, third image shift information indicating an amount of a third image shift between the second reference image and the third image. Operation proceeds from step 3048 to step 3052. In step 3052 the camera device performs at least one of a shift, warp or other image distortion operation to the third image as a function of the third image shift amount to generate modified third image data.

Operation proceeds from step 3050 and step 3052 to step 3054, in which the camera device combines at least two of said second reference image, said first modified image data, and said modified third image data to generate said composite image.

Operation proceeds from step 3020 to step 3055, in which the camera device stores, displays and/or outputs the generated composite image, e.g., a second composite image corresponding to the second time period. Operation proceeds from step 3055, via connecting node C 3056, to step 3058. In step 3058, the camera device updates the current time period by one, e.g., sets T=T+1. Operation proceeds from step 3058 to step 3060. In step 3060 the camera device captures images corresponding to the current image capture time period (T), e.g., the third time period. Operation proceeds from step 3060 to step 3062 in which the camera device stores images corresponding to the current image capture time period, e.g., the third time period. Operation proceeds from step 3062 to step 3064, in which the camera device generates a composite image for the current image capture time period, e.g., the time period. Step 3064 includes steps similar to those as described previously for step 3020. For example for generating a composite image for the third time period, step 3064 includes: a step including a detection for an amount of motion between the third time period and the second time period, a step including producing a third reference image from a plurality of images captured by different optical chains of said camera device during the third time period, and a step for using the third reference image and at least one other image in a plurality of image captured during the third time period to generate a composite image corresponding to the third time period.

Operation proceeds from step 3064 to step 3065 in which the camera device stores, displays and/or outputs the generated composite image, e.g., the generated third composite image. Operation proceeds from step 3065, via connecting node C 3066, to step 3058.

FIG. 18, comprising the combination of FIG. 18A, FIG. 18B, FIG. 18C and FIG. 18D, is an assembly of modules 3100, comprising the combination of Part A 3199, Part B 3197, Part C 3195 and Part D 3193, in accordance with an exemplary embodiment.

In one embodiment the assembly of modules 3100 shown in FIG. 18 is part of or used in place of the assembly of modules 2818 of camera device 2800 of FIG. 15. The modules in the assembly 3100, when executed by the processor 2810 control the camera device 2800 in one embodiment to implement the method described with regard to FIG. 17. While the modules of assembly of modules 3100 of FIG. 18 may, and in some embodiments are implemented using software, in other embodiments they are implemented in hardware, e.g., as circuits, which may and in some embodiments are included in the camera device 2800, e.g., as assembly of modules 2880.

In another embodiment, some of the modules of assembly of modules 3100 are included as part of assembly of modules 2818 and/or assembly of modules 2880 of camera device 2800 and some of the modules of assembly of modules 3100 are included as part of assembly of modules 1418 of computer system 1400. For example, in one exemplary embodiment, image data collection including the capturing of images from multiple optical chains, and camera motion measurements which are performed by gyroscopes and accelerometers, are be performed by the camera device 2800, and processing of the collected captured image data and processing of collected camera motion measurements is performed by computer system 1400, which generates reference images and composite images. In another exemplary embodiment, image data collection is performed by the camera device 2800, which captures images from multiple optical chains, and processing of the collected captured image data including determination of motion based on images is performed by computer system 1400. In other embodiments, some steps of the processing are performed by the camera device 2800 and other steps of the processing are performed by the computer system 1400.

Assembly of modules 3100 includes a module 3103 configured to monitor for camera motion, e.g., using gyroscopes and accelerometers and a module 3105 configured to store motion information corresponding to captured images, e.g., information indicating motion between a last image capture time period (T−1) and the current image capture time period (T) with images captured in the current image capture time period.

Assembly of modules 3100 further includes a module 3104 configured to initialize the current image capture time period (T) to 1, a module 3106 configured to capture images during a first image capture time period (T=1) using multiple optical chains of the camera device, a module 3108 configured to store images captured during the first image capture time period, a module 3109 configured to produce a first reference image, e.g., select the first reference image as the image corresponding to one of the optical chains, e.g., the center optical chain or the camera device. Assembly of modules 3100 further includes a module 3110 configured to generate a composite image from images captured during the first time period, and a module 3011 configured to store, display, and/or output the generated composite image.

Assembly of modules 3100 further includes a module 3012 configured to update the current image capture time period by one, e.g., set T=T+1; a module 3114 configured to capture image corresponding to the current image capture time period (T), e.g., the second image capture time period, and a module 3116 configured to store images corresponding to the current image capture time period, e.g., the second time period.

Assembly of module 3100 further includes a module 3120 configured to generate a composite image for the current image capture time period, e.g., the second time period. Module 3120 includes a module 3122 configured to detect an amount of motion, a module 3132 configured to produce a second reference image, from a first plurality of images captured by different optical chains of said camera device during the second time period, and a module 3144 configured to use the second reference image and at least one other image in said first plurality of images to generate a composite image corresponding to the second time period. Module 3122 includes a module 3124 configured to detect an amount of motion of a camera device including multiple optical chains, e.g., motion between said first time period and the second time period. In some embodiments, module 3124 uses the stored motion information from module 3105, e.g., based on gyro and accelerometer measurements, to detect an amount of motion. Module 3122 includes module 3126 configured to detect an amount of motion between an image corresponding to a second time period and an image corresponding to a first time period. Module 3126 includes a module 3128 configured to compare the content of an image corresponding to the first time period to an image corresponding to a second time period. Module 3128 includes a module 3130 configured to compare a first image captured by a first optical chain module of the camera during the first time period to a second image captured by said first optical chain module during the second time period.

Module 3132 configured to produce a second reference image includes a module 3134 configured to select a reference image from images captured by different optical chains of said cameras during the second time period based on the detected amount of motion and a module 3136 configured to synthesize a reference image, the second reference image, from at least two of the multiple images captured by different optical chain modules during the second time period based on the detected amount of motion. Module 3134 includes a module 3138 configured to select the reference image based on the detected motion of the camera including a plurality of optical chain modules having different perspectives, different ones of said plurality of images being captured by different ones of said plurality of optical chain modules. Module 3138 includes a module 3139 configured to select as the second reference image an image captured by an optical chain module of said camera having a second perspective which is the closest to a first perspective of an optical chain module of said cameras that was used to capture the first reference image.

Module 3134 includes a module 3140 configured to select the second reference image based on detected motion in images captured by the optical chain modules of the camera device. Module 3140 includes a module 3141 configured to select as the second reference image an image captured by an optical chain of said camera having a second perspective which is the closet to a first perspective of an optical chain of said camera that was used to capture the first reference image.

Module 3144 includes a module 3146 configured to generate for at least one other image, first shift information indicating an amount of a first image shift between the second reference image and at least one other image, a module 3148 configured to generate for a third image captured by an optical chain of said camera during said second time period, third image shift information indicating an amount of a third image shift between the second reference image and said third image. Module 3144 further includes a module 3150 configured to perform at least one of a shift, warp or other image distortion operation to at least one other image as a function of said first image shift amount to generate first modified image data, a module 3052 configured to perform at least one of a shift, warp or other image distortion operation to said third image as a function of said third image shift amount to generate modified third image data. Module 3144 further includes a module 3154 configured to combine at least two of said second reference image, said first modified image data, and said modified third image data to generate said composite image.

Assembly of modules 3100 further includes a module 3155 configured to store, display, and/or output the generated composite image, e.g., the generated second composite image. Assembly of modules 3100 further includes a module 3158 configured to update the current image capture time period, e.g., set T=T+1, a module 3160 configured to capture images corresponding to the current image capture time period (T), e.g., the third time period, a module 3162 configured to store images corresponding to the current image capture time period, e.g., the third time period, a module 3164 configured to generate a composite image for the current image capture time period, e.g., the third time period, and a module 3165 configured to store, display, and/or output the generated composite image, e.g., the third composite image.

Numerous additional variations and combinations are possible while remaining within the scope of the invention. Methods and apparatus which use multiple optical chains to capture multiple images of an area at the same time are described. The multiple captured images may, and in some embodiments are then combined to form a combined image. The combined image in various embodiments is normally of higher quality than would be achieved using just a single one of the optical chains. The use of optical chains at multiple times can be used to capture sets of images which are then processed with each set being used to generate a composite image, e.g., frame, corresponding to the image capture time period. Motion between image capture time periods, e.g., image capture start times, for successive frames can be detected depending on the embodiment using gyroscopes, accelerometers and/or other devices. Output of such devices and/or information indicating motion of the camera device detected since the last frame, e.g., image capture time, can and sometimes is stored with the captured images, e.g., frames. In some embodiments rather than monitor for camera motion using accelerometers or other devices during the time period in which a video or other image sequence is captured, the images are stored and then images corresponding to consecutive time periods are compared to detect motion of the camera device. For example, the image captured by a camera module at time T1 may, and in some embodiments is compared to an image captured by the same camera modules at a second later time T2. Comparison of one or more pixels, e.g., corresponding to a stationary object in the image can and in some embodiments is used to detect camera motion. In some embodiments, the motion of a camera may be predictable and/or intended as is sometimes the case in a movie sequence where a camera is intentionally moved at a slow and predictable rate along a predetermined path. In such embodiments known intentional motion may be subtracted from a detected amount of motion before taking image stabilization affects or selecting a reference image or generating a synthesized image to be used as a reference frame. Accordingly, in at least some such embodiments intended motion may result in changes to the image captured but unintended motion that may unintentionally affect the perspective of one or more camera modules may be, and sometimes is, compensated for by the selection of a reference image corresponding to a different perspective than the previously used reference image or by generating a simulated reference image from a perspective which takes into consideration the unintended camera motion since the preceding image capture time period.

In some embodiments a method is used which involves Capturing image at a time t1 using multiple optical chains of a camera device where the different optical chains each include a lens and sensor, capture images at a later time t2 using the optical chain modules. T1 and t2 maybe the time at which the image capture implemented by the optical chain modules begins at each of two sequential image, e.g., frame, capture times. Gyroscopes and/or accelerometers are used to detect forces on the camera over time in some embodiment and the output is used in some cases to detect camera motion between t1 and t2. The motion information maybe, and in some embodiments is, stored in memory and/or output with the images captured by the different optical chain modules of the camera device at time T2. The particular method may, and sometimes does further involve detecting an amount of motion, e.g., camera device motion, from t1 to t2 based on either 1) gyro/accelerometer output or 2) a comparison of an image corresponding to time period t2 to an image corresponding to time t1. In one such embodiment a reference image, e.g., frame, is then generated based on the determined amount of motion. The reference frame is generated either by: i) selecting one of the captured images corresponding to t2 based on the detected amount of motion, e.g. when the motion indicates the perspective has changed by an amount corresponding to the difference between the perspective of two optical chains or ii) synthesizing a reference image from two images captured during time period T2, e.g., in the case where the detected amount of motion indicates a shift, e.g., an unintended shift, in perspective which is between the difference in the amount of perspective of two optical chains of the camera device rather than matching a difference in perspective between two optical chains. When a reference frame used in T2 is from a different optical chain which provided the reference frame for T1, there is a switch in the optical chain of the camera device which is being used to provide reference frames. Consider for example the case where the center optical chain is used to supply an initial reference frame and then due to motion the center camera module no longer corresponds to the center of the desired scene being captured due to unintended motion but another, e.g., second camera modules of the camera device has a perspective corresponding to the center of the scene area of interest. In such a case a switch would be made from using the image provided by the center camera module as the reference frame to using the image provided by the second camera module as the reference frame continues to have the desired perspective despite the motion of the camera. Once the appropriate reference frame is generated by frame selection or synthesization, the reference frame is then used to generate a composite image for time period t2. For example, the reference frame may be used to determine image cropping or other image modifications to be applied to images captured by other camera chains at time T2 before the images are combined to generate the composite image. The composite image generation process may, and in some embodiments does, involve generated a pixel value for the composite image from pixel values of multiple different images captured at time T2.

The process may be repeated with the reference image used at time T2 being used as the reference image of the preceding time period when in image for the next image capture time t3 is to be generated with the process repeating in a similar manner for subsequent image capture time periods in at least one embodiment.

While the term image is used in many locations the term frame is used interchangeably at various locations in the present application. Each image or frame is normally represented, i.e., comprises, multiple pixel values which can be stored in memory and/or communicated to another device for processing along with associated movement information in those embodiments where motion information detected in the camera for use in image processing.

Image capture is performed by the camera device including multiple optical chains but composite image generation can be performed by the camera device or by another device after the image capture process Various embodiments, provide many of the benefits associated with use of a large lens and/or large high quality sensor, through the use of multiple optical chains which can normally be implemented using smaller and/or lower cost components than commonly used with a high quality large lens single optical chain camera implementation.

In various embodiments an optical chain, e.g., camera module, includes a combination of elements including one or more lenses, a light redirection device and a sensor. The light redirection device is a light diverter and may take various forms, e.g., it may be a mirror or prism. The light redirection device may be hinged to allow the angle and thus direction in which an optical chain is pointing to be changed by moving the light redirection device.

In at least some embodiments images captured by different optical chains with non-round apertures having different orientations are combined. In some embodiments the images from two, three or more, e.g., six or more, optical chains with different orientations are combined to form a single combined image. While images from optical chains with different orientations are combined in some embodiments, it should be appreciated that images captured by more than one optical chain with the same orientation can be combined with one or more images captured by optical chains with a different orientation, e.g., relative to the bottom of the camera, e.g., the horizontal, for purposes of explanation. Thus, by combining images from different optical chains many advantages can be achieved allowing for multiple small lenses to be used and a relatively thin camera housing as compared to systems using a single large round lens.

In various embodiments the outer lens of the multiple optical chains are fixed and thus unlike many conventional zoom camera devices in such embodiments the outer lenses, i.e., the lenses on the face of the camera, do not move out of the camera body and are fixed with respect to the face of the camera even during zoom operations. The outermost lenses may, and in some embodiments do have zero or very little optical power and serve as a cover to keep dirt out of the optical chains to which the outer lens corresponds. Thus, the entry of an optical chain may be covered by a clear cover as opposed to a lens with an optical power. The outer lens in such embodiments may be implemented using flat glass or plastic. In some embodiments a slideable cover is slide over the outer lenses when the camera is to be placed in storage and slide back when the camera device is to be used. FIG. 14 shows one such embodiment with the lenses being uncovered and the cover slide to a position in which the case which includes the lens cover can be used as a camera grip or handle.

In some embodiments while a portion of the outermost lens may extend from the front of the camera device beyond the surface of the camera device, the outermost lenses generally extend, if at all, a small amount which is less than the thickness of the camera. Thus even during use the lenses to not extend significantly beyond the face of the camera device in which the optical chains are mounted and normally less than half the thickness of the camera device at most.

In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

Different optical chain modules maybe and sometimes are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amount of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

Numerous additional embodiments are possible while staying within the scope of the above discussed features.

What is claimed:

1. A method of processing a sequence of image data captured by a moving camera, the method comprising:
    detecting motion of the moving camera, said moving camera including multiple optical chains or being a light field camera, said moving camera configured for performing image synthesis from any of a plurality of points of view; and
    determining a point of view to be used for generating an image based on the detected motion of the moving camera; and
    synthesizing an image, said synthesized image being based on said determined point of view; and
    outputting said synthesized image.

2. The method of claim 1,
    wherein detecting motion of the moving camera includes tracking motion of the moving camera along a path;
    wherein determining a point of view includes determining points of view to be used for synthesizing a sequence of images based on said path of motion; and
    wherein synthesizing an image is performed as part of synthesizing a sequence of images, said synthesized sequence of images being based on said determined sequence of points of view; and
    wherein outputting said synthesized images is performed as part of outputting sequence of images.

3. The method of claim 2, wherein said plurality of points of view are within a synthetic aperture region corresponding to a synthetic aperture supported by a combination of apertures of different optical chains of said camera, said camera including at least three optical chains.

4. The method of claim 1, wherein said method is performed by said moving camera or on a processing system which receives images from said moving camera, said processing system including at least a processor synthesizing images corresponding to different points of view, a synthesized image corresponding to a point in time being generated by said processor from images captured by different camera modules of said camera at said point in time.

5. The method of claim 1, further comprising performing as part of a stabilization operation, the steps of:
    cropping one or more images captured by the camera based on inadvertent motion of the camera.

6. The method of claim 2,
    wherein said synthesized sequence of images is a video sequence; and wherein determining the sequence of points of view to be used for synthesizing the sequence of images of said video based on said path of motion includes:
performing a smoothing operation on the tracked path of motion to produce a smoothed path of motion; and
using said smoothed path to determine said sequence of points of view.

7. The method of claim 2, wherein determining the sequence of points of view to be used for synthesizing the sequence of images includes:
performing a smoothing operation on the tracked path of motion to produce a smoothed path of motion; and
using said smoothed path to determine said sequence of points of view.

8. The method of claim 7, wherein said smoothed path is a straight line.

9. The method of claim 7, wherein said smoothed path is a smooth curve.

10. The method of claim 1, wherein detecting the motion of the moving camera includes monitoring an output of at least one of an accelerometer and gyroscope included in said camera or comparing an image captured during a first time period to an image captured during a second time period.

11. The method of claim 4,
wherein performing a track stabilization operation includes performing adjustments to cropping of said images and adjustments to the sequence of points of view based on measurements generated by at least one of a gyroscope or an accelerometer included in the camera; and
where said camera is a handheld camera that is manually moved along a path, wherein said path is a straight line.

12. The method of claim 1, wherein a synthetic aperture of said camera includes expected points of view corresponding to a range of inadvertent track deviations expected to be encountered by a handheld camera.

13. A camera system comprising:
an image capture device including a plurality of camera modules or a light field camera configured to capture a sequence of image data as the image capture device is moved;
a tracking module configured to detect image capture device motion;
a module configured to determine a point of view to be used for synthesizing an image based on the detected motion of the image capture device; and
a synthesization module configured to synthesize said image from multiple images captured by said image capture device in parallel based on the determined point of view; and
an output module configured to output said synthesized image.

14. The camera system of claim 13,
wherein said tracking module is configured to track a path of motion of the image capture device over time;
wherein the module is configured to determine a sequence of points of view to be used for synthesizing a sequence of images based on said path of motion of the image capture device, said determined point of view being one of the points of view in said sequence; and
wherein the synthesization module is configured to synthesize a sequence of images, said synthesized sequence of images being based on said determined sequence of points of view, said synthesized image being an image in said sequence of images; and
wherein the output module is configured to output said synthesized sequence of images.

15. The camera system of claim 14, wherein one point of view in said sequence of point of views is used for each synthesized image in said synthesized sequence of images.

16. The camera system of claim 14, wherein said image capture system is a moving camera that supports image synthesis from any of a plurality of points of view.

17. The camera system of claim 16, wherein different points of view in said plurality of points of view correspond to different optical chains of said image capture device, each optical chain having a single point of view at a given image capture time.

18. The camera system of claim 14,
wherein said points of view are within a synthetic aperture region of said camera;
wherein said synthetic aperture region is a region which corresponds to apertures of multiple camera modules included in said camera; and
wherein said synthetic aperture region is a circular region having a diameter approximately the diameter of a circular area including the outermost lenses of said multiple camera modules.

19. A non-transitory machine readable medium including processor executable instructions which when executed by a processor control an apparatus including said processor to:
detect motion of the moving camera, said moving camera including multiple optical chains or being a light field camera, said moving camera configured for performing image synthesis from any of a plurality of points of view; and
determine a point of view to be used for generating an image based on the detected motion of the moving camera; and
synthesize an image, said synthesized image being based on said determined point of view; and
output said synthesized image.

* * * * *